United States Patent [19]

Jan Al et al.

[11] Patent Number: 4,487,674

[45] Date of Patent: Dec. 11, 1984

[54] PROCESS FOR ELECTROPHORETIC FILM DEPOSITION ACHIEVING INCREASED FILM THICKNESS

[75] Inventors: René Jan Al; John W. Krise, Jr., both of Bradford, Pa.

[73] Assignee: Dresser Industries, Inc., Dallas, Tex.

[21] Appl. No.: 481,186

[22] Filed: Apr. 1, 1983

[51] Int. Cl.$^3$ .............................................. C25D 13/10
[52] U.S. Cl. ............................ 204/181 R; 204/181 C
[58] Field of Search ........................ 204/181 C, 181 R

[56] References Cited

U.S. PATENT DOCUMENTS

| | | | |
|---|---|---|---|
| 2,973,382 | 2/1961 | Dreher | 260/404 |
| 3,075,849 | 1/1963 | Dreher | 106/177 |
| 3,230,162 | 1/1966 | Gilchrist | 204/181 |
| 3,332,793 | 7/1967 | Dreher | 106/187 |
| 3,434,951 | 3/1969 | Ness | 204/181 R |
| 3,444,066 | 5/1969 | Brewer et al. | 204/181 |
| 3,464,906 | 9/1969 | Ridley et al. | 204/181 R |
| 3,493,482 | 2/1970 | Irwin | 204/181 R |
| 3,497,440 | 2/1970 | Weigel | 204/181 R |
| 3,554,888 | 1/1971 | Seitz | 204/181 R |
| 3,589,993 | 6/1971 | Voskuil et al. | 204/181 R |
| 3,799,854 | 3/1974 | Jerabek | 204/181 |
| 3,839,252 | 10/1974 | Bosso et al. | 204/181 C |
| 3,922,253 | 11/1975 | Jerabek et al. | 260/77.5 |
| 3,939,110 | 2/1976 | Colberg et al. | 260/29.6 |
| 4,031,050 | 6/1977 | Jerabek | 260/29.2 |
| 4,038,232 | 7/1977 | Bosso et al. | 260/29.6 |
| 4,129,544 | 12/1978 | Craig | 204/181 C |
| 4,144,159 | 3/1979 | Bosso et al. | 204/181 C |
| 4,299,979 | 11/1981 | Murphy | 562/561 |
| 4,308,121 | 12/1981 | Hazan | 204/181 C |
| 4,339,369 | 7/1982 | Hicks et al. | 523/414 |

FOREIGN PATENT DOCUMENTS 1540138  2/1979  United Kingdom.

OTHER PUBLICATIONS

*Metal Finishing*, Feb. 1980, "Technical Developments in 1979", by Joseph Mazia.
*Metal Finishing*, Feb. 1981, "Technical Developments in 1980", by Joseph Mazia.
"Electrodeposition Processes, Equipment and Compositions", J. I. Duffi, Noyes Data Corp., 1982, Anodic Electrocoating Compositions, pp. 252 and 254.
Journal of Coatings Technology, vol. 54, No. 688, May 1982, "Cathodic Electrodeposition", Pierce et al., p. 36.
"Electro Painting", R. L. Yeates, Robt. Draper, Ltd., Teddington 1970, pp. 108, 120, 192, 211, 219.
"Electrocoat 72" entitled Electrodeposition-Technology and Applications: *Contrast Between Solubilized and Nonsolubilized Dispersion Systems*, by B. D. Washo of IBM, 1972.
"Polymer Compositions for Cationic Electrodepositable Coatings", by P. I. Kordomenos and J. D. Nordstrom, *Journal of Coatings Technology*, vol. 54, No. 686, Mar. 1982, pp. 33–41.
Article, "Influence of Solvents on the Electrodeposition of Paints by I. H. Tsou and W. Stuecken, from Electrodeposition of Coating" Advances in Chemistry, vol. 119, American Chemical Society, Washington, D.C., 1973, pp. 227–231.

*Primary Examiner*—John F. Niebling
*Assistant Examiner*—B. J. Boggs, Jr.
*Attorney, Agent, or Firm*—Daniel Rubin

[57] ABSTRACT

A process for achieving thicker film by electrophoteric deposition techniques by providing an aqueous solubilized organic resin medium having above about 1% and preferably from about 1% to about 20% of a compatible surfactant by weight of solids in the medium. The prepared medium is then used in conventional electrophoteric deposition systems to coat a conductive substrate with an organic resin coating.

75 Claims, No Drawings

PROCESS FOR ELECTROPHORETIC FILM DEPOSITION ACHIEVING INCREASED FILM THICKNESS

TECHNICAL FIELD

This invention relates to electrophoretic film deposition, and more particularly the formation of a bath for electrodeposition to achieve increased film thickness by utilizing a surfactant in the preparation of an aqueous organic resin bath suitable for use in electrophoretic deposition processes, in the range of above about 1% and preferably from about 1% to about 20% by weight of solids in the bath.

BACKGROUND ART

Electrodeposition techniques are known in the art. In general, organic coatings can be applied to conductive substrates such as metals by electrodeposition. The invention relates to improved electrocoating bath compositions and methods for electrodepositing a coating on the interior and exterior portions of electrically conductive surfaces such as metal articles. An aqueous media containing the organic coating to be applied is formed and is commonly referred to as an e-coat bath. The aqueous media typically contains from about 5% to about 30% solids.

An organic polymer is dispersed throughout the bath and may be positively or negatively charged. The coating of the substrate is accomplished by immersing the substrate in the aqueous media and applying a current to the substrate. The charged polymers are attracted to the material to be coated, which has the opposite charge. There the organic particles are deposited onto the part where they coalesce forming a coating. The part is removed from the e-coat bath, rinsed and the coating is cured. Curing the organic coating to form a final film aids in making the coating tough, resistant to water and organic solvents, etc.

Electrophoretic deposition systems are characterized as either anodic or cathodic thereby indicating the function of the object to be coated. Where the object to be coated is the cathode the system is referred to as a cathodic system. Similarly where the part to be coated is the anode the system is referred to as an anodic system.

The thickness of the layer of electrodeposited material is determined by voltage, coulombic efficiency, and other process factors. Coating takes place over the exposed substrate surface until the deposited film forms an insulating layer which greatly diminishes the flow of current thereby inhibiting and eventually limiting further growth in thickness. In order to obtain increased film thickness, the rate of deposition allowed by direct current flow must exceed the rate of dissolution due to the tendency of the deposited material to redissolve in or reenter the aqueous medium.

The art recognizes two distinct water-based dispersions, one is a solubilized dispersion and the other a nonsolubilized dispersion. The mechanisms of coating for these systems are different. In the solubilized system the organic coating is usually a water-insoluble organic resin chemically modified to contain solubilizing groups. In the case of an anionic resin the solubilizing groups are commonly a carboxylic acid. The solubilizing groups for cathodic resins are commonly amines. Thus, in the solubilized system the resin has been ionized. In contrast, the nonsolubilized systems (emulsions) are basically dispersed hydrophobic resins. In the non-solubilized system bath stability is achieved with the use of emulsifying agents, ions, or ionizable species which are absorbed on the particle.

The present invention relates to solubilized electrocoating systems. Solubilized electrocoating systems have several disadvantages one of which is that the film building is self-limiting and the achievable thickness usually does not exceed 0.50 to 2.0 mils. Uniform coatings of acceptable quality for commercial purposes have been limited to a maximum thickness of about 2.0 mils. These relatively thin films do not have desirable properties for many applications. Thus, there has been a need in the art to provide materials and methods to achieve greater film thickness by aqueous electrodeposition techniques. The latter process has inherent advantages including economical labor costs, efficient material usage, and fast processing times. Coating thicknesses above 2.0 mils would be expected to enhance film wear under abrasive conditions, and to provide increased corrosion protection, as well as, resistance to other environmental conditions affecting metallic substrates.

It has now been found that according to this invention, the thickness limitations of prior aqueous solubilized electrocoating systems have been overcome. Using conventional operating conditions, coatings of greater thickness for a particular e-coat bath can be achieved, and in some cases coatings of up to about 8 mils can be obtained employing the electrocoating methods and materials of this invention.

The thicker coatings obtained by the present invention can be obtained without adversely affecting the quality of the deposited film.

SUMMARY OF THE INVENTION

In one aspect the present invention relates to a process for achieving increased film thickness of electrodeposited films. The process involves providing an aqueous media with a solubilized organic coating (hereinafter referred to as the "e-coat bath") containing from about 5% to about 30% solids of a solubilized organic polymer suitable for electrodeposition, and above about 1% and preferably from about 1% to about 20% by weight of a compatible surfactant based upon the total weight of the solids in the e-coat bath. In a preferred embodiment, the e-coat bath contains from about 3% to about 20% of a compatible surfactant based on the weight of solids in the e-coat bath. As used herein "solids" refers to the organic polymer materials, and other addenda, including for example the pigments, defoamers, and plasticizers in the bath. The object to be coated is inserted into the e-coat and coated by electrodeposition techniques.

In a preferred embodiment the e-coat bath contains from about 7% to about 25% solids of a solubilized organic coating suitable for electrodeposition, and from about 1% to about 15% of a compatible surfactant based upon the total weight of solids in the e-coat bath. More preferably from about 3% to about 15% by weight of a compatible surfactant based upon the total weight of solids in the e-coat bath. The organic polymer can be any resin suitable for use in an electrophoretic deposition process which contains functional groups, such as, epoxies, polyesters, acrylics, vinyl polymers, polyamides, polyurethanes, alkyds, polycarboxylics, and combinations thereof.

DETAILED DESCRIPTION

Solubilized electrophoretic coating systems have been known in the art and in some cases have used a surfactant in the range of from about 0.01% to about 0.5% of the total weight of the e-coat solids for purposes of particle dispersion and stabilization. The invention relates to solubilized systems and thus all further references to the e-coat bath will refer to a solubilized system. Heretofore there had been no appreciation that the utilization of a surfactant in an increased concentration could have significant affects on film thickness. Thus, it was quite surprisingly discovered that utilization of surfactants above about 1% and preferably in the range of from about 1% to about 20% based on the weight of solids in the e-coat bath can be used to achieve greater film thickness, usually over a 100% increase and in some cases up to 1000% for a particular resin.

While the mechanism by which these acceptable thicker films are formed is not clearly understood and the inventors do not wish to be bound by any particular theory, it is believed that these surfactants associate with the solubilized resin in such a manner that they increase the conductivity of the uncured resin film and/or coulombic efficiency.

Surfactants function to reduce the interfacial tension between two phases, for example an aqueous phase and an organic phase to enable one phase to be dispersed throughout the other. Surfactants have both a hydrophilic (water attracting) and a lipophilic (oil attracting) portion in their molecular structure. Thus the surfactant tends to form a "bridge" between the two phases. There are many surfactants. However, a particular surfactant may not function in all situations. The suitability of the surfactant depends on the nature of the two phases as well as the type of dispersion desired.

While the selection of a surfactant does involve some degree of trial and error, several principles can be utilized to determine those which are suitable. One characteristic which may be utilized is the HLB (hydrophilic-lipophilic balance) number of the surfactant which can serve as a useful guide in selecting a surfactant suitable for use in the present invention. However, selection of a surfactant within the desired HLB range alone may not assure that the surfactant will be suitable. In addition, the surfactant must be of the right chemical type. In general, a nonionic or cationic emulsifier should be used when the e-coat bath contains a cationic resin. An amphoteric surfactant can be useful with certain cationic resins such as a cationic epoxy resin. Where the e-coat bath contains an anionic resin the most suitable surfactants are nonionic and anionic; however, there are some cationic surfactants which were found useful with anionic resins wherein the cationic surfactant, because of the caustic nature of the bath, functions as a nonionic surfactant due to neutralization of its charge. Amphoteric surfactants have also been found useful with certain anionic resins such as anionic epoxy resins and anionic acrylic resins.

A simple screening test will aid in eliminating unsuitable surfactants. The surfactant to be tested is added to the e-coat bath and agitated. The e-coat bath is allowed to stand with continued agitation. The surfactant is not suitable if it does not admix with the e-coat bath without separating or if it causes coagulation of the bath. In general if the test bath remains stable after 1 hour, the surfactant can be useful in the method of the invention. This test determines if the surfactant is capable of admixing in the desired manner with the bath components, e.g. resins, pigments, solvents, other surfactants.

The surfactant selected should be free of or have a negligible quantity of conductive salts. These conductive salts are normally by-products or impurities from the manufacturing process for the surfactant. The presence of conductive salts in the surfactant is undesirable because they can cause film rupture and/or other coating defects.

The surfactant should not generate an excessive amount of foam, and preferably should not generate any foam when agitated with the e-coat bath. Excessive foam is considered to be a foam layer of any thickness which covers substantially the entire surface of the bath.

The surfactant selected preferably does not contain a solvent or contains a solvent(s) which are compatible with the components of the bath.

As used herein the term "compatible surfactant" means a surfactant which when employed in the increased concentrations of subject invention is capable of being admixed with an e-coat bath and functions in the bath to permit the deposition of resin in increased thickness.

A. NONIONIC SURFACTANTS

Nonionic surfactants suitable for use in the method of the present invention in cathodic and anodic systems have been found to exhibit an HLB value above about 6, preferably from about 8 to about 16 and the most preferable nonionic surfactants have been found to have an HLB value in the range of from about 8 to about 14.

Nonionic surfactants found useful for both cathodic and anodic e-coat baths are not limited to any paticular classes; however, the following classes have been found useful:
1. Derivatives of ethylene oxide
   (a) Amide ethers
   (b) Amine ethers
   (c) Ethoxylated fatty acids
   (d) Ethoxylated fatty esters
   (e) Ethoxylated alcohols
   (f) Ethoxylated alkyl phenols
2. Glycerol and glycol esters
3. Sorbitan esters Amide Ethers: The amide ethers found useful are ethoxylated aliphatic amides with HLB values ranging from about 6 to 19.9. Typically they are polyethylene oxide derivatives of amides prepared from saturated and unsaturated fatty acids. Commercially available materials can be obtained from Armak under the tradename Ethomid.

Amine Ethers: The amine ethers found useful are ethoxylated aliphatic amines with HLB values ranging from about 6 to 19.9. They typically are polyethylene oxide derivatives of amines and diamines prepared from saturated and unsaturated fatty acids. They are commercially available from Armak under the tradenames Ethomeen and Ethoduomeen.

Esters: The esters found useful are ethoxylated aliphatic esters with HLB values ranging from about 6 to 19.9. They typically are polyoxyethylene derivatives of saturated and unsaturated fatty acids. They are prepared by esterification of acids with polyethylene glycols and methoxy polyethylene glycols. The acids are normally mixtures of two or more acids as they are usually derived from natural materials such as animal fats, vegetable oils and marine oils; for example, tallow, linseed oil and cod liver oil, which may contain one or more of the acids listed below:
(a) Butyric acid
(b) Caproic acid
(c) Caprylic acid
(d) Capric acid
(e) Lauric acid
(f) Myristic acid
(g) Palmitic acid
(h) Stearic acid
(i) Palmitoleic acid
(j) Oleic acid
(k) Linoleic acid
(l) Linolenic acid
(m) Eleosteric acid
(n) Ricinoleic acid
(o) Cetoleic acid
(p) Erucic acid The polyethylene glycols and methoxy polyethylene glycols utilized in preparing the ester surfactants are listed below. They are commercially available from Union Carbide. Typical polyethylene glycols and methoxy polyethylene glycols utilized in preparing ester surfactants are:
(a) Polyethylene glycol 200
(b) Polyethylene glycol 300
(c) Polyethylene glycol 400
(d) Polyethylene glycol 600
(e) Polyethylene glycol 1000
(f) Polyethylene glycol 3350
(g) Polyethylene glycol 4600
(h) Polyethylene glycol 8000
(i) Methoxy polyethylene glycol 350
(j) Methoxy polyethylene glycol 550
(k) Methoxy polyethylene glycol 750
(l) Methoxy polyethylene glycol 2000
(m) Methoxy polyethylene glycol 5000

Ester surfactants prepared from the above acids and polyethylene glycols are commercially available from a number of suppliers, for example, Armak, ICI America, and Drew Chemical Co. to name but a few. Examples are: Ethofat 242/25, a polyethylene (15) glycol tallate with an HLB value of 12.2. This material is available from Armak. In addition to the above ester surfactants which are derived directly from the fatty acids and polyethlene glycols listed above there are also esters which are prepared by ethoxylation of glycerol, sorbitol, sorbitan and mannitan fatty acid esters. Several of these materials are commercially available from ICI America, Inc. Examples are: Tween 40, a polyoxyethylenated sorbitan monopalmitate (20 moles of ethylene oxide) with an HLB value of 15.6; Span 20, a sorbitan monolaurate with an HLB value of 8.6.

Ethers: The ethers found useful for the modified cathodic and anodic electrodeposition process are ethoxylated aliphatic and aromatic ethers with HLB values ranging from about 6 to 19.9. The ethers are prepared by ethoxylation of various aliphatic alcohols and phenols with ethylene oxide. Typical alcohols and phenols are listed below. The alcohols are normally $C_8$ to $C_{18}$ linear and branched, saturated and unsaturated primary alcohols; however, they can also be prepared from polyoxypropylene glycols of various molecular weights. Typical alcohols and phenols used in the manufacture of ethers include:
(a) Octyl alcohol
(b) Nonyl alcohol
(c) Decyl alcohol
(d) Lauryl alcohol
(e) Tridecyl alcohol
(f) Myristyl alcohol
(g) Cetyl alcohol
(h) Stearyl alcohol
(i) Isostearyl alcohol
(j) Oleyl alcohol
(k) tert-Octylphenol
(l) Nonylphenol
(m) Dodecylphenol
(n) Polyoxypropylene glycol (several molecular weights ranging from 950 to 3250)

The ether surfactants are commercially available and can be obtained from ICI America, Inc., Rohm and Haas Company, GAF Corporation, BASF Wyandotte Chemicals Corp., Union Carbide Corp. and other companies. Examples are: Triton X-35, a polyoxyethylenated tert-octylphenol with an HLB value of 7.8; Triton X-165, a polyoxyethylenated tertiary octylphenol with an HLB value of 15.8; Pluronic L-42, a block copolymer of propylene oxide and ethylene oxide with an HLB value of 18. Pluronic L-44, a block copolymer of propylene oxide and ethylene oxide with an HLB value of 8.

B. CATIONIC SURFACTANTS

Cationic surfactants are useful with cationic resins. Some cationic surfactants were found useful for use with anionic resins possibly because the caustic nature of the bath caused the cationic surfactant to act like a nonionic surfactant. Cationic surfactants found useful in the method of the present invention exhibited HLB values above about 6 and the most preferable surfactants were found to have an HLB value in the range of from about 8 to about 19.9. Cationic surfactants which were found useful include:

(a) Ethoxylated quarternary ammonium salts: The quaternary ammonium salts found useful are ethoxylated ammonium salts with HLB values of 8 to 19.9. They typically are polyethylene oxide derivatives of amines prepared from saturated and unsaturated fatty acids which are quarternized with materials such as methyl chloride. Commercially available materials can be obtained from Armak under the tradename Ethoquad. Examples are: Ethoquad C-25, a methyl polyoxyethylene (15) cocoammomium chloride with an HLB value of 15.4.

(b) Fluorosurfactants: The fluorosurfactants, fluorinated long chain surfactants, which have been found useful are commercially available from E. I. DuPont Co. and the 3M Company under the tradenames Zonyl and Fluorad. Examples are Zonyl FSC, from E. I. DuPont Co. and Fluorad FC-135, from the 3M Company, a fluorinated alkyl quarternary ammonium iodide.

(c) It is predicted that tertiary amine oxides will be useful also.

C. ANIONIC SURFACTANTS

Anionic surfactants can be used with anionic resin e-coat systems to achieve film building as later examples will show. Useful anionic surfactants include:
(1) Salts of alkylphenyl ethers of sulfo polyethoxyethanols.
(2) Salts of phosphated polyoxyethylenated alkylphenols and alcohols.
(3) Salts of sulfated alkylphenyl ethers and alkyl ethers of polyoxyethylene glycols.

(4) Salts of alkylaryl sulfonates. The alkylaryl sulfonates found useful are derivatives of benzenesulfonic acid. They are available from a number of suppliers. Examples are sodium dodecylbenzene sulfonate available from Alcolac, Inc, under the tradename Siponate DS-10.

(5) Salts of sulfated derivatives of succinic acid. The succinic acid derivatives found useful were the sulfated succinic esters; for example, sodium salt of sulfated dioctylsuccinate available from American Cyanamid, under the tradename Aerosol OT.

(6) Salts of alcohol sulfates. The alcohol sulfates found useful are typically derivatives of long chain alcohols such as dodecyl alcohol, for example, Sipex UB a sodium dodecyl sulfate, commercially available from Alcolac, Inc.

(7) Salts of naphthalene and alkyl naphthalene sulfonates. The sulfonated naphthalenes found useful are typically derivatives of naphthalene sulfonic acid. Examples are Nekal BA-77, a sodium salt of an isopropyl naphthalene sulfonic acid available from GAF Corp.

D. AMPHOTERIC SURFACTANTS

Amphoteric surfactants are least preferred but can be used with anionic resins, with the exception of certain anionic polyster e-coat systems to achieve film building as later examples will show. Amphoteric surfactants can be useful with certain cationic resins.

Amphoteric surfactants found useful include:

(1) Fluorosurfactants: Fluorosurfactants found useful include Zonyl FSB, a fluorosurfactant available from E. I. DuPont Co. Fluorosurfactants are fluorinated long chain surfactants.

(2) Salts of long chain amino acids: The salts of long chain amino acids found useful are derivatives of imidazoline. Examples are: Miranol L2M-SF, a disodium dicarboxylated 2-imidazoline derivative of linoleic acid from Mironal Chemical.

The present invention is broadly applicable to solubilized e-coat systems because although the base resins are varied they are commonly characterized by similar solubilizing groups which are areas where it is believed the surfactants associate with the resin. Thus, the present invention can be used with resins containing functional groups, such as, polyesters, acrylics, epoxy, alkyds, polyurethanes, polycarboxylics, vinyl polymers, and polyamides and combinations thereof. Suitable resins are described in many U.S. Patents, such as, U.S. Pat. No. 3,799,854 issued to Jerabek on Mar. 26, 1974; U.S. Pat. No. 3,230,162 issued to Gilchrist on Jan. 18, 1966; and U.S. Pat. No. 3,939,110 issued to Colberg et al. on Feb. 17, 1976. Also, a number of suitable resins are identified in "Polymer Compositions For Cationic Electrodepositable Coatings", *Journal of Coatings Technology*, Vol. 54, No. 686, March 1982, by P. I. Kordomenos and J. D. Nordstrom; and "Cathodic Electrodeposition"; *Journal of Coatings Technology*, Vol. 54, No. 688, May 1982, by M. Wismer, P. E. Pierce, J. F. Bosso, R. M. Christenson, R. D. Jerabek, and R. R. Zwack.

It is predicted that onium based resins currently under development such as sulfonium and phosphonium bases which are solubilized by water will be useful in the present invention.

Those skilled in the art will recognize that resins to be used for e-coat baths are generally combined with a solvent or solvents. The various resin manufacturers may not use the same solvents or proportions of solvents in the manufacture of resin. The suitablility of a surfactant is also affected by the solvent or solvents present with the resin.

In some cases it was found that the addition of a solvent to the e-coat bath and surfactant also increased film thickness. Solvents found particularly useful were xylene and isobutanol. Other solvents known in the art to be useful in the preparation of e-coat baths include, denatured alcohol, n-butyl alcohol, isobutyl alcohol, isopropyl alcohol, 2-ethylhexanol, ethylene glycol monoethyl ether (ethyl cellosolve), ethylene glycol monobutyl ether (butyl cellosolve), ethylene glycol monohexyl ether (hexyl cellosolve), diethylene glycol monoethyl ether (ether carbitol), diethylene glycol monobutyl ether (butyl carbitol) and diethylene glycol monohexyl ether (hexyl carbitol). Those skilled in the art will recognize that addition of a solvent will affect bath rheology and characteristics of the final coating. The addition of a solvent has been found helpful when adjusting characteristics of the film such as rheology, gloss, leveling, and improving coalescene.

The present invention can be used with any of the known techniques of electrophoretic deposition. The present invention can be used at constant voltage or variable voltage. As is known in the art, adjustment of voltage and deposition time may be altered to effect film thickness, throw power, and film properties.

EXAMPLES

The following examples are presented in order to better facilitate the understanding of the subject invention but are not intended to limit the scope thereof.

Examples I through IV are some typical examples of synthesized nonionic surfactants which were found useful as film building agents when added to a commercially available cationic electrodeposition coating composition, namely, PPG's clear #41 cationic epoxy resin vehicle and ED3002 pigment dispersion 998-4410.

EXAMPLE I

A nonionic surfactant with a theoretical HLB value of 14 was prepared by heating 139.0 parts of linseed oil fatty acids (Proctor and Gamble's L-310), 300.0 parts of polyethylene glycol 600 (Fisher Scientific Co.) and 0.51 parts of boric acid anhydride to 205° C. The reactants were maintained under an atmosphere of nitrogen and heated and stirred until the theoretical amount of water was distilled off. The surfactant thus produced was dissolved with an equal weight of a solvent mixture of 3.0 parts xylene and 1.0 parts methanol.

A cationic electrodepositable coating composition was prepared by adding the surfactant solvent mixture to a commercially available coating material (PPG's cationic expoxy resin clear #41, 389.7 parts; ED3002 pigment paste 998-4410, 117.50 parts; deionized water, 392.4 parts) in a ratio of 3.0 parts surfactant to 100 parts of the cationic coating composition. The cationic electrodeposition bath of pH 6.8 contained 21.4 percent solids and when electrodeposited upon a steel panel for 120 seconds at 300 volts gave a semi-rough film which was improved by drying at 200° F. for 20 minutes followed by curing for 25 minutes at 350° F. The resultant smooth hard film of 4.0 mil thickness was void free in all areas except sharp corners.

EXAMPLE II

A nonionic surfactant with a theoretical HLB value of 15.9 was prepared by heating 139.2 parts of linolenic acid (Eastman Kodak technical grade), 500.0 parts polyethylene glycol 1000 (Fisher Scientific Co.) and 0.50 parts of boric acid anhydride to 233° C. under an atmosphere of nitrogen. The reactants were heated and stirred until the theoretical amount of water was distilled off. The surfactant thus produced, a waxy solid, was dissolved with an equal weight of a solvent mixture of 3.0 parts xylene and 1.0 parts methanol.

A cationic electrodepositable coating composition was prepared by adding 3.00 parts of the surfactant solvent mixture to 100 parts of a commercially available coating material (PPG's cationic epoxy resin clear #41 389.7 parts; ED3002 pigment paste 998–4410, 117.50 parts; deionized water, 392.4 parts). The resultant electrodeposition bath of pH 6.1 continued 21.6 percent solids and when electrodeposited upon a steel panel for 120 seconds at 300 volts gave a rough film which was improved by drying at 200° F. for 20 minutes followed by curing at 350° F. for 15 minutes. The deposited semismooth hard film of 6.0–7.0 mil thickness was partially void free.

EXAMPLE III

A nonionic surfactant with a theoretical HLB value of 8.7 was prepared by heating 278 parts of linseed oil fatty acids (Proctor and Gamble's L-310) 200 parts of polyethylene glycol 200 (Aldrich Chemical Co.) and 0.50 parts of boric acid anhydride to 206° C. under an atmosphere of nitrogen. The reactants were heated and stirred until the theoretical amount of water was distilled off.

A cationic electrodepositable coating composition was prepared by adding 3.0 parts of surfactant to 100 parts of a commercially available coating material (PPG's cationic epoxy resin clear #41, 389.7 parts, ED3002 pigment paste 998–4410, 117.5 parts; and deionized water, 392.4 parts). The resultant electrodeposition bath of pH 6.0 contained 23.10 percent solids and when electrodeposited upon a steel panel for 120 seconds gave a smooth film which was dried at 200° F. for 20 minutes and cured at 350° F. for 15 minutes. The deposited smooth hard film of 2.9 mils thickness was partially void free.

EXAMPLE IV

A nonionic surfactant with a theoretical HLB value of 12.1 was prepared by heating 278.1 parts of linseed oil fatty acids (Proctor and Gamblis L-310), 400.0 parts of polyethylene glycol 400 (Aldrich Chemical Co.) and 0.50 parts of boric acid anhydride to 210° C. The reactants were maintained under an atmosphere of nitrogen and heated and stirred until the theoretical amount of water was distilled off. The surfactant thus produced, 40 parts, was dissolved in 60 parts of a solvent mixture consisting of 65 parts xylene, 25 parts isobutanol, and 10 parts propylene carbonate. A cationic electrodepositable coating composition was prepared by adding the surfactant solvent mixture to a commercially available coating material (PPG's cationic epoxy resin clear #41, 389.7 parts; ED 3002 pigment paste 998–4410, 117.50 parts; deionized water, 392.4 parts) in a ratio of 8 parts surfactant solvent mix to 100 parts of the cationic coating composition. The cationic electrodeposition bath of pH 6.3 contained 23.4 percent solids and when electrodeposited upon a steel panel for 120 seconds at 300 volts gave a semismooth film which was improved after curing at 350° F. for 20 minutes. The resultant smooth hard film of 4.6 mil thickness was void free in all areas except sharp corners.

EXAMPLE V

In the following examples the average thickness was either measured or calculated. The calculated average thickness of the applied coating was calculated with the following sequence of formulas:

1. $(\Delta/gm) \div$ (Area of Panel in Inches$^2$) = gm./in.$^2$
2. (gm./in.$^2$) $\div$ (6.45 cm.$^2$/in.$^2$) = gm./cm.$^2$
3. (gm./cm.$^2$) $\div$ (specific gravity of cured film in (gm./cm.$^3$) = cm
4. (cm.) $\times$ (0.3937 in./cm.) = in.
5. (in.) $\times$ (1000) = mils. per panel $\Delta/gm$. is the weight of the panel after curing in grams minus the panel weight before coating in grams.

MIXING PROCEDURE

The mixing procedure was the same for all e-coat baths and was accomplished in the following sequence:

1. The amount of resin to be used was measured out, and placed in the e-coat tank and stirred with a power stirrer.
2. Deionized (D.I.) water was added as prescribed by the manufacturer and stirred. The e-coat bath was continuously stirred after mixing to prevent settling of the solids.

EQUIPMENT

The e-coat tank consists of a square polyethylene tank approximately 12"×12"×12" high. The cathode in the anodic system and the anode in the cathodic system consisted of a stainless steel sheet measuring 1/16"×12"×48" long. This sheet was bent in a square and was placed next to the inside wall of the polyethylene tank. Suspended across the top of the tank was a ⅛"×2"×14" copper strip where the part to be coated was supported and made contact with the proper post on the rectifier.

In the anodic system the copper strip was connected to the positive post and in the cathodic system was connected to the negative post. The other lead of the rectifier was connected to the stainless steel band lining the inside walls of the plastic tank. Also connected in the circuit is a step timer to allow the maximum voltage to be applied gradually at any desired time from 0 to 2 minutes. There was also a coulomb meter connected directly into the system to measure the amount of energy required to apply the coating material to the metal substrate.

RESINS

The following resins were utilized in the examples:

a. Cationic epoxy resin from PPG, sold as ZN6EZ506, which contains as solvents about 8.5% ethylene glycol monoethyl ether, 3.1% ethylene glycol monohexyl ether, and 2.4% xylene.

b. Anionic epoxy resin from PPG, sold as JF3EZ445, which contains as solvents a trace amount of isobutanol and about 17.5% ethylene glycol monohexyl ether.

c. Cationic Acrylic resin from PPG sold with solvents.

d. Cationic Acrylic resin from Glidden Paint Co. sold as K-1733, which contains as solvents 4% denatured alcohol, 10% 2-ethylhexanol, 6% ethylene glycol monoethyl ether, 5% ethylene glycol monobutyl ether, 9% ethylene glycol monohexyl ether.

e. Anionic acrylic resin from Jamestown Paint Co., sold as JAPCO 92813, which contains as solvents 27.9% by volume n-butanol, 2.3% by volume butyl cellosolve, 2.5% xylene, and 1.4% hexyl cellosolve.

f. Anionic polyester resin, from Spencer Kellogg sold as Kelso 2080 which contains as solvents 10% isopropyl alcohol, 10% diethylene glycol monobutyl ether, 5% n-butyl alcohol.

A typical coating trial consisted of the following steps:

1. A ⅛"×3"×6" steel panel was grit-blasted, caustic cleaned, zinc phosphated and weighed prior to coating.
2. The panel was immersed in e-coat bath and connected to the appropriate lead on the rectifier. (Cathodic e-coat is negative lead and the anodic e-coat is the positive lead.)
3. The timer was set so as to apply step voltage to reach maximum volts within 23 seconds.
4. Power was then applied and the panel was subjected to electrical current for a total cycle as indicated.
5. After the cycle time expired the rectifier was turned off, the panel was removed from the tank and the coulomb reading was recorded.
6. The panel was then rinsed off in tap water to remove excess e-coating material.
7. The panel was then cured as indicated.
8. After curing the panel was removed from the oven and allowed to cool to room temperature.
9. The panel was then weighed to record the amount of coating applied, thickness was either calculated or determined by measurement.

The test results are tabulated below. The notation "not compatible" means that the resin and surfactant interacted in such a manner as to render the coating bath inoperable, for example, causing flocculation of the resin.

The notation "blew off" indicates that the gaseous by-products generated during the electrodeposition process were of such a magnitude that they removed or blew off the coating. This is an indication that the hydrogen generation (in the cathodic system) or oxygen generation (in the anodic system) was excessive. Thus, the surfactant may be useful in the process by reducing its concentration, adjusting solids concentration, and process conditions.

In the following tables the following abbreviations are used in some:

N = nonionic surfactant
AM = amphoteric surfactant
C = cationic surfactant
A = anionic surfactant The appearance of the coating was evaluated and classified broadly as "slightly" (abbreviated as "S" in the Tables) is used to indicate that the cured film had a glossy, semi-glossy or smooth appearance and that the film was relatively even;

"poor rheology" (abbreviated as "PR" in the tables) indicates that the coating cured well but that runs were present indicating that a good film could be produced with proper adjustment of rheology; and "unsightly" (abbreviated as "US" in the tables) indicates that the cured coating was either grainy, contained hash marks, was uneven, contained visible pinholes, bare spots, craters or blisters. This classification does not indicate that the surfactant would not be useful in the process of the present invention but rather that adjustment of the concentration of the surfactant, other components, and process conditions is required.

TABLE I

A. Cationic Epoxy Resin

Table I is a series of tests on a cationic epoxy resin sold by PPG under the trade designation ZN6EZ506. The resin was blended with water in an amount of 49.85% resin to 50.15% water. The temperature of the bath was 75° F., the deposition time was 2 minutes. After the samples had been coated the samples were cured for 15 minutes at 350° F.

In addition to the samples in Table I, a bath was prepared using the cationic resin at 17.44% solids, 15% Tween 40 by weight of solids and 15% xylene by weight of solids. Attempts to coat a sample at 100 volts, 150 volts and 200 volts produced ruptured coatings due to excess conductivity and high coulombic yield. The same results were achieved when isobutanol was substituted for xylene.

TABLE II

B. Anionic Epoxy Resin

Table II tabulates a series of examples of a bath containing an anionic epoxy resin, in particular a resin sold as JF3EZ445 by PPG. The resin was admixed with water in a concentration of 26.74% resin to 73.26% water. In all examples the bath contained 7.86% solids, the bath temperature was 75° F., the bath time for application of current was 2 minutes, the coated samples were cured 15 minutes at 350° F. In all the examples in which a surfactant was added, the surfactant was added in an amount of 15% by weight of solids. In those examples in which a solvent was added in addition to a surfactant, the solvent was added in an amount equal to 15% by weight of the solid content.

In addition to the examples in Table II, e-coat baths were prepared as described in the preceeding paragraph with Ethoquad C25, a cationic surfactant with an HLB of 15.4, and xylene as a solvent. Tests were conducted at 100 volts, 150 volts, and 200 volts. The resulting coating was very irregular which could not be measured. Another bath was prepared with Ethoquad C25 and isobutanol. Coatings were attempted at 100 volts, 150 volts and 200 volts. Again the coatings were very irregular and could not be measured. These results were caused by excess conductivity and high coulombic yield.

TABLE III

C. Cationic Acrylic Resin

Table III tabulates a series of experiments with a cationic acrylic resin purchased from PPG premixed. All baths were made with a 16.39% solid content, had a temperature of 75° F. and current was applied for 2 minutes. The coated samples were all cured at 350° F. for 15 minutes. In those baths where surfactant was added it was in a concentration of 15% by weight of the solids. In those examples where both surfactant and solvent were added each was added in an amount equal to 15% by weight of solids.

TABLE IV

D. Anionic Acrylic Resin

Table IV tabulates a series of experiments in which baths of anionic acrylic resin were prepared using JAPCO 92813 resin from Jamestown Paint Co. in a concentration of 12.11% resin to 87.89% water. All baths were prepared with a solids content of 7.45%, had a temperature of 75° F. and current was applied for 2 minutes. The formed coatings were cured at 350° F. for 15 minutes. Surfactant was added in the amount of 15% by weight of solids in those examples which indicate surfactant was added. Solvent was added in the amount of 15% by weight of solids in those examples indicating the addition of solvent. "Dod. Sulfate" refers to Dodecyl sulfate surfactant sold by Aldrich.

TABLE V

E. Anionic Polyester Resin

Table V tabulates a series of experiments in which baths of an anionic polyester resin were prepared using Kelso 2080 resin manufactured by Spencer Kellogg, in a concentration of 10% resin to 90% water. All baths were prepared with a solids content of 7.05% had a temperature of 75° F. and current was applied for 2 minutes. The formed coatings were cured at 350° F. for 15 minutes. Surfactant was added in the amount of 15% by weight of solids in those examples which indicate surfactant was added. Solvent was added in the amount of 15% by weight of solids in those examples indicating the addition of solvent.

In addition to the samples in Table V e-coat baths according to the above procedure were prepared with 15% Ethoquad C25 by weight of solids and 15% xylene by weight of solids. No coatings were formed due to excessive conductivity.

In addition to the samples in Table V e-coat baths according to the above procedure were prepared with 15% Ethoquad C25 by weight of solids, and 15% isobutanol by weight of solids. No coatings were formed due to excessive conductivity.

E-coat baths according to the above procedure were also prepared with 15% Miranol LM2-SF, an amphoteric emulsifier, by weight of solids, and 15% xylene by weight of solids. No acceptable coatings were formed due to excessive conductivity.

E-coat baths according to the above procedures were also prepared with 15% sodium dodecyl sulfate, an anionic surfactant sold by Aldrich. No acceptable coatings were formed due to excessive conductivity.

TABLE VI

F. Cationic Acrylic Resin

Table VI tabulates a series of experiments in which baths were prepared from a cationic acrylic resin purchased premixed from PPG. All baths were at 75° F. and current was applied for 2 minutes. All samples were cured at 350° F. for 15 minutes. The surfactant used was Byktone a nonionic unsaturated fatty acid ester, available from Byk. Mallinckrodt. Byktone contains 41% surfactant with the remainder being solvents. Byktone was added in an amount sufficient to give 20% surfactant by weight of solids in the bath. Byktone has an HLB number of 12.2.

TABLE VII

G. Cationic Epoxy Resin

An e-coat resin bath as described above for Table I was prepared and substrates coated by the process described for Table I. The commercial composition Byktone, which contains 41% surfactant, was added in sufficient amount to equal 18.8% surfactant by weight of solids in the bath, and the results recorded in Table VII.

TABLE VIII

H. Cationic Acrylic Resin

Table VIII tabulates a series of experiments in which baths were prepared from a cationic acrylic resin, K-1733, sold by Glidden Paint Company. The resin was mixed with water in a concentration of 17.88% resin to 81.99% water, the solids content of all sample baths was 10.52%. All baths were at 75° F. and current was applied for 2 minutes. The formed coatings were cured at 350° F. for 15 minutes. Surfactant was added in the amount of 15% by weight of solids in those examples which indicate surfactant was. Solvent was added in the amount of 15% by weight of solids in these examples indicating the addition of solvents.

TABLE IX.

I. Table IX tabulates examples of various resins with various surfactants concentrations in percent by weight of solids. Conditions for each example of Table IX were: bath temperature—75° F., coating time—2 minutes, cure temperature—350° F., and cure time 15 minutes.

TABLE X

J. Table X illustrates adjustment of the surfactant concentration, voltage and other factors on the coating produced. The baths were at 75° F., and the coating time was 2 minutes. The applied coating was cured 15 minutes at 350° F.

TABLE XI

K. Table XI tabulates a series of experiments in which e-coat baths were prepared from anionic epoxy resin PPG JF3EZ 445. All baths were at 75° F. and current applied for 2 minutes. All samples were cured at 350° F. for 15 minutes. The commercial composition Byktone, which contains 41% surfactant, was added in sufficient amount to equal 41.7% surfactant by weight of solids in the bath.

TABLE XII

L. Table XII tabulates a series of experiments in which e-coat baths were prepared from anionic polyster resin, Spencer Kellogg, Kelso 2080. All baths were at 75° F. and current applied for 2 minutes. All samples were cured at 350° F. for 15 minutes. Byktone was added in a sufficient amount to equal 46.5% surfactant by weight of solids in the e-coat bath.

TABLE XIII

M. Table XIII tabulates a series of experiments in which e-coat baths were prepared from anionic acrylic resin, JAPCO 92813. All baths were at 75° F. and current applied for 2 minutes. The coatings were cured for 15 minutes at 350° F. Byktone was added in a sufficient amount to equa 44.0% surfactant by weight of solids in the e-coat bath.

While this invention has been described in relation to its preferred embodiments, it is to be understood that various modifications thereof will be apparent to those of ordinary skill in the art upon reading the specification and it is intended to cover all such modifications as fall within the scope of the appended claims.

TABLE I

| | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| PANEL NET GAIN (GMS) | 0.10 | 0.12 | 0.15 | 0.16 | 0.23 | 0.23 | 0.13 | 0.17 | 0.22 | 0.24 | 0.30 | 0.30 | 0.27 | 0.27 | 0.38 | 0.36 | 0.42 | 0.16 |
| SURFACTANT | Span 20 | | | | | | Span 20 | Span 20 | Span 20 | Span 20 | Span 20 | Span 20 | Span 20 | Span 20 | Span 20 | Span 20 | Span 20 | Span 20 |
| POLARITY | N | | | | | | N | N | N | N | N | N | N | N | N | N | N | N |
| HLB # | 8.6 | | | | | | 8.6 | 8.6 | 8.6 | 8.6 | 8.6 | 8.6 | 8.6 | 8.6 | 8.6 | 8.6 | 8.6 | 8.6 |
| % in Bath | 15. | | | | | | 15. | 15. | 15. | 15. | 15. | 15. | 15. | 15. | 15. | 15. | 15. | 15. |
| SOLVENT | isobutanol | | | | | | xylene | xylene | xylene | xylene | xylene | xylene | xylene | xylene | xylene | xylene | xylene | isobutanol |
| % in Bath | 15 | | | | | | 15. | 15. | 15. | 15. | 15. | 15. | 15. | 15. | 15. | 15. | 15. | 15 |
| PROCESS BATH | | | | | | | | | | | | | | | | | | |
| % Solids | 17.44 | 17.44 | 17.44 | 17.44 | 17.44 | 17.44 | 17.44 | 17.44 | 17.44 | 17.44 | 17.44 | 17.44 | 17.44 | 17.44 | 17.44 | 17.44 | 17.44 | 17.44 |
| Bath pH | 6.2 | 6.2 | 6.2 | 6.2 | 6.2 | 6.2 | 6.1 | 6.1 | 6.1 | 6.1 | 6.1 | 6.1 | 6.1 | 6.1 | 6.1 | 6.1 | 6.1 | 6.2 |
| Cond. (μmhos) | 740 | 740 | 740 | 740 | 740 | 740 | 640 | 640 | 640 | 640 | 640 | 640 | 700 | 700 | 700 | 700 | 700 | 1100 |
| DC Volts | 100 | 100 | 200 | 200 | 300 | 300 | 100 | 100 | 150 | 150 | 200 | 200 | 100 | 100 | 150 | 150 | 200 | 100 |
| Final Amps | — | — | — | — | — | — | 0 | 0 | 0 | 0 | 0 | 0 | 0 | 0 | .3 | .3 | 1.0 | 0 |
| Coulombs | 6 | 7 | 8 | 8 | 11 | 11 | 8 | 8 | 9 | 9 | 11 | 11 | 11 | 12 | 29 | 42 | 106 | 13 |
| TEST RESULTS | | | | | | | | | | | | | | | | | | |
| THICKNESS (mil) | 0.4 | 0.3 | 0.9 | 1.0 | 1.8 | 1.8 | 1.6 | 1.6 | 2.1 | 2.0 | 2.3 | 2.5 | 2.3 | 2.5 | 3.4 | 3.2 | 3.8 | 1.5 |
| APPEARANCE | S | S | S | S | S | S | S | S | S | S | S | S | S | S | S | S | S | S |
| Density (g/cc) | 2.18 | 3.48 | 1.45 | 1.40 | 1.11 | 4.11 | 0.71 | 0.96 | 0.91 | 1.05 | 1.14 | 1.05 | 1.02 | 0.94 | 0.97 | 0.98 | 0.96 | 0.93 |
| Coul/gram | 60 | 58 | 53 | 50 | 48 | 48 | 62 | 47 | 41 | 38 | 37 | 37 | 41 | 44 | 76 | 117 | 253 | 81 |
| Coul./mil. | 15.0 | 23.2 | 8.9 | 8.0 | 6.1 | 6.1 | 5.0 | 5.0 | 4.3 | 4.5 | 4.8 | 4.4 | 4.8 | 4.8 | 8.5 | 13.1 | 27.9 | 8.7 |

| | 19 | 20 | 21 | 22 | 23 | 24 | 25 | 26 | 27 | 28 | 29 | 30 | 31 |
|---|---|---|---|---|---|---|---|---|---|---|---|---|---|
| Panel Net Gain (gms) | 0.16 | 0.36 | 0.33 | 0.44 | 0.14 | 0.14 | 0.21 | 0.19 | 0.06 | — | — | 0.12 | 0.12 |
| Surfactant | Span 20 | Span 20 | Span 20 | Span 20 | Tween 40 | Tween 40 | Tween 40 | Tween 40 | Tween 40 | Tween 40 | Tween 40 | Pluronic L-42 | Pluronic L-42 |
| Polarity | N | N | N | N | N | N | N | N | N | N | N | N | N |
| HLB # | 8.6 | 8.6 | 8.6 | 8.6 | 15.6 | 15.6 | 15.6 | 15.6 | 15.6 | 15.6 | 15.6 | 8 | 8 |
| % In Bath | 15 | 15 | 14.9 | 14.9 | 14.9 | 14.9 | 14.9 | 15. | 15. | 15. | 15 | 14.9 | 14.9 |
| Solvent | Isobutanol | Isobutanol | Isobutanol | Isobutanol | | | | | | Xylene | Isobutanol | | |
| % In Bath | 15. | 15. | 15. | 15. | 0 | 0 | 0 | 0 | 0 | 15% | 15% | 0 | 0 |
| Process Bath | | | | | | | | | | | | | |
| % Solids | 17.44 | 17.44 | 17.44 | 17.44 | 17.44 | 17.44 | 17.44 | 17.44 | 17.44 | 17.44 | 17.44 | 17.58 | 17.58 |
| Bath pH | 6.2 | 6.2 | 6.2 | 6.2 | 6.1 | 6.1 | 6.1 | 6.1 | 6.1 | 6.1 | 6.1 | 6.0 | 6.0 |
| Cond (μmhos) | 1100 | 1100 | 1100 | 1100 | 680 | 680 | 680 | 680 | 680 | 740 | 760 | 900 | 900 |
| DC Volts | 100 | 150 | 150 | 200 | 100 | 100 | 150 | 150 | 200 | | | 100 | 100 |
| Final Amps | 0 | 0.10 | 0.10 | 1.4 | 0 | 0 | 0 | 0 | 2.0 | | | | |
| Coulombs | 14 | 22 | 21 | 151 | 12 | 13 | 14 | 14 | 229 | | | 6 | 6 |
| Test Results | | | | | | | | | | | | | |
| Thickness (Mil) | 1.5 | 2.9 | 3.2 | 3.8 | 1.4 | 1.5 | 2.2 | 1.8 | — | — | — | 0.7 | 0.7 |
| Appearance | Gl/Ev | Gl/Ev | Gl/Ev | Gl/runs | Gl/F | Gl/Ev | Gl/F | US | US | US | US | S | S |
| Density (g/cc) | 0.93 | 1.08 | 0.90 | 1.01 | 0.87 | 0.81 | 0.83 | 0.92 | | | | 1.49 | 1.49 |
| Coul/Gram | 88 | 61 | 64 | 343 | 86 | 93 | 67 | 74 | | | | 50 | 50 |
| Coul/mil. | 9.3 | 7.6 | 6.6 | 39.7 | 8.6 | 8.7 | 7.0 | 7.8 | | | | 8.6 | 8.7 |

| | 32 | 33 | 34 | 35 | 36 | 37 | 38 | 39 | 40 | 41 | 42 |
|---|---|---|---|---|---|---|---|---|---|---|---|
| Panel Net Gain (gms) | 0.13 | 0.10 | 0.19 | 0.13 | 0.18 | 0.18 | 0.22 | 0.22 | 0.25 | 0.28 | 0.13 |
| Surfactant | Pluronic L-42 | Pluronic L-42 | Pluronic 42 | Pluronic L-42 | Pluronic L-42 | Pluronic L-42 | Pluronic L-42 | Pluronic L-42 | Pluronic L-42 | Pluronic 42 | Pluronic L-42 |
| Polarity | N | N | N | N | N | N | N | N | N | N | N |
| HLB # | 8 | 8 | 8 | 8 | 8 | 8 | 8 | 8 | 8 | 8 | 8 |
| % In Bath | 14.9 | 14.9 | 14.9 | 14.9 | 14.9 | 14.9 | 14.9 | 14.9 | 14.9 | 14.9 | 14.9 |
| Solvent | | | | | | Xylene | Xylene | Xylene | Xylene | Xylene | Isobutonal |
| % In Bath | 0 | | | | | 14.9 | 14.9 | 14.9 | 14.9 | 14.9 | 14.9 |

TABLE I-continued

| Process Bath | | | | | | | | | | | |
|---|---|---|---|---|---|---|---|---|---|---|---|
| % Solids | 17.58 | 17.58 | 17.58 | 17.58 | 17.58 | 17.58 | 17.58 | 17.58 | 17.58 | 17.58 | 17.58 |
| Bath pH | 6.0 | 6.0 | 6.0 | 6.0 | 6.0 | 6.0 | 6.0 | 6.0 | 6.0 | 6.0 | 6.0 |
| Cond (μmhos) | 900 | 900 | 900 | 900 | 780 | 780 | 780 | 780 | 780 | 780 | 850 |
| DC Volts | 150 | 200 | 200 | 200 | 100 | 100 | 150 | 150 | 200 | 200 | 100 |
| Final Amps | 0 | 0 | 0 | 0 | 0 | 0 | 0 | 0 | 0 | 0 | 0 |
| Coulombs | 7 | 8 | 7 | 7 | 8 | 8 | 10 | 10 | 12 | 13 | 7 |
| Test Results | | | | | | | | | | | |
| Thickness (mil) | 0.9 | 1.1 | 1.3 | 1.7 | 1.5 | 1.9 | 1.9 | 2.2 | 2.3 | 0.95 |
| Appearance | S | US | S | S | S | S | S | S | S | |
| Density (g/cc) | 1.26 | 1.51 | 0.87 | 0.92 | 1.05 | 1.01 | 1.01 | 0.99 | 1.06 | |
| Coul/gram | 54 | 42 | 54 | 44.4 | 44.4 | 45.5 | 45.5 | 48 | 46.4 | |
| Coul/mil. | 7.8 | 7.3 | 5.4 | 4.7 | 5.3 | 5.3 | 5.3 | 5.5 | 5.7 | |

| | 43 | 44 | 47A | 48A | 49A | 50A | 51A | 52A | 53A | 54A | 55A |
|---|---|---|---|---|---|---|---|---|---|---|---|
| Panel Net Gain (gms) | 0.16 | 0.22 | 0.13 | 0.13 | 0.16 | 0.16 | 0.22 | 0.22 | 0.11 | 0.11 | 0.13 |
| Surfactant | Pluronic L-42 | Pluronic L44 | Pluronic L42 | Pluronic L42 | Pluronic L42 | Pluronic L42 | Pluronic L42 | Pluronic L42 | Pluronic L42 | Pluronic L44 | Pluronic L44 |
| Polarity | N | N | N | N | N | N | N | N | N | N | N |
| HLB # | 8 | 16 | 8 | 8 | 8 | 8 | 8 | 8 | 16 | 16 | 16 |
| % In Bath | 14.9 | 23.58 | 23.58 | 23.58 | 23.58 | 23.58 | 23.58 | 23.58 | 23.58 | 23.58 | 23.58 |
| Solvent | Isobutanol | Isobutanol | Isobutanol | Isobutanol | Isobutanol | Isobutanol | Isobutanol | Isobutanol | | | |
| % In Bath | 14.9 | 14.9 | 23.58 | 23.58 | 23.58 | 23.58 | 23.58 | 23.58 | | | |
| Process Bath | | | | | | | | | | | |
| % Solids | 17.58 | 17.58 | 17.58 | 17.58 | 17.58 | 17.58 | 17.58 | 17.58 | 17.58 | 17.58 | 17.58 |
| Bath pH | 6.0 | 6.0 | 6.0 | 6.0 | 6.0 | 6.0 | 6.0 | 6.0 | 6.0 | 6.0 | 6.0 |
| Cond (μmhos) | 850 | 850 | 850 | 850 | 850 | 850 | 850 | 850 | 720 | 720 | 720 |
| DC Volts | 150 | 200 | 100 | 100 | 150 | 150 | 200 | 200 | 100 | 100 | 150 |
| Final Amps | 0 | 0 | 0 | 0 | 0 | 0 | 0 | 0 | 0 | 0 | 0 |
| Coulombs | 8 | 10.5 | 7 | 7 | 8 | 8 | 11 | 10 | 6 | 6 | 7 |
| Test Results | | | | | | | | | | | |
| Thickness (mil) | 1.45 | 2.05 | 1.0 | .9 | 1.4 | 1.5 | 2.0 | 2.1 | .7 | .6 | 1.2 |
| Appearance | | | S | S | S | S | PR | US | US | US | US |
| Density (g/cc) | | | 1.13 | 1.26 | 1.00 | 0.93 | 0.96 | 0.91 | 1.37 | 1.60 | 0.94 |
| Coul/gram | | | 53.8 | 53.8 | 50 | 50 | 50 | 45.5 | 54.5 | 54.5 | 53.8 |
| Coul/mil. | | | 7 | 7.7 | 5.7 | 5.3 | 5.5 | 4.8 | 8.6 | 10 | 5.8 |

| | 56A | 57A | 58A | 59A | 60A | 61A | 62A | 63A | 64A | 65A | 66A |
|---|---|---|---|---|---|---|---|---|---|---|---|
| Panel Net Gain (gms) | 0.13 | 0.19 | 0.18 | 0.18 | 0.19 | 0.26 | 0.25 | 0.34 | 0.37 | 0.22 | 0.22 |
| Surfactant | Pluronic L44 | Pluronic L44 | Pluronic L44 | Pluronic L44 | Pluronic L44 | Pluronic L44 | Pluronic L44 | Pluronic L44 | Pluronic L44 | Pluronic L44 | Pluronic L44 |
| Polarity | N | N | N | N | N | N | N | N | N | N | N |
| HLB # | 16 | 16 | 16 | 16 | 16 | 16 | 16 | 16 | 16 | 16 | 16 |
| % In Bath | 23.58 | 23.58 | 23.58 | 23.58 | 23.58 | 23.58 | 23.58 | 23.58 | 23.58 | 23.58 | 23.58 |
| Solvent | | | | Xylene | Xylene | Xylene | Xylene | Xylene | Xylene | Isobutanol | Isobutanol |
| % In Bath | | | | 23.58 | 23.58 | 23.58 | 23.58 | 23.58 | 23.58 | 23.58 | 23.58 |
| Process Bath | | | | | | | | | | | |
| % Solids | 17.58 | 17.58 | 17.58 | 17.58 | 17.58 | 17.58 | 17.58 | 17.58 | 17.58 | 17.58 | 17.58 |
| Bath pH | 6.0 | 6.0 | 6.0 | 6.0 | 6.1 | 6.1 | 6.1 | 6.1 | 6.1 | 6.1 | 6.1 |
| Cond (μmhos) | 720 | 720 | 720 | 640 | 640 | 640 | 640 | 640 | 640 | 740 | 740 |
| DC Volts | 150 | 200 | 200 | 100 | 100 | 150 | 150 | 200 | 200 | 100 | 100 |
| Final Amps | 0 | 0 | 0 | 0 | 0 | 0 | 0 | .1 | .2 | 0 | 0 |
| Coulombs | 7 | 10 | 9 | 9 | 9 | 12 | 12 | 15 | 15 | 11 | 12 |
| Test Results | | | | | | | | | | | |

TABLE I-continued

| | 67A | 68A | 69A | 70A | 71A | 72A | 73A | 74A | 75A | 76A | 77A | 78A |
|---|---|---|---|---|---|---|---|---|---|---|---|---|
| Thickness (mil) | 1.5 | 3.0 | 3.0 | 1.7 | 1.6 | 2.2 | 2.1 | 2.4 | 2.9 | 2.9 | 2.9 | 3.1 |
| Appearance | US | US | US | US | US | US | US | US | US | US | US | US |
| Density (g/cc) | 0.75 | 0.55 | 0.52 | 0.92 | 1.04 | 1.03 | 1.04 | 1.24 | 1.11 | 0.66 | 0.66 | 0.62 |
| Coul/gram | 53.8 | 52.6 | 50 | 50 | 47.4 | 46.2 | 48 | 44.1 | 64.9 | 50 | 50 | 54.5 |
| Coul/mil | 4.7 | 3.3 | 3 | 5.3 | 5.6 | 5.5 | 5.7 | 6.3 | 8.3 | 3.8 | 3.8 | 3.9 |

| | 67A | 68A | 69A | 70A | 71A | 72A | 73A | 74A | 75A | 76A | 77A | 78A |
|---|---|---|---|---|---|---|---|---|---|---|---|---|
| Panel Net Gain (gms) | 0.27 | 0.27 | 0.44 | .14 | .13 | .17 | .16 | .21 | .21 | .21 | .22 | .25 |
| Surfactant | Triton X35 | Pluronic L44 | Pluronic L44 | Triton X35 | Triton X35 | Triton X35 | Triton X35 | Triton X35 | Triton X35 | Triton X35 | Triton X35 | Triton X35 |
| Polarity | N | N | N | N | N | N | N | N | N | N | N | N |
| HLB # | 16 | 16 | 16 | 8 | 8 | 8 | 8 | 8 | 8 | 8 | 8 | 8 |
| % In Bath | 23.58 | 23.58 | 23.58 | 23.56 | 23.56 | 23.56 | 23.56 | 23.56 | 23.56 | 23.58 | 23.58 | 23.58 |
| Solvent | Isobutanol | Isobutanol | Isobutanol | | | | | | | Xylene | Xylene | Xylene |
| % In Bath | 23.58 | 23.58 | 23.58 | | | | | | | 23.58 | 23.58 | 23.58 |
| Process Bath | | | | | | | | | | | | |
| % Solids | 17.58 | 17.58 | 17.58 | 17.29 | 17.29 | 17.29 | 17.29 | 17.29 | 17.29 | 17.29 | 17.29 | 17.29 |
| Bath pH | 6.1 | 6.1 | 6.1 | 6.0 | 6.0 | 6.0 | 6.0 | 6.0 | 6.0 | 6.0 | 6.0 | 6.0 |
| Cond (μmhos) | 740 | 740 | 740 | 740 | 740 | 740 | 740 | 740 | 740 | 730 | 730 | 730 |
| DC Volts | 150 | 150 | 200 | 100 | 100 | 150 | 150 | 200 | 200 | 100 | 100 | 150 |
| Final Amps | 0 | 0 | 1.0 | 0 | 0 | 0 | 0 | 0 | 0 | 0 | 0 | 0 |
| Coulombs | 14 | 14 | 80 | 8 | 8 | 9 | 9 | 11 | 11 | 9 | 10 | 11 |
| Test Results | | | | | | | | | | | | |
| Thickness (mil) | 3.1 | 3.0 | 3.8 | 1.2 | 1.0 | 1.4 | 1.4 | 1.8 | 1.8 | 1.6 | 1.6 | 1.9 |
| Appearance | US | US | US | US | US | US | US | S | S | S | S | S |
| Density (g/cc) | 0.76 | 0.78 | 1.01 | 1.02 | 1.13 | 1.06 | 1.00 | 1.02 | 1.02 | 1.14 | 1.20 | 1.15 |
| Coul/gram | 51.9 | 51.9 | 181.8 | 57 | 62 | 53 | 56 | 52 | 52 | 43 | 45 | 44 |
| Coul/mil | 4.5 | 4.7 | 21.1 | 6.67 | 8.00 | 6.43 | 6.43 | 6.11 | 6.11 | 5.62 | 6.25 | 5.79 |

| | 79A | 80A | 81A | 82A | 83A | 84A | 85A | 86A | 87A | 88A | 89A | 90A | 91A |
|---|---|---|---|---|---|---|---|---|---|---|---|---|---|
| Panel Net Gain (gms) | .25 | .35 | .33 | 0.15 | 0.14 | 0.19 | 0.20 | 0.26 | 0.26 | .26 | .25 | .31 | .31 |
| Surfactant | Triton X35 | Triton X35 | Triton X35 | Triton X35 | Triton X35 | Triton X35 | Triton X35 | Triton X35 | Triton X35 | Triton 165 | Triton 165 | Triton 165 | Triton 165 |
| Polarity | N | N | N | N | N | N | N | N | N | N | N | N | N |
| HLB # | 8 | 8 | 8 | 8 | 8 | 8 | 8 | 8 | 8 | 16 | 16 | 16 | 16 |
| % In Bath | 23.58 | 23.58 | 23.58 | 23.58 | 23.58 | 23.58 | 23.58 | 23.58 | 23.58 | 23.58 | 23.58 | 23.58 | 23.58 |
| Solvent | Xylene | Xylene | Xylene | Isobutanol | Isobutanol | Isobutanol | Isobutanol | Isobutanol | Isobutanol | | | | |
| % In Bath | 23.58 | 23.58 | 23.58 | 23.58 | 23.58 | 23.58 | 23.58 | 23.58 | 23.58 | 0 | 0 | 0 | 0 |
| Process Bath | | | | | | | | | | | | | |
| % Solids | 17.29 | 17.29 | 17.29 | 17.29 | 17.29 | 17.29 | 17.29 | 17.29 | 17.29 | 17.29 | 17.29 | 17.29 | 17.29 |
| Bath pH | 6.0 | 6.0 | 6.0 | 6.0 | 6.0 | 6.0 | 6.0 | 6.0 | 6.0 | 6.2 | 6.2 | 6.2 | 6.2 |
| Cond (μmhos) | 730 | 730 | 730 | 920 | 920 | 920 | 920 | 920 | 920 | 700 | 700 | 700 | 700 |
| DC Volts | 150 | 200 | 200 | 100 | 100 | 150 | 150 | 200 | 200 | 100 | 100 | 150 | 150 |
| Final Amps | 0 | 0 | 0 | 0 | 0 | 0 | 0 | 0 | 0 | 0 | 0 | 0 | 0 |
| Coulombs | 12 | 14 | 15 | 9 | 10 | 11 | 12 | 15 | 14 | 15 | 15 | 17 | 17 |
| Test Results | | | | | | | | | | | | | |
| Thickness (mil) | 1.9 | 2.9 | 2.7 | 1.2 | 1.2 | 1.6 | 1.6 | 2.1 | 2.1 | 2.1 | 2.0 | 2.8 | 2.8 |
| Appearance | S | S | S | S | S | S | S | S | S | S | S | S | S |
| Density (g/cc) | 1.15 | 1.05 | 1.06 | 1.09 | 1.02 | 1.04 | 1.09 | 1.08 | 1.08 | 1.08 | 1.09 | 0.96 | 0.96 |
| Coul/gram | 48 | 40 | 39 | 60 | 71 | 58 | 60 | 58 | 54 | 58 | 60 | 55 | 55 |
| Coul/mil | 6.32 | 4.83 | 4.81 | 7.50 | 8.33 | 6.88 | 7.50 | 7.14 | 7.00 | 7.14 | 7.50 | 6.07 | 6.07 |

| | 92A | 93A | 94A | 95A | 96A | 97A | 98A | 99A | 1B | 2B | 3B | 4B | 5B |
|---|---|---|---|---|---|---|---|---|---|---|---|---|---|
| Panel Net Gain (gms) | .31 | .35 | .31 | .28 | .42 | .41 | .44 | .45 | .24 | .23 | .30 | .31 | .44 |

TABLE I-continued

| | 6B | 7B | 8B | 9B | 10B | 11B | 12B | 13B | 14B | 15B |
|---|---|---|---|---|---|---|---|---|---|---|
| Surfactant | Triton 165 | Triton 165 | Triton 165 | Triton 165 | Triton 165 | Triton 165 | Triton 165 | Triton 165 | Triton 165 | Triton 165 |
| Polarity | N | N | N | N | N | N | N | N | N | N |
| HLB # | 16 | 16 | 16 | 16 | 16 | 16 | 16 | 16 | 16 | 16 |
| % In Bath | 23.58 | 23.58 | 23.58 | 23.58 | 23.58 | 23.58 | 23.58 | 23.58 | 23.58 | 23.58 |
| Solvent | | | Xylene | Xylene | Xylene | Xylene | Isobutanol | Isobutanol | Isobutanol | Isobutanol |
| % In Bath | 0 | 0 | 23.58 | 23.58 | 23.58 | 23.58 | 23.58 | 23.58 | 23.58 | 23.58 |
| Process Bath | | | | | | | | | | |
| % Solids | 17.29 | 17.29 | 17.29 | 17.29 | 17.29 | 17.29 | 17.29 | 17.29 | 17.29 | 17.29 |
| Bath pH | 6.2 | 6.2 | 6.1 | 6.1 | 6.1 | 6.1 | 6.2 | 6.2 | 6.2 | 6.2 |
| Cond (μmhos) | 700 | 700 | 680 | 680 | 680 | 680 | 860 | 860 | 860 | 860 |
| DC Volts | 200 | 200 | 100 | 100 | 150 | 200 | 100 | 100 | 150 | 200 |
| Final Amps | 0 | 0 | 0 | 0.4 | 0.4 | 0.4 | 0 | 0 | 0.1 | 0.1 |
| Coulombs | 17 | 18 | 24 | 56 | 55 | 59 | 14 | 14 | 16 | 17 |
| Test Results | | | | | | | | | | |
| Thickness (mil) | 3.2* | 3.2 | 2.6 | 3.4 | 3.3 | 3.4 | 2.0 | 2.0 | 2.5 | 2.6 |
| Appearance S | S | S | US | S | S | S | S | S | S | S |
| Density (g/cc) | 0.84 | 0.95 | 1.04 | 1.08 | 1.08 | 1.13 | 1.05 | 1.05 | 1.05 | 1.04 |
| Coul/gram | 55 | 51 | 77 | 133 | 134 | 134 | 58 | 61 | 53 | 55 |
| Coul/mil. | 5.31 | 5.62 | 9.2 | 16.5 | 16.7 | 17.4 | 7.0 | 7.0 | 6.4 | 6.5 |

| Panel Net Gain (gms) | .29 | .28 | .28 | .28 | .59 | .27 | .28 | .36 | .35 | .47 |
|---|---|---|---|---|---|---|---|---|---|---|
| Surfactant | Ethoquad C25 | Ethoquad C25 | Ethoquad C25 | Ethoquad C25 | Ethoquad C25 | Ethoquad C25 | Ethoquad C25 | Ethoquad C25 | Ethoquad C25 | Ethoquad C25 |
| Polarity | Cationic | Cationic | Cationic | Cationic | Cationic | Cationic | Cationic | Cationic | Cationic | Cationic |
| HLB # | 15.4 | 15.4 | 15.4 | 15.4 | 15.4 | 15.4 | 15.4 | 15.4 | 15.4 | 15.4 |
| % In Bath | 23.58 | 23.58 | 23.58 | 23.58 | 23.58 | 23.58 | 23.58 | 23.58 | 23.58 | 23.58 |
| Solvent | | | | | | Xylene | Xylene | Xylene | Xylene | Xylene |
| % In Bath | 0 | 0 | 0 | 0 | 0 | 23.58 | 23.58 | 23.58 | 23.58 | 23.58 |
| Process Bath | | | | | | | | | | |
| % Solids | 17.29 | 17.29 | 17.29 | 17.29 | 17.29 | 17.29 | 17.29 | 17.29 | 17.29 | 17.29 |
| Bath pH | 6.1 | 6.1 | 6.1 | 6.1 | 6.1 | 6.1 | 6.1 | 6.1 | 6.1 | 6.1 |
| Cond (μmhos) | 980 | 980 | 980 | 980 | 980 | 890 | 890 | 890 | 890 | 890 |
| DC Volts | 100 | 100 | 150 | 150 | 200 | 100 | 100 | 150 | 150 | 200 |
| Final Amps | .10 | .10 | .20 | .20 | 1.7 | .10 | .10 | .20 | .20 | 3.4 |
| Coulombs | 39 | 39 | 36 | 36 | 176 | 32 | 31 | 33 | 33 | 320 |
| Test Results | | | | | | | | | | |
| Thickness (mil) | 2.5 | 2.4 | 2.3 | 2.1 | 4.2 | 2.6 | 2.6 | 3.0 | 4.0 | 5.3 |
| Appearance S | S | US | US | PR | US | US | US | US | US | |
| Density (g/cc) | 1.01 | 1.02 | 1.06 | 1.16 | 1.22 | 0.91 | 0.94 | 1.05 | 0.76 | 0.77 |
| Coul/gram | 134 | 139 | 129 | 129 | 293 | 118 | 111 | 92 | 94 | 681 |
| Coul/mil. | 15.6 | 16.2 | 15.7 | 7.1 | 41.9 | 12.3 | 11.9 | 11.0 | 8.2 | 60.3 |

| | 16B | 17B | 18B | 19B | 20B | 21B |
|---|---|---|---|---|---|---|
| | .28 | .30 | .49 | .45 | .21 | .55 |
| | Ethoquad C25 | Ethoquad C25 | Ethoquad C25 | Ethoquad C25 | Ethoquad C25 | Miranol CM-SF |
| | Cationic | Cationic | Cationic | Cationic | Cationic | Amphoteric |
| | 15.4 | 15.4 | 15.4 | 15.4 | 15.4 | |
| | 23.58 | 23.58 | 23.58 | 23.58 | 23.58 | 23.56 |
| | Isobutanol | Isobutanol | Isobutanol | Isobutanol | Isobutanol | |
| | 23.58 | 23.58 | 23.58 | 23.58 | 23.58 | 0 |
| | 17.29 | 17.29 | 17.29 | 17.29 | 17.29 | 17.29 |

Panel Net Gain (gms)
Surfactant
Polarity
HLB #
% In Bath
Solvent
% In Bath
Bath
% Solids

TABLE I-continued

| Bath pH | 6.1 | 6.1 | 6.1 | 6.1 | 6.1 | 6.0 |
|---|---|---|---|---|---|---|
| Cond (μmhos) | 1240 | 1240 | 1240 | 1240 | 1240 | 920 |
| DC Volts | 100 | 100 | 150 | 150 | 200 | 100 |
| Final Amps | .10 | .10 | .40 | .60 | 4.0 | 2.0 |
| Coulombs | 36 | 37 | 55 | 66 | 357 | 95 |
| Test Results | | | | | | |
| Thickness (mil) 2.4 | 2.5 | 3.4 | 3.2 | 1.5 | 4.8 | PR |
| Appearance | US | US | US | US | US | 1.00 |
| Density (g/cc) | 1.02 | 1.05 | 1.26 | 1.25 | 1.22 | 173 |
| Coul/gram | 129 | 123 | 112 | 147 | 1700 | 19.8 |
| Coul/mil. | 15.0 | 14.8 | 16.2 | 20.6 | 238.0 | |

TABLE II

| Number | 38B | 39B | 40B | 41B | 42B | 43B | 55D | 56D | 57D | 58D | 59D | 60D |
|---|---|---|---|---|---|---|---|---|---|---|---|---|
| Wt. Gain | .12 | .13 | .17 | .17 | .26 | .26 | .35 | .31 | .60 | .69 | .54 | .51 |
| Surfactant | Span 20 | Span 20 | | | | | Span 20 | Span 20 | Span 20 | Span 20 | Span 20 | Span 20 |
| Polarity | Nonionic | Nonionic | | | | | Nonionic | Nonionic | Nonionic | Nonionic | Nonionic | Nonionic |
| HLB # | 8.6 | 8.6 | | | | | 8.6 | 8.6 | 8.6 | 8.6 | 8.6 | 8.6 |
| Solvent | Xylene | Xylene | | | | | | | | | | Xylene |
| Bath pH | 7.8 | 7.8 | 8.0 | 8.0 | 8.0 | 8.0 | 7.4 | 7.4 | 7.4 | 7.4 | 7.4 | 7.8 |
| Cond. (μmhos) | 740 | 740 | 660 | 660 | 660 | 660 | 620 | 620 | 620 | 620 | 620 | 740 |
| D.C. Volts | 100 | 100 | 150 | 150 | 200 | 200 | 100 | 100 | 150 | 150 | 200 | 100 |
| Final Amps | 0 | 0 | 0 | 0 | .1 | .1 | .20 | .20 | .30 | .40 | | .7 |
| Coulombs | 11 | 11 | 15 | 16 | 22 | 22 | 22 | 24 | 43 | 49 | 82 | 66 |
| Thickness (Mil) | 1.0 | 0.9 | 1.4 | 1.4 | 2.2 | 2.4 | 2.3 | 2.3 | 4.2 | 5.0 | 4.2 | 3.9 |
| Appearance | S | S | S | S | S | S | US | US | US | US | US | US |
| Density (g/cc) | 1.06 | 1.26 | 1.06 | 1.06 | 1.04 | 0.94 | 1.33 | 1.18 | 1.25 | 1.20 | 1.12 | 1.14 |
| Coul./Gram | 92 | 85 | 88 | 94 | 85 | 85 | 63 | 77 | 72 | 71 | 152 | 129 |
| Coul./Mil | 11.0 | 12.2 | 10.7 | 11.4 | 10.0 | 9.2 | 9.6 | 10.4 | 10.2 | 9.8 | 19.5 | 16.9 |

| Number | 61D | 62D | 63D | 64D | 65D | 66D | 67D | 68D | 69D | 70D | 71D | 72D |
|---|---|---|---|---|---|---|---|---|---|---|---|---|
| Wt. Gain | .45 | .64 | .31 | .32 | .29 | .32 | .60 | .67 | — | .13 | .12 | .14 |
| Surfactant | Span 20 | Span 20 | Span 20 | Span 20 | Span 20 | Span 20 | Span 20 | Span 20 | Span 20 | Tween 40 | Tween 40 | Tween 40 |
| Polarity | Nonionic | Nonionic | Nonionic | Nonionic | Isobutanol | Isobutanol | Isobutanol | Isobutanol | Isobutanol | Nonionic | Nonionic | Nonionic |
| HLB # | 8.6 | 8.6 | 8.6 | 8.6 | 8.6 | 8.6 | 8.6 | 8.6 | 8.6 | 15.6 | 15.6 | 15.6 |
| Solvent | Xylene | Xylene | Xylene | Xylene | | | | | | | | |
| Bath pH | 7.8 | 7.8 | 7.8 | 7.8 | 7.5 | 7.5 | 7.5 | 7.5 | 7.5 | 7.5 | 7.5 | 7.5 |
| Cond. (μmhos) | 740 | 740 | 740 | 740 | 850 | 850 | 850 | 850 | 850 | 660 | 660 | 660 |
| D.C. Volts | 100 | 150 | 50 | 50 | 100 | 100 | 150 | 150 | 200 | 100 | 100 | 150 |
| Final Amps | .7 | 1.4 | .2 | .2 | .20 | .20 | .30 | .40 | — | 0 | 0 | 0 |
| Coulombs | 77 | 157 | 30 | 30 | 24 | 25 | 46 | 52 | — | 14 | 14 | 16 |
| Thickness (Mil) | 3.7 | 4.2 | 2.5 | 2.3 | 2.6 | 2.6 | 4.4 | 5.3 | — | 0.9 | 0.8 | 0.8 |
| Appearance | US | US | S | US | S | S | US | US | | S | S | US |
| Density (g/cc) | 1.06 | 1.33 | 1.08 | 1.21 | 0.97 | 1.07 | 1.19 | 1.10 | | 1.26 | 1.31 | 1.53 |
| Coul./Gram | 171 | 245 | 97 | 94 | 83 | 78 | 77 | 78 | | 108 | 117 | 114 |
| Coul./Mil | 20.8 | 37.4 | 12.0 | 13.0 | 9.2 | 9.6 | 10.4 | 9.8 | | 18.9 | 17.5 | 20.0 |

| Number | 73D | 74D | 75D | 76D | 77D | 78D | 79D | 80D | 81D | 82D | 83D | 84D |
|---|---|---|---|---|---|---|---|---|---|---|---|---|
| Wt. Gain | .16 | .75 | .24 | .39 | .63 | .13 | .14 | .17 | .18 | .62 | .64 | .11 |
| Surfactant | Tween 40 | Tween 40 | Tween 40 | Tween 40 | Tween 40 | Tween 40 | Tween 40 | Tween 40 | Tween 40 | Tween 40 | Tween 40 | Tween 40 |
| Polarity | Nonionic | Nonionic | Nonionic | Nonionic | Nonionic | Nonionic | Nonionic | Nonionic | Nonionic | Nonionic | Nonionic | Nonionic |
| HLB # | 15.6 | 15.6 | 15.6 | 15.6 | 15.6 | 15.6 | 15.6 | 15.6 | 15.6 | 15.6 | 15.6 | 15.6 |
| Solvent | | | Xylene | Xylene | Xylene | Xylene | Xylene | Isobutanol | Isobutanol | Isobutanol | Isobutanol | Isobutanol |
| Bath pH | 7.5 | | 7.7 | 7.7 | 7.7 | 7.7 | 7.7 | 7.7 | 7.7 | 7.7 | 7.7 | 7.7 |
| Cond. (μmhos) | 660 | 660 | 700 | 700 | 700 | 700 | 700 | 900 | 900 | 900 | 900 | 900 |
| D.C. Volts | 150 | 200 | 100 | 100 | 150 | 50 | 50 | 100 | 100 | 100 | 150 | 50 |
| Final Amps | 1.4 | | .10 | .10 | 1.0 | 0 | 0 | 0 | 0 | .1 | .3 | .1 |
| Coulombs | 18 | 120 | 24 | 39 | 96 | 17 | 17 | 15 | 16 | 49 | 58 | 14 |
| Thickness (Mil) | 1.0 | 6.2 | 1.9 | 3.1 | 4.5 | 1.4 | 1.5 | 1.5 | 1.4 | 7 | 7 | 8 |
| Appearance | US | US | S | US | US | S | US | US | US | US | US | S |
| Density (g/cc) | 1.40 | 1.05 | 1.10 | 1.10 | 1.22 | 0.81 | 0.81 | 0.99 | 1.12 | 0.77 | 0.70 | 1.20 |
| Coul./Gram | 112 | 160 | 100 | 100 | 152.4 | 130.8 | 121.4 | 100 | 88.9 | 79 | 90.6 | 127.3 |
| Coul./Mil | 18.0 | 19.4 | 12.6 | 12.6 | 21.3 | 12.1 | 11.3 | 11.3 | 11.4 | 7 | 7.3 | 17.5 |

| Number | 85D | 92B | 93B | 94B | 95B | 96B | 97B | 98B | 99B | 1C | 2C | 3C |
|---|---|---|---|---|---|---|---|---|---|---|---|---|

TABLE II-continued

| Number | 4C | 5C | 6C | 7C | 8C | 9C | 10C | 11C | 12C | 13C | 14C | 15C |
|---|---|---|---|---|---|---|---|---|---|---|---|---|
| Wt. Gain | .12 | .15 | .15 | .18 | .18 | .24 | .25 | .17 | .18 | .23 | .24 | .33 |
| Surfactant | Tween 40 | Pluronic L42 | Pluronic L42 | Pluronic L42 | Pluronic L42 | Pluronic L42 | Pluronic L42 | Pluronic L42 | Pluronic L42 | Pluronic L42 | Pluronic L42 | Pluronic L42 |
| Polarity | Nonionic | Nonionic | Nonionic | Nonionic | Nonionic | Nonionic | Nonionic | Nonionic | Nonionic | Nonionic | Nonionic | Nonionic |
| HLB # | 15.6 | 8 | 8 | 8 | 8 | 8 | 8 | 8 | 8 | 8 | 8 | 8 |
| Solvent | Isobutanol | | | | | | | Xylene | Xylene | Xylene | Xylene | Xylene |
| Bath pH | 7.7 | 7.7 | 7.7 | 7.7 | 7.7 | 7.7 | 7.7 | 7.7 | 7.7 | 7.7 | 7.7 | 7.7 |
| Cond. (μmhos) | 900 | 450 | 450 | 450 | 450 | 450 | 450 | 560 | 560 | 560 | 560 | 560 |
| D.C. Volts | 50 | 100 | 100 | 150 | 150 | 200 | 200 | 100 | 100 | 150 | 150 | 200 |
| Final Amps | 0 | 0 | 0 | 0 | 0 | .10 | .10 | 0 | 0 | .10 | .10 | .20 |
| Coulombs | 14 | 13 | 13 | 15 | 15 | 20 | 21 | 14 | 14 | 19 | 19 | 27 |
| Thickness (Mil) | .7 | 1.1 | 1.1 | 1.4 | 1.4 | 2.0 | 2.0 | 1.2 | 1.2 | 1.9 | 1.8 | 2.9 |
| Appearance | S | S | S | S | S | US | US | S | S | US | US | US |
| Density (g/cc) | 1.49 | 1.19 | 1.19 | 1.12 | 1.12 | 1.05 | 1.09 | 1.24 | 1.31 | 1.06 | 1.16 | 0.99 |
| Coul./Gram | 116.7 | 87 | 87 | 83 | 83 | 83 | 84 | 82 | 78 | 83 | 79 | 82 |
| Coul./Mil | 20 | 11.8 | 11.8 | 10.7 | 10.7 | 10.0 | 10.5 | 11.7 | 11.7 | 10.0 | 10.6 | 9.3 |

| Number | 16C | 17C | 18C | 19C | 20C | 21C | 22C | 23C | 24C | 25C | 26C | 27C |
|---|---|---|---|---|---|---|---|---|---|---|---|---|
| Wt. Gain | .26 | .15 | .17 | .19 | .19 | .20 | .20 | .13 | .13 | .16 | .15 | .26 |
| Surfactant | Pluronic L44 | Pluronic L44 | Pluronic L44 | Pluronic L44 | Pluronic L44 | Pluronic L44 | Pluronic L44 | Pluronic L44 | Pluronic L44 | Pluronic L44 | Pluronic L44 | Pluronic L44 |
| Polarity | Nonionic | Nonionic | Nonionic | Nonionic | Nonionic | Nonionic | Nonionic | Nonionic | Nonionic | Nonionic | Nonionic | Nonionic |
| HLB # | 16 | 16 | 16 | 16 | 16 | 16 | 16 | 16 | 16 | 16 | 16 | 16 |
| Solvent | Xylene | Isobutanol | Isobutanol | Isobutanol | Isobutanol | Isobutanol | Isobutanol | | | | | |
| Bath pH | 7.7 | 7.7 | 7.7 | 7.7 | 7.7 | 7.7 | 7.7 | 7.7 | 7.7 | 7.7 | 7.7 | 7.7 |
| Cond. (μmhos) | 560 | 680 | 680 | 680 | 680 | 680 | 680 | 500 | 500 | 500 | 500 | 500 |
| D.C. Volts | 200 | 100 | 100 | 150 | 150 | 200 | 200 | 100 | 100 | 150 | 150 | 200 |
| Final Amps | .20 | .10 | .10 | .10 | .10 | .10 | .30 | 0 | 0 | .10 | .10 | .20 |
| Coulombs | 30 | 15 | 15 | 16 | 16 | 24 | 43 | 12 | 13 | 14 | 14 | 23 |
| Thickness (Mil) | 3.2 | 1.2 | 1.3 | 1.5 | 1.4 | 2.4 | 3.3 | 0.8 | 0.8 | 1.2 | 1.2 | 2.1 |
| Appearance | US | S | S | S | S | US | US | S | S | S | S | US |
| Density (g/cc) | 1.04 | 1.24 | 1.14 | 1.10 | 1.18 | 0.73 | 0.73 | 1.42 | 1.42 | 1.16 | 1.09 | 1.08 |
| Coul./Gram | 79 | 80 | 88 | 84 | 84 | 120 | 120 | 100 | 92 | 88 | 93 | 88 |
| Coul./Mil | 9.4 | 12.5 | 11.5 | 10.7 | 11.4 | 10.0 | 10.0 | 16.2 | 15.0 | 11.7 | 11.7 | 11.0 |

| Number | 28C | 64C | 65C | 66C | 67C | 68C | 69C | 70C | 71C | 72 | 73C | 74C |
|---|---|---|---|---|---|---|---|---|---|---|---|---|
| Wt. Gain | .30 | .24 | .23 | .32 | .31 | .67 | .72 | .27 | .26 | .52 | .46 | .65 |
| Surfactant | Pluronic L44 | Pluronic L44 | Pluronic L44 | Pluronic L44 | Pluronic L44 | Pluronic L44 | Pluronic L44 | Pluronic L44 | Pluronic L44 | Pluronic L44 | Pluronic L44 | Pluronic L44 |
| Polarity | Nonionic | Nonionic | Nonionic | Nonionic | Nonionic | Nonionic | Nonionic | Nonionic | Nonionic | Nonionic | Nonionic | Nonionic |
| HLB # | 16 | 16 | 16 | 16 | 16 | 16 | 16 | 16 | 16 | 16 | 16 | 16 |
| Solvent | | Xylene | Xylene | Xylene | Xylene | Xylene | Xylene | Isobutanol | Isobutanol | Isobutanol | Isobutanol | Isobutanol |
| Bath pH | 7.7 | 7.8 | 7.8 | 7.8 | 7.8 | 7.8 | 7.8 | 7.8 | 7.8 | 7.8 | 7.8 | 7.8 |
| Cond. (μmhos) | 500 | 550 | 550 | 550 | 550 | 550 | 550 | 600 | 600 | 600 | 600 | 600 |
| D.C. Volts | 200 | 100 | 100 | 150 | 150 | 200 | 200 | 100 | 100 | 150 | 150 | 200 |
| Coulombs | .10 | .10 | .10 | .10 | .10 | .40 | .30 | .10 | .10 | .10 | .10 | .10 |
| Thickness (Mil) | 22 | 14 | 14 | 20 | 20 | 55 | 43 | 12 | 13 | 16 | 16 | 27 |
| Appearance | 2.0 | 1.2 | 1.3 | 1.8 | 1.9 | 3.2 | 3.3 | 0.9 | 1.0 | 1.5 | 1.5 | 2.3 |
| Density (g/cc) | US | US | US | US | US | US | US | S | S | S | S | US |
| | 1.09 | 1.07 | 1.11 | 1.01 | 1.04 | 1.03 | 1.26 | 1.13 | 0.99 | 0.93 | 1.14 | |
| Coul./Gram | 85 | 93 | 88 | 87 | 91 | 145 | 110 | 92 | 100 | 94 | 100 | 90 |
| Coul./Mil | 11.0 | 11.7 | 10.8 | 11.1 | 10.5 | 17.2 | 13.0 | 13.3 | 13.0 | 10.7 | 10.7 | 11.7 |

| Number | 28C | 64C | 65C | 66C | 67C | 68C | 69C | 70C | 71C | 72 | 73C | 74C |
|---|---|---|---|---|---|---|---|---|---|---|---|---|
| Wt. Gain | .30 | .24 | .23 | .32 | .31 | .67 | .72 | .27 | .26 | .52 | .46 | .65 |

TABLE II-continued

| Number | 75C | 76C | 77C | 78C | 79C | 80C | 81C | 82C | 83C | 84C | 85C | 86C |
|---|---|---|---|---|---|---|---|---|---|---|---|---|
| Wt. Gain | .61 | .26 | .27 | .35 | .34 | .72 | .72 | .09 | .12 | .19 | .17 | .39 |
| Surfactant | Triton X35 | Triton X35 | Triton X35 | Triton X35 | Triton X35 | Triton X35 | Triton X35 | Triton X35 | Triton X35 | Triton X35 | Triton X35 | Triton X35 |
| Polarity | Nonionic | Nonionic | Nonionic | Nonionic | Nonionic | Nonionic | Nonionic | Nonionic | Nonionic | Nonionic | Nonionic | Nonionic |
| HLB # | 8 | 8 | 8 | 8 | 8 | 8 | 8 | 16 | 16 | 16 | 16 | 16 |
| Solvent | Xylenes | Isobutanol | Isobutanol | Isobutanol | Isobutanol | Isobutanol | | Xylenes | Xylenes | Xylenes | Xylenes | Xylenes |
| Bath pH | 7.5 | 7.5 | 7.5 | 7.5 | 7.5 | 7.5 | 7.5 | 7.5 | 7.5 | 7.5 | 7.5 | 7.5 |
| Cond. (μmhos) | 990 | 700 | 700 | 700 | 700 | 700 | 700 | 990 | 990 | 990 | 990 | 990 |
| D.C. Volts | 200 | 100 | 100 | 150 | 150 | 200 | 200 | 100 | 100 | 150 | 150 | 200 |
| Final Amps | 1.2 | 0.1 | 0.1 | 0.1 | 0.2 | 0.8 | 0.9 | 0.1 | 0.1 | 0.3 | 0.3 | 1.0 |
| Coulombs | 117 | 21 | 22 | 27 | 28 | 71 | 82 | 21 | 21 | 39 | 40 | 109 |
| Thickness (Mil) | 4.4 | 2.2 | 2.2 | 2.7 | 2.8 | 3.4 | 3.3 | 2.1 | 1.9 | 3.3 | 3.8 | 4.8 |
| Appearance | PR | S | S | S | PR | PR | PR | S | S | S | US | PR |
| Density (g/cc) | 1.21 | 1.03 | 1.07 | 1.13 | 1.06 | 1.72 | 1.90 | 1.12 | 1.19 | 1.37 | 1.06 | 1.18 |
| Coul./Gram | 192 | 81 | 81 | 77 | 82 | 106 | 114 | 78 | 81 | 75 | 87 | 168 |
| Coul./Mil | 26.59 | 9.54 | 10.00 | 10.00 | 10.00 | 20.88 | 24.85 | 10.00 | 11.05 | 11.82 | 10.53 | 22.70 |

| Number | 87C | 88C | 89C | 90C | 91C | 92C | 93C | 94C | 95C | 96C | 97C | 98C |
|---|---|---|---|---|---|---|---|---|---|---|---|---|
| Wt. Gain | .39 | .27 | .26 | .58 | .59 | .66 | .64 | .12 | .11 | .23 | .24 | .54 |
| Surfactant | Triton 165 | Triton 165 | Triton 165 | Triton 165 | Triton 165 | Triton 165 | Triton 165 | Triton 165 | Triton 165 | Triton 165 | Triton 165 | Triton 165 |
| Polarity | Nonionic | Nonionic | Nonionic | Nonionic | Nonionic | Nonionic | Nonionic | Nonionic | Nonionic | Nonionic | Nonionic | Nonionic |
| Solvent | | Xylenes | Xylenes | Xylenes | Xylenes | Xylenes | Xylenes | Isobutanol | Isobutanol | Isobutanol | Isobutanol | Isobutanol |
| Bath pH | 7.6 | 7.7 | 7.7 | 7.7 | 7.7 | 7.7 | 7.7 | 7.6 | 7.6 | 7.6 | 7.6 | 7.6 |
| Cond. (μmhos) | 490 | 600 | 600 | 600 | 600 | 600 | 600 | 540 | 540 | 540 | 490 | 540 |
| D.C. Volts | 200 | 100 | 100 | 150 | 150 | 200 | 200 | 100 | 100 | 150 | 150 | 200 |
| Final Amps | 0 | 0.1 | 0.1 | 0.2 | 0.2 | 0.3 | 0.4 | 0.1 | 0.1 | 0.1 | 0.1 | 0.1 |
| Coulombs | 34 | 26 | 25 | 48 | 50 | 62 | 78 | 15 | 15 | 23 | 23 | 40 |
| Thickness (Mil) | 3.6 | 2.2 | 2.3 | 5.1 | 4.9 | 5.8 | 5.6 | 1.1 | 1.0 | 2.1 | 2.2 | 4.6 |
| Appearance | US | US | US | US | US | US | US | S | S | S | US | US |
| Density (g/cc) | 0.945 | 1.07 | 0.986 | 0.992 | 1.05 | 0.992 | 0.996 | 0.951 | 0.959 | 0.955 | 0.951 | 1.02 |
| Coul./Gram | 87 | 96 | 83 | 85 | 82 | 94 | 122 | 125 | 136 | 100.0 | 96 | 74 |
| Coul./Mil | 9.44 | 11.82 | 10.87 | 9.41 | 10.20 | 10.69 | 13.93 | 13.64 | 15.00 | 10.95 | 10.45 | 8.70 |

| Number | 99C | 1D | 2D | 3D | 4D | 5D | 6D | 19D | 20D | 21D | 22D | 23D |
|---|---|---|---|---|---|---|---|---|---|---|---|---|
| Wt. Gain | .50 | .28 | .25 | .69 | .54 | .16 | .15 | .12 | .12 | .34 | .10 | .09 |
| Surfactant | Triton 165 | Ethoquad C25 | Ethoquad C25 | Ethoquad C25 | Ethoquad C25 | Ethoquad C25 | Ethoquad C25 | Miranol L2M-SF | Miranol L2M-SF | Miranol L2M-SF | Miranol L2M-SF | Miranol L2M-SF |
| Polarity | Nonionic | Cationic | Cationic | Cationic | Cationic | Cationic | Cationic | Amphoteric | Amphoteric | Amphoteric | Amphoteric | Amphoteric |

Surfactant: Pluronic L44
Polarity: Nonionic
Solvent: Isobutanol
Bath pH: 7.8
Cond. (μmhos): 600
D.C. Volts: 200
Final Amps: .10
Coulombs: 27
Thickness (Mil): 2.4
Appearance: US
Density (g/cc): 1.09
Coul./Gram: 90
Coul./Mil: 11.2

TABLE II-continued

| Number | 24D | 25D | 26D | 27D | 28D | 29D | 30D | 31D | 32D | 33D | 5E | 6E |
|---|---|---|---|---|---|---|---|---|---|---|---|---|
| Wt. Gain | .22 | .22 | .34 | .35 | .93 | .11 | .12 | .19 | .19 | .32 | .24 | .24 |
| Surfactant | Miranol L2M-SF | Miranol L2M-SF | Miranol L2M-SF | Miranol L2M-SF | Miranol L2M-SF | Miranol L2M-SF | Miranol L2M-SF | Miranol L2M-SF | Miranol L2M-SF | Miranol L2M-SF | Dodecyl Sulfate | Dodecyl Sulfate |
| Polarity | Amphoteric | Amphoteric | Amphoteric | Amphoteric | Amphoteric | Amphoteric | Amphoteric | Amphoteric | Amphoteric | Amphoteric | Anionic | Anionic |
| HLB # | 16 | 15.4 | 15.4 | 15.4 | 15.4 | 15.4 | 15.4 | | | | | |
| Solvent | Isobutanol | Xylene | Xylene | Xylene | Xylene | Xylene | Xylene | Isobutanol | Isobutanol | Isobutanol | | |
| Bath pH | 7.6 | 7.7 | 7.7 | 7.7 | 7.7 | 7.7 | 7.7 | 7.7 | 7.7 | 7.7 | 7.5 | 7.5 |
| Cond. (μmhos) | 540 | 900 | 900 | 900 | 900 | 1000 | 1000 | 1000 | 1000 | 1000 | 500 | 500 |
| D.C. Volts | 200 | 50 | 100 | 100 | 150 | 50 | 50 | 100 | 100 | 150 | 50 | 50 |
| Final Amps | 0.1 | 0.1 | 0.2 | 0.2 | 2.0 | .4 | 0 | 0 | 0 | 1.5 | .2 | .2 |
| Coulombs | 42 | 20 | 32 | 33 | 224 | 12 | 13 | 19 | 20 | 125 | 38 | 38 |
| Thickness (Mil) | 4.8 | 1.8 | 2.8 | 3.0 | 6.4 | 0.5 | 0.6 | 1.5 | 1.6 | 2.5 | 2.4 | 2.6 |
| Appearance | US | US | US | US | US | S | S | S | S | US | US | US |
| Density (g/cc) | 0.908 | 1.07 | 1.06 | 1.02 | 1.27 | 1.92 | 1.74 | 1.10 | 1.04 | 1.12 | 0.87 | 0.81 |
| Coul./Gram | 84 | 91 | 94 | 94 | 241 | 109 | 108 | 100 | 105 | 391 | 158.3 | 158.3 |
| Coul./Mil | 8.75 | 11.1 | 11.4 | 11.0 | 35.0 | 24.0 | 21.7 | 12.7 | 12.5 | 50.0 | 15.8 | 14.6 |

| Number | 7E | 8E | 9E | 10E | 11E | 12E | 13E | 14E | 15E | 16E | 17E | 18E |
|---|---|---|---|---|---|---|---|---|---|---|---|---|
| Wt. Gain | .56 | .57 | .92 | .31 | .31 | .71 | .70 | .31 | .31 | .59 | .58 | .90 |
| Surfactant | Dodecyl Sulfate | Dodecyl Sulfate | Dodecyl Sulfate | Dodecyl Sulfate | Dodecyl Sulfate | Dodecyl Sulfate | Dodecyl Sulfate | Dodecyl Sulfate | Dodecyl Sulfate | Dodecyl Sulfate | Dodecyl Sulfate | Dodecyl Sulfate |
| Polarity | Anionic | Anionic | Anionic | Anionic | Anionic | Anionic | Anionic | Anionic | Anionic | Anionic | Anionic | Anionic |
| HLB # | | | | | | | | | | | | |
| Solvent | | | | Xylene | Xylene | Xylene | Xylene | Isobutanol | Isobutanol | Isobutanol | Isobutanol | Isobutanol |
| Bath pH | 7.5 | 7.5 | 7.5 | 7.5 | 7.5 | 7.5 | 7.5 | 7.4 | 7.4 | 7.4 | 7.4 | 7.4 |
| Cond. (μmhos) | 500 | 500 | 500 | 560 | 560 | 560 | 560 | 660 | 660 | 660 | 660 | 660 |
| D.C. Volts | 100 | 100 | 150 | 50 | 50 | 100 | 100 | 50 | 50 | 100 | 100 | 150 |
| Final Amps | .3 | .3 | 1.2 | .2 | .2 | .4 | .4 | .2 | .2 | .4 | .4 | 1.6 |
| Coulombs | 66 | 69 | 152 | 51 | 51 | 100 | 102 | 47 | 48 | 75 | 74 | 159 |
| Thickness (Mil) | 6.5 | 6.4 | 12.5 | 2.9 | 3.1 | 7 | 8 | 3.5 | 4.0 | 6.5 | 7.1 | 11 |
| Appearance | US | US | US | US | US | US | US | US | US | US | US | US |
| Density (g/cc) | 0.75 | 0.78 | 0.64 | 0.93 | 0.87 | 0.88 | 0.76 | 0.77 | 0.68 | 0.79 | 0.71 | 0.71 |
| Coul./Gram | 117.9 | 121.1 | 165.2 | 164.5 | 164.5 | 140.8 | 145.7 | 151.6 | 154.8 | 127.1 | 127.6 | 176.7 |
| Coul./Mil | 10.2 | 10.8 | 12.2 | 17.6 | 16.5 | 14.3 | 12.8 | 13.4 | 12 | 11.5 | 10.4 | 14.5 |

| Number | 19E | 20E | 21E | 22E | 23E | 24E | 25E | 26E | 27E | 28E | 29E |
|---|---|---|---|---|---|---|---|---|---|---|---|
| Wt. Gain | .28 | .26 | .43 | .46 | 1.17 | 1.12 | 1.12 | 1.06 | .99 | .53 | .59 |
| Surfactant | Dioctyl Sulfo | Dioctyl Sulfo | Dioctyl Sulfo | Dioctyl Sulfo | Dioctyl Sulfo | Dioctyl Sulfo | Dioctyl Sulfo | Dioctyl Sulfo | Dioctyl Sulfo | Dioctyl Sulfo | Dioctyl Sulfo |
| Polarity | Anionic | Anionic | Anionic | Anionic | Anionic | Anionic | Anionic | Anionic | Anionic | Anionic | Anionic |

TABLE II-continued

| Number | 96D | 97D | 98D | 99D | 1E | 2E | 3E | 4E | 86D | 87D | 88D |
|---|---|---|---|---|---|---|---|---|---|---|---|
| Wt. Gain | 1.0 | 1.0 | .49 | .28 | .28 | .48 | .48 | 1.07 | .73 | .85 | .59 |
| Surfactant | Siponate DS10 | Siponate DS10 | Siponate DS10 | Siponate DS10 | Siponate DS10 | Siponate DS10 | Siponate DS10 | Siponate DS10 | Nekal BA 77 | Nekal BA 77 | Nekal BA 77 |
| Polarity | Anionic | Anionic | Anionic | Anionic | Anionic | Anionic | Anionic | Anionic | Anionic | Anionic | Anionic |
| HLB # | | | | | | | | | | | |
| Solvent | Xylene | Xylene | Xylene | Xylene | Xylene | Xylene | Xylene | Xylene | Xylene | Xylene | Isobutanol |
| Bath pH | 7.5 | 7.5 | 7.5 | 7.6 | 7.6 | 7.6 | 7.6 | 7.6 | 7.6 | 7.7 | 7.5 |
| Cond. (μmhos) | 640 640 | 640 | 620 | 620 | 620 | 620 | 620 | 690 | 900 | 820 | |
| D.C. Volts | 100 | 100 | 150 | 50 | 50 | 100 | 100 | 150 | 50 | 50 | 50 |
| Final Amps | .5 | .5 | | .1 | .2 | .4 | .4 | .5 | .6 | .5 | .8 |
| Coulombs | 111 | 114 | | 31 | 32 | 48 | 54 | 112 | 133 | 105 | 152 |
| Thickness (Mil) | 12 | 12 | 65-30 sec. | 2.6 | 2.7 | 4.5 | 4.3 | 15 | 15 | 9 | 10 |
| Appearance | US | US | US | US | US | US | US | US | US | US | US |
| Density (g/cc) | 0.73 | 0.73 | 0.93 | 0.94 | 0.90 | 0.93 | 0.97 | 0.63 | 0.45 | 0.82 | 0.51 |
| Coul./Gram | 111 | 114 | 132.7 | 110.7 | 114.3 | 100 | 112.5 | 104.7 | 182.2 | 123.5 | 257.6 |
| Coul./Mil | 9.3 | 9.5 | 14.1 | 11.9 | 11.9 | 10.7 | 12.6 | 7.5 | 9.5 | 11.7 | 15.2 |

| Number | 30E | 31E | 32E | 33E | 34E | 89D | 90D | 91D | 92D | 93D | 94D | 95D |
|---|---|---|---|---|---|---|---|---|---|---|---|---|
| Wt. Gain | 1.11 | 1.38 | 1.12 | .38 | .36 | .24 | .25 | .25 | .26 | .81 | .31 | .32 |
| Surfactant | Dioctyl Sulfo | Dioctyl Sulfo | Dioctyl Sulfo | Dioctyl Sulfo | Dioctyl Sulfo | Siponate DS10 | Siponate DS10 | Siponate DS10 | Siponate DS10 | Siponate DS10 | Siponate DS10 | Siponate DS10 |
| Polarity | Anionic | Anionic | Anionic | Anionic | Anionic | Anionic | Anionic | Anionic | Anionic | Anionic | Anionic | Anionic |
| HLB # | | | | | | | | | | | | |
| Solvent | Isobutanol | Isobutanol | Isobutanol | Isobutanol | Isobutanol | | Xylene | Xylene | Xylene | Isobutanol | Isobutanol | Xylene |
| Bath pH | 7.5 | 7.5 | 7.5 | 7.5 | 7.5 | 7.5 | 7.5 | 7.5 | 7.5 | 7.5 | 7.5 | 7.5 |
| Cond. (μmhos) | 800 | 800 | 800 | 800 | 520 | 520 | 720 | 720 | 720 | 800 | 800 | 640 |
| D.C. Volts | 150 | 150 | 200 | 50 | 50 | 150 | 100 | 100 | 150 | 100 | 100 | 50 |
| Final Amps | 0.8 | 0.8 | 4.0 | 0.2 | 0.2 | .6 | 1.5 | 1.5 | 6.0 | 0.1 | 0.1 | .2 |
| Coulombs | 109 | 137 | 399 | 44 | 44 | 111 | 103 | 100 | 499 | 52 | 60 | 37 |
| Thickness (Mil) | | | | 3.3 | 3.3 | 10.4 | | | | 5.0 | 5.6 | 2.8 |
| Appearance | US | S | US | US | US | US | US | US | US | US | US | US |
| Density (g/cc) | 1.06 | 0.87 | 0.89 | 1.06 | 1.02 | 0.94 | 0.81 | 0.87 | 0.87 | 0.92 | 0.91 | 1.00 |
| Coul./Gram | 98 | 99 | 356 | 97.8 | 95.7 | 99.1 | 92 | 94 | 504 | 98 | 102 | 115.6 |
| Coul./Mil | | | | 11.8 | 11.2 | 10.7 | | | | 10.4 | 10.7 | 13.2 |

(UNABLE TO DETERMINE DUE TO CONDITION OF COATING for 31E, 32E, 89D, 90D, 91D, 92D)

| HLB # | | | | | | | | |
|---|---|---|---|---|---|---|---|---|
| Solvent | Isobutanol | | | | | Xylene | Xylene | Isobutanol | Isobutanol |
| Bath pH | 7.5 | | | | | 7.5 | 7.5 | 7.5 | 7.5 |
| Cond. (μmhos) | | 520 | 520 | 520 | 520 | 720 | 720 | 800 | 800 |
| D.C. Volts | | 50 | 100 | 100 | 150 | 100 | 150 | 100 | 100 |
| Final Amps | | .1 | .2 | .2 | .6 | 1.5 | 6.0 | 0.1 | 0.1 |
| Coulombs | | 29 | 43 | 45 | 111 | 103 | 499 | 52 | 60 |
| Thickness (Mil) | | 2.6 | 4.2 | 3.8 | 10.4 | | | 5.0 | 5.6 |
| Appearance | | S | US | US | US | US | US | US | US |
| Density (g/cc) | | 0.87 | 0.89 | 1.06 | 0.94 | | | 0.92 | 0.91 |
| Coul./Gram | | 111.5 | 100 | 97.8 | 99.1 | | | 98 | 102 |
| Coul./Mil | | 11.2 | 10.2 | 11.8 | 10.7 | | | 10.4 | 10.7 |

TABLE III

| Number | 4I | 5I | 6I | 7I | 8I | 9I | 22I | 23I | 24I | 25I | 26I | 27I | 28I | 29I | 30I | 31I |
|---|---|---|---|---|---|---|---|---|---|---|---|---|---|---|---|---|
| Wt. Gain | .07 | .07 | .06 | .08 | .09 | .10 | .10 | .10 | .14 | | .15 | .16 | .22 | .22 | .32 | .31 |
| Surfactant | | | | | | | Span 20 | Span 20 | Span 20 | Span 20 | Span 20 | Span 20 | Span 20 | Span 20 | Span 20 | Span 20 |
| Polarity | | | | | | | Nonionic | Nonionic | Nonionic | Nonionic | Nonionic | Nonionic | Nonionic | Nonionic | Nonionic | Nonionic |
| HLB # | | | | | | | 8.6 | 8.6 | 8.6 | 8.6 | 8.6 | 8.6 | 8.6 | 8.6 | 8.6 | 8.6 |
| Solvent | | | | | | | | | | | | | Xylene | Xylene | Xylene | |
| Bath pH | 6.1 | 6.1 | 6.1 | 6.1 | 6.1 | 6.1 | 6.2 | 6.2 | 6.2 | 6.2 | 6.2 | 6.2 | 6.2 | 6.2 | 6.2 | 6.2 |
| Cond. (μmhos) | 1000 | 1000 | 1000 | 1000 | 1000 | 1000 | 820 | 820 | 820 | 820 | 820 | 820 | 780 | 780 | 780 | 780 |
| D.C. Volts | 100 | 100 | 150 | 150 | 200 | 200 | 100 | 100 | 150 | 150 | 200 | 200 | 100 | 100 | 150 | 150 |
| Final Amps | 0 | 0 | 0 | 0 | 0 | 0 | 0 | 0 | 0 | 0 | 0 | 0 | 0 | 0 | 0 | 0 |
| Coulombs | 4 | 4 | 5 | 5 | 5 | 5 | 5 | 5 | 6 | 6 | 7 | 7 | 6 | 7 | 9 | 8 |
| Thickness (Mil) | 0.5 | 0.4 | 0.4 | 0.5 | 0.6 | 0.7 | 0.8 | 0.7 | 1.3 | 1.4 | 1.4 | 1.5 | 1.9 | 1.8 | 2.6 | 2.5 |
| Appearance | S | S | S | S | S | S | S | S | S | S | S | S | S | S | S | S |
| Density (g/cc) | 1.22 | 1.52 | 1.31 | 1.40 | 1.31 | 1.25 | 1.09 | 1.25 | 0.94 | 0.81 | 0.93 | 0.93 | 1.01 | 1.07 | 1.07 | 1.08 |
| Coul./Gram | 57 | 57 | 83 | 62 | 56 | 50 | 50 | 50 | 43 | 46 | 47 | 44 | 27 | 32 | 28 | 26 |
| Coul./Mil | 8.0 | 10.0 | 12.5 | 10.0 | 8.3 | 7.1 | 6.2 | 7.1 | 4.6 | 4.3 | 5.0 | 4.5 | 3.2 | 3.9 | 3.5 | 3.2 |

| Number | 32I | 33I | 34I | 35I | 36I | 37I | 38I | 39I | 40I | 41I | 42I |
|---|---|---|---|---|---|---|---|---|---|---|---|
| Wt. Gain | .33 | .44 | .19 | .18 | .22 | .23 | .27 | .27 | .37 | .34 | .33 |
| Surfactant | Span 20 | Span 20 | Span 20 | Span 20 | Span 20 | Span 20 | Span 20 | Span 20 | Tween 40 | Tween 40 | Tween 40 |
| Polarity | Nonionic | Nonionic | Nonionic | Nonionic | Nonionic | Nonionic | Nonionic | Nonionic | Nonionic | Nonionic | Nonionic |
| HLB # | 8.6 | 8.6 | 8.6 | 8.6 | 8.6 | 8.6 | 8.6 | 8.6 | 15.6 | 15.6 | 15.6 |
| Solvent | Xylene | Xylene | Isobutanol | Isobutanol | Isobutanol | Isobutanol | Isobutanol | Isobutanol | | | |
| Bath pH | 6.2 | 6.2 | 6.3 | 6.3 | 6.3 | 6.3 | 6.3 | 6.3 | 6.2 | 6.2 | 6.2 |
| Cond. (μmhos) | 780 | 780 | 720 | 720 | 720 | 720 | 720 | 720 | 780 | 780 | 780 |
| D.C. Volts | 200 | 200 | 100 | 100 | 150 | 150 | 200 | 200 | 100 | 100 | 150 |
| Final Amps | 0 | 0 | 0 | 0 | 0 | 0 | 0 | 0 | 0 | 0 | 0 |
| Coulombs | 10 | 12 | 6 | 6 | 7 | 7 | 8 | 8 | 15 | 15 | 14 |
| Thickness (Mil) | 2.7 | 3.5 | 1.7 | 1.6 | 2.0 | 2.1 | 2.2 | 2.3 | 3.3 | 3.3 | 3.0 |
| Appearance | US | US | S | S | S | S | S | S | US | US | US |
| Density (g/cc) | 1.07 | 1.10 | 0.97 | 0.98 | 0.96 | 0.96 | 1.07 | 1.02 | 0.98 | 0.90 | 0.96 |
| Coul./Gram | 30 | 27 | 32 | 33 | 32 | 30 | 30 | 30 | 40.5 | 44.1 | 42.4 |
| Coul./Mil | 3.7 | 3.4 | 3.5 | 3.8 | 3.5 | 3.3 | 3.6 | 3.5 | 4.5 | 4.5 | 4.7 |

| Number | 43I | 44I | 45I | 46I | 47I | 48I | 49I | 50I | 51I | 52I | 53I |
|---|---|---|---|---|---|---|---|---|---|---|---|
| Wt. Gain | 0.33 | 0.32 | 0.31 | 0.57 | 0.60 | 0.55 | 0.57 | 0.53 | 0.53 | 0.26 | 0.28 |
| Surfactant | Tween 40 | Tween 40 | Tween 40 | Tween 40 | Tween 40 | Tween 40 | Tween 40 | Tween 40 | Tween 40 | Tween 40 | Tween 40 |
| Polarity | Nonionic | Nonionic | Nonionic | Nonionic | Nonionic | Nonionic | Nonionic | Nonionic | Nonionic | Nonionic | Nonionic |
| HLB # | 15.6 | 15.6 | 15.6 | 15.6 | 15.6 | 15.6 | 15.6 | 15.6 | 15.6 | 15.6 | 15.6 |
| Solvent | Xylene | Xylene | Xylene | Xylene | Xylene | Xylene | Xylene | Xylene | Xylene | Isobutanol | Isobutanol |
| Bath pH | 6.2 | 6.2 | 6.2 | 6.2 | 6.2 | 6.2 | 6.2 | 6.2 | 6.2 | 6.2 | 6.2 |
| Cond. (μmhos) | 780 | 780 | 780 | 620 | 620 | 620 | 620 | 620 | 620 | 710 | 710 |
| D.C. Volts | 150 | 200 | 200 | 100 | 100 | 150 | 150 | 200 | 200 | 100 | 100 |
| Final Amps | 0 | 0 | 0 | .1 | .1 | .1 | .1 | .1 | .1 | .1 | .1 |
| Coulombs | 14 | 13 | 13 | 20 | 19 | 19 | 19 | 18 | 17 | 14 | 14 |
| Thickness (Mil) | 3.1 | 3.0 | 3.0 | 6.4 | 6.5 | 5.8 | 5.6 | 5.8 | 5.7 | 2.9 | 2.7 |
| Appearance | US | US | US | US | US | US | US | US | US | US | US |
| Density (g/cc) | 0.93 | 0.93 | 0.90 | 0.78 | 0.80 | 0.83 | 0.89 | 0.80 | 0.81 | 0.78 | 0.90 |
| Coul./Gram | 42.4 | 40.6 | 41.9 | 35.1 | 31.7 | 34.5 | 33.3 | 33.9 | 32.1 | 53.8 | 50 |
| Coul./Mil | 4.5 | 4.3 | 4.3 | 3.1 | 2.9 | 3.3 | 3.4 | 3.1 | 3.0 | 4.8 | 5.2 |

| Number | 54I | 55I | 56I | 57I | 58I | 59I | 60I | 61I | 62I | 63I |
|---|---|---|---|---|---|---|---|---|---|---|
| Wt. Gain | 0.27 | 0.27 | 0.27 | 0.27 | 0.08 | 0.08 | 0.10 | 0.10 | 0.14 | 0.13 |

TABLE III-continued

| Number | 64I | 65I | 66I | 67I | 68I | 69I | 70I | 71I | 72I | 73I |
|---|---|---|---|---|---|---|---|---|---|---|
| Wt. Gain | 0.20 | 0.19 | 0.23 | 0.24 | 0.30 | 0.31 | 0.17 | 0.18 | 0.20 | 0.19 |
| Surfactant | Tween 40 | Tween 40 | Tween 40 | Tween 40 | Pluronic L42 | Pluronic L42 | Pluronic L42 | Pluronic L42 | Pluronic L42 | Pluronic L42 |
| Polarity | Nonionic | Nonionic | Nonionic | Nonionic | Nonionic | Nonionic | Nonionic | Nonionic | Nonionic | Nonionic |
| HLB # | 15.6 | 15.6 | 15.6 | 15.6 | 8 | 8 | 8 | 8 | 8 | 8 |
| Solvent | Isobutanol | Isobutanol | Isobutanol | Isobutanol | | | | | | |
| Bath pH | 6.3 | 6.3 | 6.3 | 6.3 | 6.3 | 6.3 | 6.3 | 6.3 | 6.3 | 6.3 |
| Cond. (μmhos) | 710 | 710 | 710 | 710 | 640 | 640 | 640 | 640 | 640 | 640 |
| D.C. Volts | 150 | 150 | 200 | 200 | 100 | 100 | 150 | 150 | 200 | 200 |
| Final Amps | .1 | .1 | .1 | .1 | 0 | 0 | 0 | 0 | 0 | 0 |
| Coulombs | 14 | 14 | 14 | 14 | 5 | 5 | 5 | 5 | 5 | 5 |
| Thickness (Mil) | 2.3 | 2.5 | 2.9 | 2.7 | 0.7 | 0.8 | 0.7 | 0.7 | 1.1 | 1.1 |
| Appearance | US | US | US | US | US | US | US. | US | S | S |
| Density (g/cc) | 1.02 | 0.94 | 0.81 | 0.87 | 1.00 | 0.87 | 1.25 | 1.25 | 1.11 | 1.03 |
| Coul./Gram | 51.9 | 51.9 | 51.9 | 51.9 | 62.5 | 62.5 | 50 | 50 | 35.7 | 38.5 |
| Coul./Mil | 6.1 | 5.6 | 4.8 | 5.2 | 7.1 | 6.3 | 7.1 | 7.1 | 4.5 | 4.5 |

| Number | 74I | 75I | 76I | 77I | 78I | 79I | 80I | 81I | 82I | 83I |
|---|---|---|---|---|---|---|---|---|---|---|
| Wt. Gain | 0.22 | 0.22 | 0.09 | 0.08 | 0.09 | 0.09 | 0.11 | 0.11 | .14 | .14 |
| Surfactant | Pluronic L42 | Pluronic L42 | Pluronic L44 | Pluronic L44 | Pluronic L44 | Pluronic L44 | Pluronic L44 | Pluronic L44 | Pluronic L44 | Pluronic L44 |
| Polarity | Nonionic | Nonionic | Nonionic | Nonionic | Nonionic | Nonionic | Nonionic | Nonionic | Nonionic | Nonionic |
| HLB # | 8 | 8 | 16 | 16 | 16 | 16 | 16 | 16 | 16 | 16 |
| Solvent | Xylene | Xylene | Xylene | Xylene | Xylene | Xylene | | | Xylene | Xylene |
| Bath pH | 6.3 | 6.3 | 6.3 | 6.3 | 6.3 | 6.3 | 6.3 | 6.3 | 6.1 | 6.1 |
| Cond. (μmhos) | 600 | 610 | 600 | 600 | 600 | 600 | 700 | 700 | 580 | 580 |
| D.C. Volts | 100 | 200 | 150 | 150 | 200 | 200 | 200 | 200 | 100 | 100 |
| Final Amps | 0 | 0 | 0 | 0 | 0 | 0 | 0 | 0 | 0 | 0 |
| Coulombs | 6 | 7 | 7 | 7 | 9 | 9 | 7 | 7 | 7 | 7 |
| Thickness (Mil) | 1.5 | 1.6 | 1.8 | 1.8 | 2.4 | 2.5 | 0.9 | 0.9 | 1.4 | 1.3 |
| Appearance | US | US | US | US | S | S | US | US | US | US |
| Density (g/cc) | 1.16 | 1.04 | 1.11 | 1.16 | 1.09 | 1.08 | 1.06 | 1.05 | 0.87 | 0.94 |
| Coul./Gram | 30 | 31.6 | 30.4 | 29.2 | 30 | 29 | 35.3 | 38.9 | 50 | 42.8 |
| Coul./Mil | 4 | 3.8 | 3.9 | 3.9 | 3.8 | 3.6 | 4.3 | 4.7 | 5 | 4.6 |

| Number | 84I | 85I | 86I | 87I | 88I | 89I | 90I | 91I | 92I | 93I |
|---|---|---|---|---|---|---|---|---|---|---|
| Wt. Gain | .19 | .19 | .22 | .23 | .10 | .10 | .13 | .13 | .15 | .16 |
| Surfactant | Pluronic L44 | Pluronic L44 | Pluronic L44 | Pluronic L44 | Pluronic L44 | Pluronic L44 | Pluronic L44 | Pluronic L44 | Pluronic L44 | Pluronic L44 |
| Polarity | Nonionic | Nonionic | Nonionic | Nonionic | Nonionic | Nonionic | Nonionic | Nonionic | Nonionic | Nonionic |

TABLE III-continued

| Number | 94I | 95I | 96I | 97I | 98I | 99I | 1J | 2J | 3J | 4J | 5J |
|---|---|---|---|---|---|---|---|---|---|---|---|
| HLB # | 16 | 16 | 16 | 16 | 16 | 16 | 16 | 16 | 16 | 16 | 16 |
| Solvent | Xylene | Xylene | Xylene | Xylene | Xylene | Isobutanol | Isobutanol | Isobutanol | Isobutanol | Isobutanol | Isobutanol |
| Bath pH | 6.1 | 6.1 | 6.1 | 6.1 | 6.2 | 6.2 | 6.2 | 6.2 | 6.2 | 6.2 | 6.2 |
| Cond. (μmhos) | 580 | 580 | 580 | 580 | 700 | 700 | 700 | 700 | 700 | 700 | 700 |
| D.C. Volts | 150 | 150 | 200 | 200 | 100 | 100 | 150 | 150 | 150 | 200 | 200 |
| Final Amps | 0 | 0 | 0 | 0 | 0 | 0 | 0 | 0 | 0 | 0 | 0 |
| Coulombs | 8 | 8 | 9 | 9 | 6 | 6 | 7 | 7 | 7 | 8 | 8 |
| Thickness (Mil) | 1.7 | 1.6 | 1.9 | 2.0 | .7 | .7 | 1.0 | 1.0 | 1.0 | 1.4 | 1.5 |
| Appearance | US | US | US | US | US | US | US | US | US | US | US |
| Density (g/cc) | 0.97 | 1.04 | 1.01 | 1.00 | 1.25 | 1.25 | 1.13 | 1.13 | 1.13 | 0.93 | 0.93 |
| Coul./Gram | 42.1 | 42.1 | 40.9 | 39.1 | 60 | 60 | 53.8 | 53.8 | 53.8 | 53.3 | 50 |
| Coul./Mil | 4.7 | 5 | 4.7 | 4.5 | 8.6 | 8.6 | 7 | 7 | 7 | 5.7 | 5.7 |

| Number | 6J | 7J | 8J | 9J | 10J | 11J | 12J | 13J | 14J | 15J | 16J |
|---|---|---|---|---|---|---|---|---|---|---|---|
| Wt. Gain | .36 | .19 | .19 | .24 | .24 | .30 | .30 | .19 | .20 | .45 | .42 |
| Surfactant | Triton X35 | Triton X35 | Triton X35 | Triton X35 | Triton X35 | Triton X35 | Triton X35 | Triton X165 | Triton X165 | Triton X165 | Triton X165 |
| Polarity | Nonionic | Nonionic | Nonionic | Nonionic | Nonionic | Nonionic | Nonionic | Nonionic | Nonionic | Nonionic | Nonionic |
| HLB # | 8 | 8 | 8 | 8 | 8 | 8 | 8 | 16 | 16 | 16 | 16 |
| Solvent | Xylene | Isobutanol | Isobutanol | Isobutanol | Isobutanol | Isobutanol | Isobutanol | Xylene | Xylene | Xylene | Xylene |
| Bath pH | 6.2 | 6.1 | 6.1 | 6.1 | 6.1 | 6.1 | 6.1 | 6.1 | 6.1 | 6.1 | 6.1 |
| Cond. (μmhos) | 680 | 680 | 680 | 680 | 680 | 680 | 680 | 810 | 810 | 810 | 810 |
| D.C. Volts | 200 | 100 | 100 | 150 | 150 | 200 | 200 | 100 | 100 | 150 | 150 |
| Final Amps | 0 | 0 | 0 | 0 | 0 | 0 | 0 | 0 | 0 | 0 | 0 |
| Coulombs | 10 | 6 | 6 | 7 | 6 | 9 | 9 | 18 | 18 | 18 | 17 |
| Thickness (Mil) | 3.0 | 1.8 | 1.8 | 2.1 | 2.1 | 2.7 | 2.7 | 5.0 | 5.2 | 5.3 | 5.3 |
| Appearance | US | S | S | S | S | S | S | US | US | US | US |
| Density (g/cc) | 1.05 | 0.92 | 0.92 | 1.00 | 1.00 | 0.97 | 0.97 | 0.82 | 0.80 | 0.74 | 0.69 |
| Coul./Gram | 28 | 32 | 32 | 29 | 29 | 30 | 30 | 38 | 38 | 40 | 40 |
| Coul./Mil | 3.3 | 3.3 | 3.3 | 3.3 | 3.3 | 3.3 | 3.3 | 3.6 | 3.5 | 3.4 3.2 | |

| Number | 17J | 18J | 19J | 20J | 21J | 22J | 23J | 24J | 25J | 26J | 27J |
|---|---|---|---|---|---|---|---|---|---|---|---|
| Wt. Gain | .42 | .43 | .40 | .43 | .42 | .40 | .41 | .39 | .29 | .28 | .29 |
| Surfactant | Triton 165 | Triton 165 | Triton 165 | Triton 165 | Triton 165 | Triton 165 | Triton 165 | Triton 165 | Triton 165 | Triton 165 | Triton 165 |
| Polarity | Nonionic | Nonionic | Nonionic | Nonionic | Nonionic | Nonionic | Nonionic | Nonionic | Nonionic | Nonionic | Nonionic |
| HLB # | 16 | 16 | 16 | 16 | 16 | 16 | 16 | 16 | 16 | 16 | 16 |
| Solvent | | | Xylene | Xylene | Xylene | Xylene | Xylene | Xylene | Isobutanol | Isobutanol | Isobutanol |

TABLE III-continued

| Number | 28J | 29J | 30J | 31J | 32J | 33J | 34J | 35J | 36J |
|---|---|---|---|---|---|---|---|---|---|
| Bath pH | 6.1 | 6.1 | 6.3 | 6.3 | 6.3 | 6.3 | 6.3 | 6.2 | 6.2 |
| Cond. (μmhos) | 810 | 810 | 650 | 650 | 650 | 650 | 650 | 760 | 760 |
| D.C. Volts | 200 | 200 | 100 | 100 | 150 | 200 | 200 | 100 | 150 |
| Final Amps | 0 | 0 | 0 | 0 | 0 | 0 | 0 | 0 | 0 |
| Coulombs | 17 | 17 | 15 | 15 | 15 | 15 | 14 | 13 | 13 |
| Thickness (Mil) | 5.0 | 4.8 | 6.1 | 6.0 | 6.0 | 5.7 | 4.7 | 5.1 | 2.7 | 2.6 |
| Appearance | US | US | US | US | US | US | US | US | US |
| Density (g/cc) | 0.73 | 0.78 | 0.57 | 0.62 | 0.61 | 0.61 | 0.76 | 0.67 | 0.94 | 0.90 | 0.97 |
| Coul./Gram | 40 | 40 | 38 | 35 | 36 | 38 | 37 | 36 | 45 | 46 | 45 |
| Coul./Mil | 3.4 | 3.5 | 2.4 | 2.5 | 2.5 | 2.6 | 3.2 | 2.7 | 4.8 | 4.8 | 5.0 |

| Number | 28J | 29J | 30J | 31J | 32J | 33J | 34J | 35J | 36J |
|---|---|---|---|---|---|---|---|---|---|
| Wt. Gain | .28 | .30 | .29 | .55 | .50 | .51 | .49 | .48 | .46 |
| Surfactant | Triton 165 | Triton 165 | Triton 165 | Ethoquad C25 | Ethoquad C25 | Ethoquad C25 | Ethoquad C25 | Ethoquad C25 | Ethoquad C25 |
| Polarity | Nonionic | Nonionic | Nonionic | Cationic | Cationic | Cationic | Cationic | Cationic | Cationic |
| HLB # | 16 | 16 | 16 | 15.4 | 15.4 | 15.4 | 15.4 | 15.4 | 15.4 |
| Solvent | Isobutanol | Isobutanol | Isobutanol | | | | | | |
| Bath pH | 6.2 | 6.2 | 6.2 | 6.1 | 6.1 | 6.1 | 6.1 | 6.1 | 6.1 |
| Cond. (μmhos) | 760 | 760 | 760 | 1400 | 1400 | 1400 | 1400 | 1400 | 1400 |
| D.C. Volts 150 | 200 | 200 | 100 | 100 | 150 | 150 | 200 | 200 | |
| Final Amps | 0 | 0 | 0 | 0.2 | 0.2 | 0.2 | 0.2 | 0.1 | 0.1 |
| Coulombs | 13 | 13 | 14 | 62 | 64 | 53 | 51 | 44 | 42 |
| Thickness (Mil) | 2.6 | 2.5 | 2.6 | 7.4 | 6.6 | 6.0 | 5.5 | 6.2 | 5.7 |
| Appearance | US | US | US | US | US | US | US | US | US |
| Density (g/cc) | 0.94 | 1.05 | 0.97 | 0.65 | 0.66 | 0.74 | 0.78 | 0.68 | 0.70 |
| Coul./Gram | 46 | 43 | 48 | 113 | 128 | 104 | 104 | 92 | 91 |
| Coul./Mil | 5.0 | 5.2 | 5.4 | 8.4 | 9.7 | 8.8 | 9.3 | 7.1 | 7.4 |

| Number | 37J | 38J | 39J | 40J | 41J | 42J | 43J | 44J |
|---|---|---|---|---|---|---|---|---|
| Wt. Gain | .24 | .27 | .41 | .75 | .58 | .30 | .30 | — |
| Surfactant | Ethoquad C25 | Ethoquad C25 | Ethoquad C25 | Ethoquad C25 | Ethoquad C25 | Ethoquad C25 | Ethoquad C25 | Ethoquad C25 |
| Polarity | Cationic | Cationic | Cationic | Cationic | Cationic | Cationic | Cationic | Cationic |
| HLB # | 15.4 | 15.4 | 15.4 | 15.4 | 15.4 | 15.4 | 15.4 | 15.4 |
| Solvent | Xylene | Xylene | Xylene | Xylene | Xylene | Xylene | Xylene | |
| Isobutanol | | | | | | | | |
| Bath pH | 6.1 | 6.1 | 6.1 | 6.1 | 6.1 | 6.1 | 6.1 | 6.0 |
| Cond. (μmhos) | 1370 | 1370 | 1370 | 1370 | 1370 | 1370 | 1370 | 1310 |
| D.C. Volts | 100 | 100 | 150 | 150 | 200 | 50 | 50 | 50 |
| Final Amps | 0.1 | 0.1 | 0.2 | 0.6 | 2.0 | 0.1 | 0.1 | |
| Coulombs | 37 | 38 | 59 | 98 | 109 | 34 | 32 | |
| Thickness (Mil) | 3.0 | 3.3 | | UNABLE TO DETERMINE | 2.0 | 2.4 | 1.9 | ruptured, not compatible |
| Appearance | US | US | US | UNABLE TO DETERMINE | US | US | US | |
| Density (g/cc) | 0.70 | 0.71 | | UNABLE TO DETERMINE | | 1.09 | 1.38 | |
| Coul./Gram | 154 | 141 | 144 | 131 | 188 | 113 | 107 | |
| Coul./Mil | 12.3 | 11.5 | | | | 14.2 | 16.8 | |

TABLE IV

| Number | 84F | 85F | 86F | 87F | 88F | 89F | 4G | 5G | 6G | 7G | 8G | 9G | 10G | 11G | 12G | 13G | 14G | 15G |
|---|---|---|---|---|---|---|---|---|---|---|---|---|---|---|---|---|---|---|
| Wt. gain | .15 | .16 | .20 | .19 | .22 | .22 | .14 | .13 | .20 | .20 | .42 | .39 | .15 | .15 | .49 | .38 | .48 | .38 |
| Surfactant | Span 20 | Span 20 | Span 20 | Span 20 | Span 20 | Span 20 | Span 20 | Span 20 | Span 20 | Span 20 | Span 20 | Span 20 | Span 20 | Span 20 | Span 20 | Span 20 | Span 20 | Span 20 |
| Polarity | Nonionic | Nonionic | Nonionic | Nonionic | Nonionic | Nonionic | Nonionic | Nonionic | Nonionic | Nonionic | Nonionic | Nonionic | Nonionic | Nonionic | Nonionic | Nonionic | Nonionic | Nonionic |
| HLB # | 8.6 | 8.6 | 8.6 | 8.6 | 8.6 | 8.6 | 8.6 | 8.6 | 8.6 | 8.6 | 8.6 | 8.6 | 8.6 | 8.6 | 8.6 | 8.6 | 8.6 | 8.6 |
| Solvent | | | | | | | | Xylene | Xylene | Xylene | Xylene | Xylene | Xylene | Xylene | Xylene | Xylene | Xylene | Xylene |
| Bath pH | 8.1 | 8.1 | 8.1 | 8.1 | 8.1 | 8.1 | 8.1 | 8.1 | 8.1 | 8.1 | 8.1 | 8.1 | 8.1 | 8.1 | 8.1 | 8.1 | 8.1 | 8.1 |
| Cond. (µmhos) | 800 | 800 | 800 | 800 | 800 | 800 | 800 | 800 | 800 | 800 | 800 | 800 | 680 | 680 | 680 | 680 | 680 | 680 |
| D.C. Volts | 100 | 100 | 150 | 150 | 200 | 200 | 50 | 0 | 100 | 100 | 150 | 150 | 50 | 50 | 100 | 100 | 150 | 150 |
| Final Amps | .10 | .10 | .10 | .10 | .10 | .10 | 10 | 11 | .1 | .1 | .2 | .3 | .1 | .1 | .3 | .3 | .7 | .7 |
| Coulombs | 13 | 14 | 16 | 16 | 18 | 18 | 10 | 11 | 16 | 16 | 28 | 30 | 12 | 12 | 39 | 39 | 84 | 90 |
| Thickness (Mil) | 1.4 | 1.3 | 1.8 | 1.6 | 2.0 | 1.8 | 1.0 | 1.1 | 1.7 | 1.8 | 4.0 | 4.1 | 1.3 | 1.2 | 5.5 | 5.7 | 6.5 | 6.5 |
| Appearance | US | US | S | S | S | S | US | US | US | US | US | US | US | S | PR | PR | US | US |
| Density (g/cc) | 0.93 | 1.07 | 0.97 | 1.04 | 0.96 | 1.07 | 1.22 | 1.03 | 1.03 | 0.97 | 0.92 | 0.83 | 1.01 | 1.09 | 0.78 | 0.58 | 0.64 | 0.51 |
| Coul./Gram | 87 | 88 | 80 | 84 | 82 | 82 | 71.4 | 84.6 | 80 | 80 | 66.7 | 76.9 | 80 | 80 | 79.6 | 102.6 | 175 | 236.8 |
| Coul./Mil | 9.3 | 10.8 | 8.9 | 10.6 | 9.0 | 10.0 | 10 | 10 | 9.4 | 8.9 | 7 | 7.3 | 9.2 | 10.0 | 7.1 | 6.8 | 12.9 | 13.8 |

| Number | 16G | 17G | 18G | 19G | 20G | 21G | 22G | 23G | 24G | 25G | 26G | 27G | 28G | 29G |
|---|---|---|---|---|---|---|---|---|---|---|---|---|---|---|
| Wt. Gain | .19 | .18 | .4 | .4 | .55 | .53 | .21 | .17 | .19 | .18 | .15 | .15 | .44 | .16 |
| Surfactant | Span 20 | Span 20 | Span 20 | Span 20 | Span 20 | Span 20 | Tween 40 | Tween 40 | Tween 40 | Tween 40 | Tween 40 | Tween 40 | Tween 40 | Tween 40 |
| Polarity | Nonionic | Nonionic | Nonionic | Nonionic | Nonionic | Nonionic | Nonionic | Nonionic | Nonionic | Nonionic | Nonionic | Nonionic | Nonionic | Nonionic |
| HLB # | 8.6 | 8.6 | 8.6 | 8.6 | 8.6 | 8.6 | 15.6 | 15.6 | 15.6 | 15.6 | 15.6 | 15.6 | 15.6 | 15.6 |
| Solvent | Isobutanol | Isobutanol | Isobutanol | Isobutanol | Isobutanol | Isobutanol | | | | | | | Xylene | Xylene |
| Bath pH | 8 | 8 | 8 | 8 | 8 | 8 | 8.1 | 8.1 | 8.1 | 8.1 | 8.1 | 8.1 | 8.1 | 8.1 |
| Cond. (µmhos) | 800 | 800 | 800 | 800 | 800 | 800 | 760 | 760 | 760 | 760 | 760 | 760 | 720 | 720 |
| D.C. Volts | 50 | 50 | 100 | 100 | 150 | 150 | 50 | 50 | 100 | 100 | 150 | 150 | 150 | 50 |
| Coulombs | 14 | 14 | 28 | 29 | 81 | 90 | 20 | 18 | 18 | 18 | 17 | 16 | 62 | 17 |
| Thickness (Mil) | 1.4 | 1.6 | 5.0 | 5.1 | 10.3 | 11.3 | 1.8 | 1.5 | 1.9 | 1.6 | 1.6 | 1.5 | 7.5 | 1.4 |
| Appearance | US | US | S | US | US | US | US | US | US | US | US | US | US | US |
| Density (g/cc) | 0.98 | 0.98 | 0.70 | 0.68 | 0.47 | 0.41 | 1.02 | 0.99 | 0.87 | 0.98 | 0.82 | 0.87 | 0.51 | 1.00 |
| Coul./Gram | 73.7 | 77.7 | 70 | 72.5 | 147.3 | 169.8 | 95.2 | 105.8 | 100 | 100 | 113.3 | 106.7 | 140.9 | 106.3 |
| Coul./Mil | 10 | 8.8 | 5.6 | 5.7 | 7.9 | 7.9 | 11.1 | 12 | 10 | 11.3 | 10.6 | 10.7 | 8.3 | 12.1 |

| Number | 30G | 31G | 32G | 33G | 34G | 35G | 36G | 37G | 38G | 39G | 40G | 41G | 42G |
|---|---|---|---|---|---|---|---|---|---|---|---|---|---|
| Wt. Gain | .16 | .15 | .15 | .45 | .14 | .13 | .13 | .20 | .31 | .33 | .09 | .09 | .14 |
| Surfactant | Tween 40 | Tween 40 | Tween 40 | Tween 40 | Tween 40 | Tween 40 | Tween 40 | Tween 40 | Tween 40 | Tween 40 | Pluronic L42 | Pluronic L42 | Pluronic L42 |
| Polarity | Nonionic | Nonionic | Nonionic | Nonionic | Nonionic | Nonionic | Nonionic | Nonionic | Nonionic | Nonionic | Nonionic | Nonionic | Nonionic |
| HLB # | 15.6 | 15.6 | 15.6 | 15.6 | 15.6 | 15.6 | 15.6 | 15.6 | 15.6 | 15.6 | 8 | 8 | 8 |
| Solvent | Xylene | Xylene | Xylene | Xylene | Isobutanol | Isobutanol | Isobutanol | Isobutanol | Isobutanol | Isobutanol | | | |
| Bath pH | 8.1 | 8.1 | 8.1 | 8.1 | 8.0 | 8.0 | 8.0 | 8.0 | 8.0 | 8.0 | 8 | 8 | 8 |
| Cond. (µmhos) | 720 | 720 | 720 | 720 | 760 | 760 | 760 | 760 | 760 | 760 | 700 | 700 | 700 |
| D.C. Volts | 50 | 100 | 100 | 150 | 50 | 100 | 100 | 150 | 150 | 150 | 50 | 50 | 100 |
| Coulombs | .1 | .1 | .1 | .6 | .1 | .1 | .1 | .1 | .2 | .2 | .1 | .1 | .1 |
| Thickness (Mil) | 1.2 | 2.1 | 1.9 | 9.2 | 1.7 | 1.8 | 1.6 | 2.0 | 3.8 | 5.1 | 11 | 11 | 15 |
| Appearance | US | US | US | US | US | US | US | US | US | US | S | S | S |
| Density (g/cc) | 1.16 | 0.62 | 0.69 | 0.43 | 0.72 | 0.63 | 0.71 | 0.87 | 0.71 | 0.56 | 0.78 | 0.78 | 0.81 |
| Coul./Gram | 100 | 133.3 | 126.7 | 144.4 | 135.7 | 138.5 | 146.1 | 105 | 87.1 | 87.9 | 122.2 | 122.2 | 107.1 |
| Coul./Mil | 13.3 | 9.5 | 10.0 | 7.1 | 11.2 | 10.0 | 11.9 | 10.5 | 7.1 | 5.7 | 11 | 11 | 10 |

| Number | 43G | 44G | 45G | 46G | 47G | 48G | 49G | 50G | 51G | 52G | 53G |
|---|---|---|---|---|---|---|---|---|---|---|---|
| Wt. Gain | .18 | .22 | .23 | .16 | .16 | .29 | .31 | .54 | .61 | .18 | .18 |

TABLE IV-continued

| Number | 54G | 55G | 56G | 57G | 58G | 59G | 60G | 61G | 62G | 63G | 64G |
|---|---|---|---|---|---|---|---|---|---|---|---|
| Wt. Gain | .32 | .37 | .70 | .75 | .15 | .16 | .19 | .17 | .12 | .11 | .12 |
| Surfactant | Pluronic L42 | Pluronic L42 | Pluronic L42 | Pluronic L42 | Pluronic L42 | Pluronic L42 | Pluronic L42 | Pluronic L42 | Pluronic L42 | Pluronic L42 | Pluronic L42 |
| Polarity | Nonionic | Nonionic | Nonionic | Nonionic | Nonionic | Nonionic | Nonionic | Nonionic | Nonionic | Nonionic | Nonionic |
| HLB # | 8 | 8 | 8 | 8 | 8 | 8 | 8 | 8 | 8 | 8 | 8 |
| Solvent | Isobutanol | Isobutanol | Isobutanol | Isobutanol | Xylene | Xylene | Xylene | Xylene | Xylene | Isobutanol | Isobutanol |
| Bath pH | 8.0 | 8 | 8 | 8.0 | 8.1 | 8.1 | 8.1 | 8.1 | 8.1 | 8.0 | 8.0 |
| Cond. (μmhos) | 700 | 700 | 700 | 700 | 700 | 700 | 700 | 700 | 700 | 700 | 700 |
| D.C. Volts | 100 | 100 | 150 | 150 | 50 | 100 | 100 | 150 | 150 | 50 | 50 |
| Final Amps | .1 | .1 | .1 | .1 | .1 | .1 | .1 | .6 | .6 | .1 | .1 |
| Coulombs | 16 | 18 | 18 | 13 | 13 | 20 | 21 | 62 | 63 | 15 | 15 |
| Thickness (Mil) | 1.6 | 2.1 | 2.1 | 1.2 | 1.2 | 2.4 | 3.0 | 9.4 | 10.1 | 1.5 | 1.6 |
| Appearance | US | US | US | S | S | US | US | US | US | US | US |
| Density (g/cc) | 0.98 | 0.91 | 0.96 | 1.16 | 1.16 | 1.05 | 0.90 | 0.50 | 0.53 | 1.05 | 0.98 |
| Coul./Gram | 88.9 | 81.8 | 78.3 | 81.3 | 81.3 | 69 | 67.7 | 114.8 | 103.3 | 83.3 | 83.3 |
| Coul./Mil | 10 | 8.6 | 8.6 | 10.8 | 10.8 | 8.3 | 7.0 | 6.6 | 6.2 | 10 | 9.4 |

| Number | 65G | 66G | 67G | 68G | 69G | 70G | 71G | 72G | 73G | 74G | 75G |
|---|---|---|---|---|---|---|---|---|---|---|---|
| Wt. Gain | .11 | .23 | .24 | .61 | .59 | .16 | .14 | .23 | .23 | .51 | .60 |
| Surfactant | Pluronic L44 | Pluronic L44 | Pluronic L44 | Pluronic L44 | Pluronic L44 | Pluronic L44 | Pluronic L44 | Pluronic L44 | Pluronic L44 | Pluronic L44 | Pluronic L44 |
| Polarity | Nonionic | Nonionic | Nonionic | Nonionic | Nonionic | Nonionic | Nonionic | Nonionic | Nonionic | Nonionic | Nonionic |
| HLB # | 16 | 16 | 16 | 16 | 16 | 16 | 16 | 16 | 16 | 16 | 16 |
| Solvent | Xylene | Xylene | Xylene | Xylene | Xylene | Xylene | Isobutanol | Isobutanol | Isobutanol | Isobutanol | Isobutanol |
| Bath pH | 8.1 | 8.1 | 8.1 | 8.1 | 8.1 | 8.0 | 8.0 | 8.0 | 8.0 | 8.0 | 8.0 |
| Cond. (μmhos) | 760 | 760 | 760 | 760 | 760 | 800 | 810 | 810 | 810 | 810 | 810 |
| D.C. Volts | 50 | 100 | 100 | 150 | 150 | 100 | 50 | 100 | 100 | 150 | 150 |
| Final Amps | 0 | 0.10 | 0.10 | 0.6 | 0.6 | 0 | 0 | 0.1 | 0.1 | 0.3 | 0.4 |
| Coulombs | 14 | 19 | 21 | 48 | 62 | 13 | 13 | 19 | 19 | 37 | 43 |
| Thickness (Mil) | 0.9 | 2.2 | 2.4 | 12.5 | 13.6 | 1.5 | 1.4 | 2.0 | 2.1 | 11.9 | 11.6 |
| Appearance | US | US | US | US | US | US | US | US | US | US | US |
| Density (g/cc) | 1.07 | 0.91 | 0.87 | 0.42 | 0.38 | 0.93 | 0.87 | 1.00 | 0.96 | 0.37 | 0.45 |
| Coul./Gram | 127 | 83 | 88 | 79 | 105 | 81 | 93 | 83 | 83 | 73 | 72 |
| Coul./Mil | 15.6 | 8.6 | 8.8 | 3.8 | 4.6 | 8.7 | 9.3 | 9.5 | 9.0 | 3.1 | 3.7 |

| Number | 76G | 77G | 78G | 79G | 80G | 81G | 82G | 83G | 84G | 85G | 86G | 87G | 88G | 89G |
|---|---|---|---|---|---|---|---|---|---|---|---|---|---|---|
| Wt. Gain | .13 | .13 | .21 | .22 | .63 | .72 | .15 | .16 | .37 | .42 | .51 | .48 | .16 | .17 |
| Surfactant | Triton X35 | Triton X35 | Triton X35 | Triton X35 | Triton X35 | Triton X35 | Triton X35 | Triton X35 | Triton X35 | Triton X35 | Triton X35 | Triton X35 | Triton X35 | Triton X35 |
| Polarity | Nonionic | Nonionic | Nonionic | Nonionic | Nonionic | Nonionic | Nonionic | Nonionic | Nonionic | Nonionic | Nonionic | Nonionic | Nonionic | Nonionic |

TABLE IV-continued

| Number | 5H | 6H | 7H | 8H | 9H | 10H | 11H | 12H | 13H | 14H | 15H | 16H |
|---|---|---|---|---|---|---|---|---|---|---|---|---|
| Wt. Gain | .54 | .59 | .12 | .13 | .23 | .21 | .50 | .47 | .27 | .21 | .32 | .25 |
| Surfactant | Triton 165 | Triton 165 | Triton 165 | Triton 165 | Triton 165 | Triton 165 | Triton 165 | Triton 165 | Ethoquad C25 | Ethoquad C25 | Ethoquad C25 | Ethoquad C25 |
| Polarity | Nonionic | Nonionic | Nonionic | Nonionic | Nonionic | Nonionic | Nonionic | Nonionic | Cationic | Cationic | Cationic | Cationic |
| HLB # | 16 | 16 | 16 | 16 | 16 | 16 | 16 | 16 | 15.4 | 15.4 | 15.4 | 15.4 |
| Solvent | Xylene | Xylene | Isobutanol | Isobutanol | Isobutanol | Isobutanol | Isobutanol | Isobutanol | | | | |
| Bath pH | 8.0 | 8.0 | 8.0 | 8.0 | 8.0 | 8.0 | 8.0 | 8.0 | 7.5 | 7.5 | 7.5 | 7.5 |
| Cond. (μmhos) | 760 | 760 | 1000 | 1000 | 1000 | 1000 | 1000 | 1000 | 1400 | 1400 | 1400 | 1400 |
| D.C. Volts | 150 | 150 | 50 | 50 | 50 | 50 | 50 | 150 | 50 | 50 | 100 | 100 |
| Final Amps | 1.0 | 1.1 | 0 | 1.0 | 0.1 | 0.1 | 1.0 | 1.5 | 0.2 | 0.2 | 0.2 | 0.2 |
| Coulombs | 75 | 114 | 17 | 123 | 24 | 26 | 128 | 150 | 50 | 36 | 52 | 42 |
| Thickness (Mil) | 9.4 | 11.6 | 0.9 | 11.4 | 2.0 | 2.0 | 7.1 | 7.2 | 2.8 | 2.0 | 2.2 | 2.3 |
| Appearance | US | US | US | US | US | US | US | US | US | US | US | US |
| Density (g/cc) | 0.50 | 0.44 | 1.16 | 0.50 | 1.00 | 0.92 | 0.61 | 0.57 | 0.84 | 0.92 | 1.27 | 0.95 |
| Coul./Gram | 139 | 193 | 142 | 189 | 104 | 124 | 256 | 319 | 185 | 171 | 162 | 168 |
| Coul./Mil | 8.0 | 9.8 | 18.9 | 10.8 | 12.0 | 13.0 | 18.0 | 20.8 | 17.9 | 18.0 | 23.6 | 18.3 |

| Number | 17H | 18H | 19H | 20H | 21H | 22H | 23H | 24H | 25H | 26H |
|---|---|---|---|---|---|---|---|---|---|---|
| Wt. Gain | .40 | .35 | .30 | .20 | .33 | .34 | .47 | .41 | .24 | .24 |
| Surfactant | Ethoquad C25 | Ethoquad C25 | Ethoquad C25 | Ethoquad C25 | Ethoquad C25 | Ethoquad C25 | Ethoquad C25 | Ethoquad C25 | Ethoquad C25 | Ethoquad C25 |
| Polarity | Cationic | Cationic | Cationic | Cationic | Cationic | Cationic | Cationic | Cationic | Cationic | Cationic |
| HLB # | 15.4 | 15.4 | 15.4 | 15.4 | 15.4 | 15.4 | 15.4 | 15.4 | 15.4 | 15.4 |
| Solvent | | Xylene | Xylene | Xylene | Xylene | Xylene | Xylene | Xylene | Isobutanol | Isobutanol |

| Number | 90G | 91G | 92G | 93G | 94G | 95G | 96G | 97G | 98G | 99G |
|---|---|---|---|---|---|---|---|---|---|---|
| Wt. Gain | .35 | .36 | .56 | .65 | .16 | .15 | .15 | .15 | .31 | .43 |
| Surfactant | Triton X35 | Triton X35 | Triton X35 | Triton X35 | Triton 165 | Triton 165 | Triton 165 | Triton 165 | Triton 165 | Triton 165 |
| Polarity | Nonionic | Nonionic | Nonionic | Nonionic | Nonionic | Nonionic | Nonionic | Nonionic | Nonionic | Nonionic |
| HLB # | 8 | 8 | 8 | 8 | 16 | 16 | 16 | 16 | 16 | 16 |
| Solvent | Isobutanol | Isobutanol | Isobutanol | Isobutanol | | | | | | |
| Bath pH | 8.0 | 8.0 | 8.0 | 8.0 | 8.0 | 8.0 | 7.9 | 7.9 | 7.9 | 7.9 |
| Cond. (μmhos) | 920 | 920 | 920 | 920 | 1050 | 1050 | 1050 | 1050 | 1050 | 1050 |
| D.C. Volts | 100 | 100 | 100 | 150 | 50 | 50 | 100 | 100 | 150 | 150 |
| Final Amps | 0.4 | 0.4 | 1.0 | 1.0 | 0.1 | 0.1 | 0.1 | 0.20 | 0.30 | 0.30 |
| Coulombs | 34 | 39 | 101 | 123 | 19 | 17 | 17 | 27 | 27 | 38 |
| Thickness (Mil) | 2.1 | 3.0 | 9.4 | 11.4 | 1.4 | 1.1 | 1.3 | 1.3 | 5.7 | 8.6 |
| Appearance | US | US | US | US | S | s | S | US | US | US |
| Density (g/cc) | 1.45 | 1.05 | 0.52 | 0.50 | 1.00 | 1.19 | 1.01 | 1.01 | 0.47 | 0.44 |
| Coul./Gram | 97 | 108 | 180 | 189 | 119 | 113 | 113 | 113 | 87 | 88 |
| Coul./Mil | 16.2 | 13.0 | 10.7 | 10.8 | 13.6 | 15.4 | 13.1 | 13.1 | 4.7 | 4.4 |

| Number | 1H | 2H | 3H | 4H |
|---|---|---|---|---|
| Wt. Gain | .22 | .16 | .25 | .31 |
| Surfactant | Triton 165 | Triton 165 | Triton 165 | Triton 165 |
| Polarity | Nonionic | Nonionic | Nonionic | Nonionic |
| HLB # | 16 | 16 | 16 | 16 |
| Solvent | Xylene | Xylene | Xylene | Xylene |
| Bath pH | 8.0 | 8.0 | 8.0 | 8.0 |
| Cond. (μmhos) | 760 | 760 | 760 | 760 |
| D.C. Volts | 50 | 50 | 100 | 100 |
| Final Amps | 0.1 | 0.1 | 0.2 | 0.2 |
| Coulombs | 22 | 17 | 23 | 27 |
| Thickness (Mil) | 1.7 | 1.1 | 1.9 | 2.5 |
| Appearance | US | US | US | US |
| Density (g/cc) | 1.13 | 1.27 | 1.14 | 1.08 |
| Coul./Gram | 100 | 106 | 92 | 87 |
| Coul./Mil | 12.9 | 15.4 | 12.1 | 10.8 |

| HLB # | 8 | 8 | 8 | 8 | 8 | 8 | 8 | 8 | 8 | 8 | 8 | 8 |
|---|---|---|---|---|---|---|---|---|---|---|---|---|
| Solvent | | | | | | | | | Xylene | Xylene | Isobutanol | Isobutanol |
| Bath pH | 8.0 | 8.0 | 8.0 | 8.0 | 8.0 | 8.0 | 8.0 | 8.0 | 8.0 | 8.0 | 8.0 | 8.0 |
| Cond. (μmhos) | 960 | 960 | 960 | 960 | 960 | 960 | 860 | 860 | 860 | 860 | 920 | 920 |
| D.C. Volts | 50 | 50 | 100 | 100 | 150 | 150 | 50 | 100 | 100 | 150 | 50 | 50 |
| Final Amps | 0 | 0 | 0.1 | 0.1 | 0.40 | 0.50 | 0.1 | 0.2 | 0.2 | 1.5 | 0.1 | 0.1 |
| Coulombs | 11 | 12 | 17 | 17 | 42 | 49 | 13 | 13 | 28 | 32 | 123 | 14 |
| Thickness (Mil) | 0.9 | 1.0 | 1.7 | 1.7 | 7.9 | 9.2 | 1.3 | 1.2 | 3.3 | 4.1 | 3.1 | 1.4 |
| Appearance | S | S | S | S | US | US | S | S | US | US | US | S |
| Density (g/cc) | 1.26 | 1.13 | 1.08 | 1.13 | 0.70 | 0.84 | 1.01 | 1.16 | 0.98 | 0.89 | 1.35 | 0.93 |
| Coul./Gram | 85 | 92 | 81 | 77 | 67 | 68 | 87 | 81 | 76 | 76 | 256 | 88 |
| Coul./Mil | 12.2 | 12.0 | 10.0 | 10.0 | 5.3 | 5.3 | 10.0 | 10.8 | 8.5 | 7.8 | 39.7 | 9.3 |

| | | |
|---|---|---|
| | 8 | |
| | Isobutanol | |
| | 8.0 | |
| | 920 | |
| | 50 | |
| | 0.1 | |
| | 14 | |
| | 1.4 | |
| | S | |
| | 1.06 | |
| | 82 | |
| | 10.0 | |

TABLE IV-continued

| Number | 27H | 28H | 29H | 30H | 31H | 32H | 33H | 34H | 35H |
|---|---|---|---|---|---|---|---|---|---|
| Bath pH | 7.5 | 7.5 | 7.9 | 7.9 | 7.9 | 7.9 | 7.9 | 7.5 | 7.5 |
| Cond. (μmhos) | 1400 | 1400 | 1400 | 1400 | 1400 | 1400 | 1400 | 1400 | 1400 |
| D.C. Volts | 150 | 150 | 50 | 100 | 100 | 150 | 150 | 50 | 50 |
| Final Amps | 0.3 | 0.3 | 0.1 | 0.2 | 0.2 | 0.4 | 0.4 | 0.2 | 0.2 |
| Coulombs | 53 | 53 | 34 | 43 | 42 | 54 | 54 | 37 | 38 |
| Thickness (Mil) | 3.7 | 3.4 | 2.1 | 2.8 | 3.1 | 4.4 | 5.9 | 2.3 | 2.3 |
| Appearance | US | US | US | US | US | US | US | US | US |
| Density (g/cc) | 0.94 | 0.90 | 1.25 | 1.03 | 0.96 | 0.93 | 0.61 | 0.91 | 0.91 |
| Coul./Gram | 132 | 151 | 113 | 130 | 124 | 115 | 132 | 154 | 158 |
| Coul./Mil | 14.3 | 15.6 | 16.2 | 15.4 | 13.5 | 12.3 | 9.2 | 16.1 | 16.5 |

| Number | 27H | 28H | 29H | 30H | 31H | 32H | 33H | 34H | 35H |
|---|---|---|---|---|---|---|---|---|---|
| Wt. Gain | .30 | .31 | .38 | .38 | 0.12 | 0.13 | 0.19 | 0.20 | 0.19 |
| Surfactant | Ethoquad C25 | Ethoquad C25 | Ethoquad C25 | Ethoquad C25 | Miranol L2M-SF | Miranol L2M-SF | Miranol L2M-SF | Miranol L2M-SF | Miranol L2M-SF |
| Polarity | Cationic | Cationic | Cationic | Cationic | Amphoteric | Amphoteric | Amphoteric | Amphoteric | Amphoteric |
| HLB # | 15.4 | 15.4 | 15.4 | 15.4 | | | | | |
| Solvent | Isobutanol | Isobutanol | Isobutanol | Isobutanol | | | | | |
| Bath pH | 7.5 | 7.5 | 7.5 | 7.5 | 8.0 | 8.0 | 8.0 | 8.0 | 8.0 |
| Cond. (μmhos) | 1400 | 1400 | 1400 | 1400 | 1500 | 1500 | 1500 | 1500 | 1500 |
| D.C. Volts | 100 | 100 | 150 | 150 | 50 | 50 | 100 | 100 | 150 |
| Final Amps | 0.2 | 0.2 | 0.3 | 0.3 | 0 | 0 | 0.1 | 0.1 | 0.2 |
| Coulombs | 48 | 46 | 50 | 52 | 13 | 13 | 20 | 21 | 21 |
| Thickness (Mil) | 3.3 | 3.3 | 3.5 | 3.7 | 1.0 | 1.0 | 1.9 | 2.0 | 1.9 |
| Appearance | US | US | US | US | S | S | US | US | US |
| Density (g/cc) | 0.79 | 0.82 | 0.95 | 0.90 | 1.13 | 1.05 | 0.87 | 0.87 | 0.87 |
| Coul./Gram | 160 | 148 | 132 | 137 | 100 | 108.3 | 105.3 | 105 | 110.5 |
| Coul./Mil | 14.5 | 13.9 | 14.3 | 14.05 | 13 | 13 | 10.5 | 10.5 | 11.1 |

| Number | 36H | 37H | 38H | 39H | 40H | 41H | 42H | 43H | 44H |
|---|---|---|---|---|---|---|---|---|---|
| Wt. Gain | 0.20 | 0.22 | 0.23 | 0.32 | 0.24 | 0.36 | 0.38 | 0.21 | 0.20 |
| Surfactant | Miranol L2M-SF | Miranol L2M-SF | Miranol L2M-SF | Miranol L2M-SF | Miranol L2M-SF | Miranol L2M-SF | Miranol L2M-SF | Miranol L2M-SF | Miranol L2M-SF |
| Polarity | Amphoteric | Amphoteric | Amphoteric | Amphoteric | Amphoteric | Amphoteric | Amphoteric | Amphoteric | Amphoteric |
| HLB # | | | | | | | | | |
| Solvent | Xylene | Xylene | Xylene | Xylene | Xylene | Xylene | Xylene | Isobutanol | Isobutanol |
| Bath pH | 7.9 | 7.9 | 7.9 | 7.9 | 7.9 | 7.9 | 7.9 | 7.9 | 7.9 |
| Cond. (μmhos) | 1300 | 1300 | 1300 | 1300 | 1300 | 1300 | 1300 | 1120 | 1120 |
| D.C. Volts | 50 | 50 | 50 | 100 | 100 | 150 | 150 | 50 | 50 |
| Final Amps | .1 | .1 | .1 | .1 | .1 | .4 | 1.2 | .1 | .1 |
| Coulombs | 24 | 24 | 24 | 25 | 25 | 54 | 100 | 21 | 20 |
| Thickness (Mil) | 1.9 | 1.9 | 2.0 | 2.1 | 2.2 | 4.5 | 4.9 | 1.9 | 2.0 |
| Appearance | S | S | S | US | US | US | US | S | S |
| Density (g/cc) | 0.92 | 1.01 | 1.00 | 0.91 | 0.95 | 0.70 | 0.68 | 0.96 | 0.87 |
| Coul./Gram | 105 | 109.1 | 104.3 | 109.1 | 104.2 | 150 | 263.2 | 100 | 100 |
| Coul./Mil | 11.1 | 12.6 | 12 | 11.4 | 11.4 | 12 | 20.4 | 11.1 | 10 |

| Number | 45H | 46H | 47H | 48H | 49H | 50H | 51H | 52H | 53H | 54H |
|---|---|---|---|---|---|---|---|---|---|---|
| Wt. Gain | 0.31 | 0.30 | 0.36 | 0.37 | 0.20 | 0.21 | 0.37 | 0.25 | 0.24 | 0.41 |
| Surfactant | Miranol L2M-SF | Miranol L2M-SF | Miranol L2M-SF | Miranol L2M-SF | Dod. Sulfate | Dod. Sulfate | Dod. Sulfate | Dod. Sulfate | Dod. Sulfate | Dod. Sulfate |
| Polarity | Amphoteric | Amphoteric | Amphoteric | Amphoteric | Anionic | Anionic | Anionic | Anionic | Anionic | Anionic |
| HLB # | | | | | | | | | | |
| Solvent | Isobutanol | Isobutanol | Isobutanol | Isobutanol | | | | Xylene | Xylene | Xylene |
| Bath pH | 7.9 | 7.9 | 7.9 | 7.9 | 7.7 | 7.7 | 7.7 | 7.7 | 7.7 | 7.7 |
| Cond. (μmhos) | 1120 | 1120 | 1120 | 1120 | 1800 | 1800 | 1800 | 1600 | 1600 | 1600 |

TABLE IV-continued

| | | | | | | | | | | |
|---|---|---|---|---|---|---|---|---|---|---|
| D.C. Volts | 100 | 150 | 150 | 100 | 50 | 50 | 100 | 50 | 50 | 100 |
| Final Amps | .2 | .2 | .2 | .2 | .2 | .2 | .3 | .4 | .4 | .4 |
| Coulombs | 30 | 38 | 42 | 30 | 38 | 51 | 62 | 76 | 74 | 82 |
| Thickness (Mil) | 3.1 | 5.2 | 5.1 | 3.1 | 5.1 | 1.9 | 5.1 | 3.0 | 3.1 | 6.2 |
| Appearance | US | US | US | US | US | US | US | US | US | US |
| Density (g/cc) | 0.87 | 0.60 | 0.63 | 0.84 | 0.63 | 0.92 | 0.63 | 0.73 | 0.68 | 0.58 |
| Coul./Gram | 96.8 | 105.6 | 113.5 | 100 | 105.6 | 255 | 167.6 | 304 | 308.3 | 200 |
| Coul./Mil | 9.7 | 7.3 | 8.2 | 9.7 | 7.3 | 26.8 | 12.2 | 25.3 | 23.9 | 13.2 |

| Number | 55H | 56H | 57H | 58H | 59H | 60H | 61H | 62H | 63H | 64H | 65H |
|---|---|---|---|---|---|---|---|---|---|---|---|
| Wt. Gain | 0.41 | 0.33 | 0.32 | 0.54 | 0.29 | 0.28 | 0.48 | 0.49 | 0.76 | 0.33 | 0.32 |
| Surfactant | Dod. Sulfate | Dod. Sulfate | Dod. Sulfate | Dod. Sulfate | Dioctyl Sulfo | Dioctyl Sulfo | Dioctyl Sulfo | Dioctyl Sulfo | Dioctyl Sulfo | Dioctyl Sulfo | Dioctyl Sulfo |
| Polarity | Anionic | Anionic | Anionic | Anionic | Anionic | Anionic | Anionic | Anionic | Anionic | Anionic | Anionic |
| HLB # | | | | | | | | | | | |
| Solvent | Xylene | Isobutanol | Isobutanol | Isobutanol | | | | | | Xylene | Xylene |
| Bath pH | 7.7 | 7.6 | 7.6 | 7.6 | 7.7 | 7.7 | 7.7 | 7.7 | 7.7 | 7.8 | 7.8 |
| Cond. (μmhos) | 1600 | 1700 | 1700 | 1700 | 1500 | 1500 | 1500 | 1500 | 1500 | 1400 | 1400 |
| D.C. Volts | 100 | 50 | 50 | 100 | 50 | 50 | 100 | 100 | 150 | 50 | 50 |
| Final Amps | .4 | .3 | .3 | .4 | .2 | .2 | .4 | .4 | .2 | .3 | .3 |
| Coulombs | 83 | 64 | 64 | 83 | 36 | 36 | 65 | 68 | 88 | 46 | 48 |
| Thickness (Mil) | 6.5 | 4.8 | 5.1 | 10.3 | 2.8 | 2.7 | 7.5 | 7.6 | 1.5 | 3.0 | 3.5 |
| Appearance | US | US | US | US | US | US | US | US | US | US | US |
| Density (g/cc) | 0.55 | 0.60 | 0.55 | 0.46 | 0.90 | 0.90 | 0.56 | 0.56 | 0.44 | 0.96 | 0.80 |
| Coul./Gram | 202.4 | 193.9 | 200 | 153.7 | 124.1 | 128.6 | 135.4 | 138.8 | 115.8 | 139.4 | 150.0 |
| Coul./Mil | 12.8 | 13.3 | 12.5 | 8.1 | 12.9 | 13.3 | 8.7 | 8.9 | 5.9 | 15.3 | 13.7 |

| Number | 66H | 67H | 68H | 69H | 70H | 71H | 72H | 73H | 74H | 75H | 76H |
|---|---|---|---|---|---|---|---|---|---|---|---|
| Wt. Gain | 0.62 | 0.60 | 0.97 | 0.34 | 0.33 | 0.60 | 0.61 | 1.01 | 0.25 | 0.25 | 0.24 |
| Surfactant | Dioctyl Sulfo | Dioctyl Sulfo | Dioctyl Sulfo | Dioctyl Sulfo | Dioctyl Sulfo | Dioctyl Sulfo | Dioctyl Sulfo | Dioctyl Sulfo | Siponate DS10 | Siponate DS10 | Siponate DS10 |
| Polarity | Anionic | Anionic | Anionic | Anionic | Anionic | Anionic | Anionic | Anionic | Anionic | Anionic | Anionic |
| HLB # | | | | | | | | | | | |
| Solvent | Xylene | Xylene | Xylene | Isobutanol | Isobutanol | Isobutanol | Isobutanol | Isobutanol | | | |
| Bath pH | 7.8 | 7.8 | 7.8 | 7.8 | 7.8 | 7.8 | 7.8 | 7.8 | 7.8 | 7.8 | 7.8 |
| Cond. (μmhos) | 1400 | 1400 | 1400 | 1500 | 1500 | 1500 | 1500 | 1500 | 1600 | 1600 | 1600 |
| D.C. Volts | 100 | 100 | 150 | 50 | 50 | 100 | 100 | 150 | 50 | 50 | 100 |
| Final Amps | .5 | .5 | 1.4 | .2 | .2 | .7 | .7 | 1.4 | .2 | .2 | .2 |
| Coulombs | 80 | 85 | 185 | 39 | 41 | 98 | 106 | 186 | 42 | 43 | 37 |
| Thickness (Mil) | 10.5 | 10.8 | 13.4 | 3.3 | 3.4 | 9.5 | 10.1 | 14.5 | 2.1 | 2.7 | 2.9 |
| Appearance | US | US | US | US | US | US | US | US | US | US | US |
| Density (g/cc) | 0.51 | 0.48 | 0.63 | 0.90 | 0.85 | 0.55 | 0.53 | 0.61 | 1.04 | 0.81 | 0.72 |
| Coul./Gram | 129.1 | 141.7 | 190.7 | 114.7 | 124.2 | 163.3 | 173.8 | 184.2 | 168 | 172 | 154.2 |
| Coul./Mil | 7.6 | 7.9 | 13.8 | 11.8 | 12.1 | 10.3 | 10.5 | 12.8 | 20 | 15.9 | 12.8 |

| Number | 77H | 78H | 79H | 80H | 81H | 82H | 83H | 84H | 85H | 86H |
|---|---|---|---|---|---|---|---|---|---|---|
| Wt. Gain | 0.25 | 0.59 | 0.28 | 0.28 | 0.59 | 0.37 | 0.35 | 0.46 | 0.48 | 0.91 |
| Surfactant | Siponate DS10 | Siponate DS10 | Siponate DS10 | Siponate DS10 | Siponate DS10 | Siponate DS10 | Siponate DS10 | Siponate DS10 | Siponate DS10 | Siponate DS10 |
| Polarity | Anionic | Anionic | Anionic | Anionic | Anionic | Anionic | Anionic | Anionic | Anionic | Anionic |
| HLB # | | | | | | | | | | |
| Solvent | | | Xylene | Xylene | Xylene | Isobutanol | Isobutanol | Isobutanol | Isobutanol | Isobutanol |
| Bath pH | 7.8 | 7.8 | 7.8 | 7.8 | 7.8 | 7.7 | 7.7 | 7.7 | 7.7 | 7.7 |
| Cond. (μmhos) | 1600 | 1600 | 1500 | 1500 | 1500 | 1600 | 1600 | 1600 | 1600 | 1600 |
| D.C. Volts | 100 | 150 | 50 | 50 | 100 | 50 | 50 | 100 | 100 | 150 |
| Final Amps | .2 | .3 | .2 | .2 | .5 | .2 | .2 | .3 | .3 | .5 |

TABLE IV-continued

| Number | 87H | 88H | 89H | 90H | 91H | 92H | 93H | 94H | 95H | 96H | 91H |
|---|---|---|---|---|---|---|---|---|---|---|---|
| Wt. Gain | 37 | 80 | 52 | 53 | 77 | 119 | 58 | 59 | 64 | 67 | 127 |
| Coulombs | | | | | | | | | | | |
| Thickness (Mil) | 3.0 | 12.1 | 3.1 | 3.2 | | 12.5 | 3.8 | 3.7 | 6.9 | 7.1 | 14.3 |
| Appearance | US | US | US | US | | US | US | US | US | US | US |
| Density (g/cc) | 0.73 | 0.43 | 0.79 | 0.76 | | 0.41 | 0.85 | 0.82 | 0.58 | 0.59 | 0.55 |
| Coul./Gram | 148 | 135.6 | 185.7 | 189.3 | | 201.7 | 156.7 | 168.6 | 139.1 | 139.6 | 139.6 |
| Coul./Mil | 12.3 | 6.6 | 16.8 | 16.6 | | 9.5 | 15.3 | 15.9 | 9.3 | 9.4 | 8.9 |

| Number | 87H | 88H | 89H | 90H | 91H | 92H | 93H | 94H | 95H | 96H | 91H |
|---|---|---|---|---|---|---|---|---|---|---|---|
| Surfactant | Nekal BA-77 | Nekal BA-77 | Nekal BA-77 | Nekal BA-77 | Nekal BA-77 | Nekal BA-77 | Nekal BA-77 | Nekal BA-77 | Nekal BA-77 | Nekal BA-77 | Nekal BA-77 |
| Polarity | Anionic | Anionic | Anionic | Anionic | Anionic | Anionic | Anionic | Anionic | Anionic | Anionic | Anionic |
| HLB # | .37 | .44 | .72 | .77 | .54 | .48 | .62 | .56 | .84 | .73 | .54 |
| Solvent | | Xylene | Xylene | Xylene | Xylene | Xylene | Xylene | Xylene | Xylene | Xylene | Xylene |
| Bath pH | 7.6 | 7.5 | 7.5 | 7.5 | 7.5 | 7.5 | 7.5 | 7.5 | 7.5 | 7.5 | 7.5 |
| Cond. (μmhos) | 3500 | 3500 | 3500 | 3500 | 3500 | 3500 | 3500 | 3500 | 3500 | 3500 | 3500 |
| D.C. Volts | 50 | 50 | 100 | 100 | 50 | 50 | 100 | 100 | 150 | 150 | 50 |
| Final Amps | 0.10 | 0.10 | .30 | .40 | 0.4 | 0.4 | 0.4 | 0.3 | 0.4 | 0.3 | 0.4 |
| Coulombs | 122 | 116 | 160 | 166 | 132 | 121 | 145 | 138 | 190 | 162 | 132 |
| Thickness (Mil) | | | | | UNABLE TO DETERMINE DUE TO CONDITION OF COATING | | | | | | |
| Appearance | US | US | US | US | US | US | US | US | US | US | US |
| Density (g/cc) | | | | | UNABLE TO DETERMINE DUE TO CONDITION OF COATING | | | | | | |
| Coul./Gram | 330 | 264 | 222 | 216 | 244 | 252 | 234 | 246 | 226 | 222 | 244 |
| Coul./Mil | | | | | UNABLE TO DETERMINE DUE TO CONDITION OF COATING | | | | | | |

| Number | 92H | 93H | 94H | 95H | 96H | 97H | 98H | 99H | 11 | 21 | 31 |
|---|---|---|---|---|---|---|---|---|---|---|---|
| Wt. Gain | .48 | .62 | .56 | .84 | .73 | .40 | .33 | .52 | .44 | .54 | .54 |
| Surfactant | Nekal BA-77 | Nekal BA-77 | Nekal BA-77 | Nekal BA-77 | Nekal BA-77 | Nekal BA-77 | Nekal BA-77 | Nekal BA-77 | Nekal BA-77 | Nekal BA-77 | Nekal BA-77 |
| Polarity | Anionic | Anionic | Anionic | Anionic | Anionic | Anionic | Anionic | Anionic | Anionic | Anionic | Anionic |
| HLB # | | | | | | | | | | | |
| Solvent | Xylene | Xylene | Xylene | Xylene | Xylene | Isobutanol | Isobutanol | Isobutanol | Isobutanol | Isobutanol | Isobutanol |
| Bath pH | 7.5 | 7.5 | 7.5 | 7.5 | 7.5 | 7.5 | 7.5 | 7.5 | 7.5 | 7.5 | 7.5 |
| Cond. (μmhos) | 3500 | 3500 | 3500 | 3500 | 3500 | 3600 | 3600 | 3600 | 3600 | 3600 | 3600 |
| D.C. Volts | 50 | 100 | 100 | 150 | 150 | 50 | 50 | 100 | 100 | 150 | 150 |
| Final Amps | 0.4 | 0.4 | 0.3 | 0.4 | 0.3 | 0.2 | 0.2 | 0.2 | 0.2 | 0.2 | 0.2 |
| Coulombs | 121 | 145 | 138 | 190 | 162 | 118 | 108 | 141 | 124 | 140 | 139 |
| Thickness (Mil) | | | | | | UNABLE TO DETERMINE DUE TO CONDITION OF COATING | | | | | |
| Appearance | US | US | US | US | US | US | US | US | US | US | US |
| Density (g/cc) | | | | | | UNABLE TO DETERMINE DUE TO CONDITION OF COATING | | | | | |
| Coul./Gram | 252 | 234 | 246 | 226 | 222 | 295 | 327 | 271 | 282 | 259 | 257 |
| Coul./Mil | | | | | | UNABLE TO DETERMINE DUE TO CONDITION OF COATING | | | | | |

TABLE V

| Number | 35E | 36E | 37E | 38E | 39E | 40E | 53E | 54E | 55E | 56E | 57E | 58E |
|---|---|---|---|---|---|---|---|---|---|---|---|---|
| Wt. | .20 | .21 | .32 | .35 | .35 | .47 | .17 | .22 | .35 | .10 | .09 | .51 |
| Surfactant | Span 20 | Span 20 | Span 20 | Span 20 | Span 20 | Span 20 | Span 20 | Span 20 | Span 20 | Span 20 | Span 20 | Span 20 |
| Polarity | Nonionic | Nonionic | Nonionic | Nonionic | Nonionic | Nonionic | Nonionic | Nonionic | Nonionic | Nonionic | Nonionic | Nonionic |
| HLB # | 8.6 | 8.6 | 8.6 | 8.6 | 8.6 | 8.6 | 8.6 | 8.6 | 8.6 | 8.6 | 8.6 | 8.6 |
| Solvent | Xylene | Xylene | Isobutanol | Isobutanol | | Isobutanol | | | | | | Xylene |
| Bath pH | 7.5 | 7.5 | 7.5 | 7.5 | 7.5 | 7.5 | 7.3 | 7.3 | 7.3 | 7.3 | 7.3 | 7.5 |
| Cond. (μmhos) | 1160 | 1160 | 1200 | 1200 | 1200 | 1200 | 1140 | 1140 | 1150 | 1160 | 1160 | 1200 |
| D.C. Volts | 100 | 100 | 150 | 150 | 200 | 200 | 100 | 100 | 150 | 50 | 50 | 100 |
| Final Amps | 0 | 0 | .2 | .2 | .2 | .2 | 0.2 | 0.5 | 1.0 | 0 | 0 | 0 |
| Coulombs | 18 | 18 | 29 | 31 | 32 | 31 | 18 | 42 | 60 | 11 | 11 | 121 |
| Thickness (Mil) | 1.8 | 1.7 | 2.9 | 3.3 | 3.8 | 3.4 | 1.7 | 1.8 | 2.8 | 0.7 | 0.7 | 4.1 |
| Appearance | US | US | US | US | US | US | S | US | US | US | US | PR |
| Density (g/cc) | 0.969 | 1.08 | 0.962 | 0.925 | 0.803 | 1.20 | 0.87 | 1.06 | 1.09 | 1.24 | 1.12 | 1.08 |
| Coul./Gram | 90 | 86 | 91 | 89 | 91 | 66 | 106 | 191 | 171 | 110 | 122 | 237 |
| Coul./Mil | 10.00 | 10.59 | 10.00 | 9.39 | 8.42 | 9.12 | 10.6 | 23.3 | 21.4 | 15.7 | 15.7 | 29.5 |

| Number | 59E | 60E | 61E | 62E | 63A | 64E | 65E | 66E | 67E | 68E | 69E | 70E |
|---|---|---|---|---|---|---|---|---|---|---|---|---|
| Wt. | .09 | .10 | .32 | .48 | .23 | .22 | .16 | .15 | .18 | .18 | .14 | .13 |
| Surfactant | Span 20 | Span 20 | Span 20 | Span 20 | Span 20 | Span 20 | Tween 40 | Tween 40 | Tween 40 | Tween 40 | Tween 40 | Tween 40 |
| Polarity | Nonionic | Nonionic | Nonionic | Nonionic | Nonionic | Nonionic | Nonionic | Nonionic | Nonionic | Nonionic | Nonionic | Nonionic |
| HLB # | 8.6 | 8.6 | 8.6 | 8.6 | 8.6 | 8.6 | 15.6 | 15.6 | 15.6 | 15.6 | 15.6 | 15.6 |
| Solvent | Xylene | Xylene | Isobutanol | Isobutanol | Isobutanol | Isobutanol | | | | | | |
| Bath pH | 7.5 | 7.5 | 7.5 | 7.5 | 7.5 | 7.5 | 7.4 | 7.4 | 7.4 | 7.4 | 7.4 | 7.4 |
| Cond. (μmhos) | 1250 | 1250 | 1160 | 1160 | 1160 | 1160 | 1100 | 1100 | 1120 | 1120 | 1120 | 1120 |
| D.C. Volts | 50 | 50 | 100 | 100 | 50 | 50 | 100 | 100 | 150 | 150 | 50 | 50 |
| Final Amps | 0.60 | 0.60 | 1.0 | 1.0 | .40 | .20 | 0.10 | 0.10 | 0.10 | 0.10 | 0 | 0 |
| Coulombs | 68 | 66 | 99 | 115 | 28 | 29 | 19 | 19 | 20 | 22 | 19 | 18 |
| Thickness (Mil) | 0.9 | 1.0 | 2.9 | 4.0 | 1.8 | 1.8 | 0.9 | 0.8 | 1.1 | 1.2 | 0.9 | 0.9 |
| Appearance | US | US | US | US | S | S | US | US | US | US | US | US |
| Density (g/cc) | 0.87 | 0.87 | 0.96 | 1.05 | 1.11 | 1.07 | 1.55 | 1.63 | 1.43 | 1.31 | 1.36 | 1.26 |
| Coul./Gram | 756 | 660 | 309 | 240 | 122 | 132 | 119 | 127 | 111 | 122 | 136 | 138 |
| Coul./Mil | 76.0 | 6.6 | 34.1 | 28.8 | 15.6 | 16.1 | 21.1 | 23.8 | 18.2 | 18.3 | 21.1 | 20.0 |

| Number | 71E | 72E | 73E | 74E | 75E |
|---|---|---|---|---|---|
| Wt. | .18 | .25 | .14 | .14 | .13 |
| Surfactant | Tween 40 | Tween 40 | Tween 40 | Tween 40 | Tween 40 |
| Polarity | Nonionic | Nonionic | Nonionic | Nonionic | Nonionic |
| HLB # | 15.6 | 15.6 | 15.6 | 15.6 | 15.6 |
| Solvent Class | Xylene | Xylene | Xylene | Xylene | Xylene |
| Bath pH | 7.5 | 7.5 | 7.5 | 7.5 | 7.5 |
| Cond. (μmhos) | 1100 | 1100 | 1100 | 1100 | 1100 |
| D.C. Volts | 100 | 100 | 150 | 50 | 50 |
| Final Amps | 1.0 | 0.8 | 2 | 0 | 0 |
| Coulombs | 49 | 83 | 77 | 19 | 18 |
| Thickness (Mil) | 1.5 | 2.0 | 1.2 | 0.9 | 1.0 |
| Appearance | US | US | US | US | US |
| Density (g/cc) | 1.05 | 1.09 | 1.02 | 1.36 | 1.13 |
| Coul./Gram | 272 | 332 | 550 | 136 | 138 |
| Coul./Mil | 32.6 | 41.5 | 65.5 | 21.1 | 18.0 |

| Number | 76E | 77E | 78E | 79E | 80E | 81E | 82E | 83E | 84E | 85E | 86E | 87E |
|---|---|---|---|---|---|---|---|---|---|---|---|---|
| Wt. | .13 | .17 | .17 | .13 | .28 | .29 | .45 | .45 | .53 | .53 | .46 | .44 |

TABLE V-continued

| Number | 1F | 2F | 3F | 4F | 5F | 6F | 7F | 8F | 9F | 10F | 11F | 12F |
|---|---|---|---|---|---|---|---|---|---|---|---|---|
| Wt. | .29 | .29 | .79 | .74 | .51 | .51 | .53 | .20 | .17 | .17 | .21 | .50 |
| Surfactant | Pluronic L44 | Pluronic L44 | Pluronic L44 | Pluronic L44 | Pluronic L44 | Pluronic L44 | Pluronic L44 | Pluronic L44 | Pluronic L44 | Pluronic L44 | Pluronic L44 | Pluronic L44 |
| Polarity | Nonionic | Nonionic | Nonionic | Nonionic | Nonionic | Nonionic | Nonionic | Nonionic | Nonionic | Nonionic | Nonionic | Nonionic |
| HLB # | 16 | 16 | 16 | 16 | 16 | 16 | 16 | 16 | 16 | 16 | 16 | 16 |
| Solvent | Xylene | Xylene | Xylene | Xylene | Xylene | Xylene | Xylene | Xylene | Xylene | Isobutanol | Isobutanol | Isobutanol |
| Bath pH | 7.4 | 7.4 | 7.6 | 7.6 | 7.6 | 7.6 | 7.6 | 7.6 | 7.6 | 7.5 | 7.5 | 7.5 |
| Cond. (μmhos) | 1080 | 1080 | 1080 | 1080 | 1000 | 1000 | 1050 | 1050 | 1050 | 1180 | 1180 | 1180 |
| D.C. Volts | 150 | 150 | 200 | 200 | 100 | 100 | 150 | 150 | 200 | 50 | 50 | 100 |
| Final Amps | .2 | .2 | .8 | 1.10 | .4 | .4 | 1.1 | .1 | .1 | .1 | .1 | .4 |
| Coulombs | 27 | 29 | 106 | 134 | 51 | 54 | 121 | 19 | 20 | 18 | 19 | 44 |
| Thickness (Mil) | 2.9 | 3.1 | 10 | 11 | 4.2 | 4.3 | 5.1 | 1.4 | 1.4 | 1.4 | 1.8 | 4.1 |
| Appearance | US | US | US | US | PR | PR | US | US | US | US | US | US |
| Density (g/cc) | 0.87 | 0.82 | 0.69 | 0.59 | 1.06 | 1.03 | 0.91 | 1.25 | 0.06 | 1.31 | 1.02 | 1.06 |
| Coul./Gram | 93.1 | 100 | 134.2 | 181.1 | 100 | 105.9 | 228.3 | 95 | 117.6 | 85.7 | 90.5 | 88 |
| Coul./Mil | 9.3 | 9.4 | 10.6 | 12.2 | 12.1 | 12.6 | 23.7 | 13.6 | 14.3 | 12.9 | 10.6 | 10.7 |

| Number | 13F | 14F | 15F | 16F | 17F | 18F | 19F | 20F | 21F | 22F | 24F | 25F |
|---|---|---|---|---|---|---|---|---|---|---|---|---|
| Wt. | .50 | .73 | .21 | .21 | .35 | .33 | .64 | .23 | .18 | .17 | .40 | .42 |
| Surfactant | Pluronic L44 | Pluronic L44 | Triton X35 | Triton X35 | Triton X35 | Triton X35 | Triton X35 | Triton X35 | Triton X35 | Triton X35 | Triton X35 | Triton X35 |
| Polarity | Nonionic | Nonionic | Nonionic | Nonionic | Nonionic | Nonionic | Nonionic | Nonionic | Nonionic | Nonionic | Nonionic | Nonionic |

| Number | 88E | 89E | 90E | 91E | 92E | 93E | 94E | 95E | 96E | 97E | 98E | 99E |
|---|---|---|---|---|---|---|---|---|---|---|---|---|
| Wt. | .49 | .53 | .51 | .57 | .34 | .36 | .63 | .64 | .65 | .62 | .18 | .21 |
| Surfactant | Tween 40 | Tween 40 | Tween 40 | Tween 40 | Pluronic L42 | Pluronic L42 | Pluronic L42 | Pluronic L42 | Pluronic L42 | Pluronic L42 | Pluronic L42 | Pluronic L42 |
| Polarity | Nonionic | Nonionic | Nonionic | Nonionic | Nonionic | Nonionic | Nonionic | Nonionic | Nonionic | Nonionic | Nonionic | Nonionic |
| HLB # | 15.6 | 15.6 | 15.6 | 15.6 | 8 | 8 | 8 | 8 | 8 | 8 | 8 | 8 |
| Solvent | Isobutanol | Isobutanol | Isobutanol | Isobutanol | | | | | | | Xylene | Xylene |
| Bath pH | 7.4 | 7.4 | 7.4 | 7.4 | 7.4 | 7.4 | 7.4 | 7.4 | 7.4 | 7.4 | 7.6 | 7.6 |
| Cond. (μmhos) | 1130 | 1130 | 1130 | 1130 | 1150 | 1150 | 1150 | 1150 | 1150 | 1150 | 1150 | 1150 |
| D.C. Volts | 100 | 100 | 50 | 50 | 100 | 100 | 150 | 150 | 200 | 200 | 100 | 100 |
| Final Amps | .10 | .10 | .10 | .10 | .1 | .1 | .2 | .2 | .2 | .2 | .2 | .3 |
| Coulombs | 21 | 22 | 16 | 18 | 24 | 24 | 37 | 38 | 44 | 45 | 40 | 42 |
| Thickness (Mil) | 1.2 | 1.4 | 0.4 | 0.3 | 2.3 | 2.2 | 4.0 | 4.2 | 6.3 | 6.0 | 3.7 | 3.7 |
| Appearance | S | S | US | US | US | US | US | US | US | US | PR | PR |
| Density (g/cc) | 0.94 | 1.06 | 2.40 | 3.78 | 1.06 | 1.15 | 0.98 | 0.93 | 0.73 | 0.77 | 1.08 | 1.04 |
| Coul./Gram | 162 | 129 | 145 | 138 | 86 | 83 | 82 | 84 | 83 | 84 | 87 | 95 |
| Coul./Mil | 17.5 | 15.7 | 40.0 | 60.0 | 10.4 | 10.9 | 9.2 | 9.0 | 7.0 | 7.5 | 10.8 | 11.4 |

TABLE V-continued

| Number | 26F | 27F | 28F | 29F | 30F | 31F | 32F | 33F | 34F | 35F | 36F | 37F |
|---|---|---|---|---|---|---|---|---|---|---|---|---|
| Wt. | .45 | .22 | .22 | .36 | .34 | .65 | .62 | .10 | .13 | .04 | .09 | .11 |
| Surfactant | Triton X35 | Triton X35 | Triton X35 | Triton X35 | Triton X35 | Triton X35 | Triton X35 | Triton 165 | Triton 165 | Triton 165 | Triton 165 | Triton 165 |
| Polarity | Nonionic | Nonionic | Nonionic | Nonionic | Nonionic | Nonionic | Nonionic | Nonionic | Nonionic | Nonionic | Nonionic | Nonionic |
| HLB # | 8 | 8 | 8 | 8 | 8 | 8 | 8 | 16 | 16 | 16 | 16 | 16 |
| Solvent | Xylene | Isobutanol | Isobutanol | Isobutanol | Isobutanol | Isobutanol | Isobutanol | | | | | |
| Bath pH | 7.6 | 7.4 | 7.4 | 7.4 | 7.4 | 7.4 | 7.4 | 7.4 | 7.4 | 7.4 | 7.4 | 7.4 |
| Cond. (μmhos) | 1150 | 1150 | 1150 | 1150 | 1150 | 1150 | 1150 | 1190 | 1190 | 1190 | 1100 | 1100 |
| D.C. Volts | 150 | 50 | 50 | 100 | 100 | 150 | 150 | 50 | 100 | 100 | 50 | 50 |
| Final Amps | .7 | .1 | .1 | .1 | .2 | .5 | .5 | .1 | .1 | .5 | .1 | 1 |
| Coulombs | 80 | 19 | 20 | 30 | 30 | 71 | 71 | 19 | 20 | 88 | 22 | 24 |
| Thickness (Mil) | 4.8 | 2.0 | 2.1 | 3.4 | 3.1 | 8 | 10 | 1.0 | 1.6 | .6 | .4 | .8 |
| Appearance | US | S | US | US | US | US | US | S | US | US | S | S |
| Density (g/cc) | 0.82 | 0.96 | 0.91 | 0.92 | 0.96 | 0.71 | 0.54 | 0.87 | 0.71 | 0.58 | 1.96 | 1.20 |
| Coul./Gram | 177.8 | 86.4 | 90.9 | 83.3 | 88.2 | 109.2 | 114.5 | 190 | 153.8 | 220.0 | 244.4 | 218.2 |
| Coul./Mil | 16.7 | 9.5 | 9.5 | 8.8 | 9.7 | 8.9 | 7.1 | 19 | 12.5 | 146.6 | 55 | 30 |

| Number | 38F | 39F | 40F | 41F | 42F | 43F |
|---|---|---|---|---|---|---|
| Wt. | .05 | .10 | .15 | .12 | | |
| Surfactant | Triton 165 | Triton 165 | Triton 165 | Triton 165 | Ethoquad C25 | Ethoquad C25 |
| Polarity | Nonionic | Nonionic | Nonionic | Nonionic | Cationic | Cationic |
| HLB # | 16 | 16 | 16 | 16 | 15.4 | 15.4 |
| Solvent | Xylene | Isobutanol | Isobutanol | Isobutanol | | |
| Bath pH | 7.4 | 7.3 | 7.3 | 7.3 | 7.4 | 7.4 |
| Cond. (μmhos) | 1100 | 1100 | 1100 | 1100 | 1900 | 1900 |
| D.C. Volts | 50 | 50 | 50 | 100 | 100 | 100 |
| Final Amps | 1.6 | .1 | .1 | 1.2 | | |
| Coulombs | 150 | 20 | 20 | 102 | 151 | |
| Thickness (Mil) | .4 | .7 | .9 | .6 | | |
| Appearance | US | S | S | US | | |
| Density (g/cc) | 1.09 | 1.25 | 1.45 | 1.74 | | |
| Coul./Gram | 3000 | 200 | 133 | 850 | | |
| Coul./Mil | 375 | 28.6 | 22.2 | 170 | | |

| Number | 48F | 49F | 50F | 51F | 52F | 53F | 54F | 55F | 56F | 57F | 58F | 59F |
|---|---|---|---|---|---|---|---|---|---|---|---|---|
| Wt. | .32 | .33 | .62 | .39 | .25 | .26 | .34 | .35 | .71 | .84 | .27 | .25 |
| Surfactant | Dioctyl Sulfo | Dioctyl Sulfo | Dioctyl Sulfo | Dioctyl Sulfo | Dioctyl Sulfo | Dioctyl Sulfo | Dioctyl Sulfo | Dioctyl Sulfo | Dioctyl Sulfo | Dioctyl Sulfo | Dioctyl Sulfo | Dioctyl Sulfo |
| Polarity | Anionic | Anionic | Anionic | Anionic | Anionic | Anionic | Anionic | Anionic | Anionic | Anionic | Anionic | Anionic |
| HLB # | | | | | | | | | | | | |
| Solvent | | | | | | | Xylene | Xylene | Xylene | Xylene | Xylene | Xylene |

TABLE V-continued

| Number | 60F | 61F | 62F | 63F | 64F | 65F |
|---|---|---|---|---|---|---|
| Wt. | .37 | .35 | .70 | .82 | .28 | .26 |
| Surfactant | Dioctyl Sulfo | Dioctyl Sulfo | Dioctyl Sulfo | Dioctyl Sulfo | Dioctyl Sulfo | Dioctyl Sulfo |
| Polarity | Anionic | Anionic | Anionic | Anionic | Anionic | Anionic |
| HLB # | | | | | | |
| Solvent | Isobutanol | Isobutanol | Isobutanol | Isobutanol | Isobutanol | Isobutanol |
| Bath pH | 7.4 | 7.4 | 7.4 | 7.4 | 7.4 | 7.4 |
| Cond. (μmhos) | 2150 | 2150 | 2150 | 2150 | 2150 | 2150 |
| D.C. Volts | 100 | 100 | 150 | 150 | 50 | 50 |
| Final Amps | 0.2 | 0.2 | 0.8 | 0.8 | 0.2 | 0.2 |
| Coulombs | 57 | 57 | 103 | 118 | 52 | 51 |
| Thickness (Mil) | 3.1 | 3.0 | 3.0 | | 2.2 | 2.0 |
| Appearance | US | US | US | US | US | US |
| Density (g/cc) | 1.04 | 1.02 | 1.02 | Unable to Determine | 1.11 | 1.13 |
| Coul./Gram | 154 | 163 | 147 | Unable to Determine | 185 | 196 |
| Coul./Mil | 18.4 | 19.0 | | Unable to Determine | 23.6 | 25.5 |

Rows 63F middle: Unable to Determine Due to Condition of Coating

| Bath pH | 7.2 | 7.2 | 7.2 | 7.2 | 7.2 | 7.4 | 7.4 | 7.4 | 7.4 | 7.4 | 7.4 |
|---|---|---|---|---|---|---|---|---|---|---|---|
| Cond. (μmhos) | 2000 | 2000 | 2000 | 2000 | 2000 | 2100 | 2100 | 2100 | 2100 | 2100 | 2100 |
| D.C. Volts | 100 | 100 | 150 | 150 | 50 | 100 | 100 | 150 | 150 | 50 | 50 |
| Final Amps | 0.2 | 0.2 | 1.0 | 1.2 | 0.1 | 0.2 | 0.3 | 0.8 | 0.8 | 0.2 | 0.2 |
| Coulombs | 51 | 52 | 89 | 56 | 44 | 50 | 51 | 94 | 108 | 43 | 43 |
| Thickness (Mil) | 3.1 | 3.0 | | | 1.8 | 3.0 | 2.9 | | | 2.3 | 2.5 |
| Appearance | US | US | US | US | US | US | US | US | US | US | US |
| Density (g/cc) | 0.90 | 0.95 | | | 1.26 | 0.99 | 1.05 | | | 1.02 | 0.87 |
| Coul./Gram | 159 | 158 | 144 | 144 | 169 | 147 | 146 | 132 | 129 | 159 | 172 |
| Coul./Mil | 16.4 | 17.3 | | | 24.4 | 16.7 | 17.6 | | | 18.7 | 17.2 |

Note: Some entries "Unable to Determine" / "Unable to determine Due to Condition of Coating"

| Number | 66F | 67F | 68F | 69F | 70F | 71F | 72F | 73F | 74F | 75F | 76F | 77F | 78F |
|---|---|---|---|---|---|---|---|---|---|---|---|---|---|
| Wt. | .26 | .25 | .30 | .23 | .21 | .39 | .39 | .35 | .31 | .31 | | | |
| Surfactant | Siponate DS10 | Siponate DS10 | Siponate DS10 | Siponate DS10 | Siponate DS10 | Siponate DS10 | Siponate DS10 | Siponate DS10 | Siponate DS10 | Siponate DS10 | Siponate DS10 | Siponate DS10 | Nekal BA77 |
| Polarity | Anionic | Anionic | Anionic | Anionic | Anionic | Anionic | Anionic | Anionic | Anionic | Anionic | Anionic | Anionic | Anionic |
| HLB # | | | | | | | | | | | | | |
| Solvent | | | | | | Xylene | Xylene | Xylene | Xylene | Xylene | | | |
| Bath pH | 7.3 | 7.3 | 7.3 | 7.3 | 7.3 | 7.4 | 7.4 | 7.4 | 7.4 | 7.4 | 7.4 | 7.4 | 7.4 |
| Cond. (μmhos) | 2300 | 2300 | 2300 | 2300 | 2300 | 1900 | 1900 | 1900 | 1900 | 1900 | 2100 | 2100 | 2700 |
| D.C. Volts | 100 | 100 | 150 | 50 | 50 | 100 | 100 | 150 | 50 | 50 | 100 | 50 | 50 |
| Final Amps | 0.2 | 0.2 | 2.0 | 0.3 | 0.3 | .3 | .3 | 2.0 | .2 | .2 | 2.0 | 1.4 | |
| Coulombs | 76 | 74 | 84 | 73 | 73 | 89 | 87 | 162 | 88 | 82 | 84 | 151 | |
| Thickness (Mil) | 2.7 | 2.9 | | 2.7 | 2.6 | 4.4 | 4.5 | 2.0 | 4.2 | 4.0 | | | |
| Appearance | US | US | US | US | US | US | US | US | US | US | | | |
| Density (g/cc) | 0.84 | 0.75 | | 0.74 | 0.70 | 0.77 | 0.76 | | 0.64 | 0.68 | | | |
| Coul./Gram | 292 | 296 | 280 | 317 | 348 | 228 | 223 | 463 | 282 | 264 | | | |
| Coul./Mil | 28.1 | 25.5 | | 27.0 | 28.1 | 20.2 | 19.3 | | 21.0 | 20.5 | | | |

68F, 73F: Unable to Determine Due to Coating / Due to Condition of Coating

TABLE VI

| Number | 44J | 45J | 46J | 47J | 48J | 49J |
|---|---|---|---|---|---|---|
| Wt. | .44 | .44 | .60 | .58 | .70 | .71 |
| Surfactant | Byk-tone | Byk-tone | Byk-tone | Byk-tone | Byk-tone | Byk-tone |
| Polarity | Non-ionic | Non-ionic | Non-ionic | Non-ionic | Non-ionic | Non-ionic |
| HLB # | 12.2 | 12.2 | 12.2 | 12.2 | 12.2 | 12.2 |
| % Solids | 16.39 | 16.39 | 16.39 | 16.39 | 16.39 | 16.39 |
| Bath pH | 6.1 | 6.1 | 6.1 | 6.1 | 6.1 | 6.1 |
| Cond. ($\mu$mhos) | 800 | 800 | 800 | 800 | 800 | 800 |
| D.C. Volts | 100 | 100 | 150 | 150 | 200 | 200 |
| Final Amps | 0.1 | 0.1 | 0.1 | 0.1 | 0.1 | 0.1 |
| Coulombs | 13 | 14 | 19 | 19 | 22 | 22 |
| Thickness (Mil) | 3.5 | 3.8 | 5.4 | 5.3 | 6.0 | 5.9 |
| Appearance | US | US | US | US | US | US |
| Density (g/cc) | 1.09 | 1.01 | 0.97 | 0.95 | 1.02 | 1.05 |
| Coul./Gram | 29.5 | 31.8 | 31.7 | 32.8 | 31.4 | 30.9 |
| Coul./Mil | 3.71 | 3.68 | 3.52 | 3.58 | 3.67 | 3.73 |

TABLE VII

| Number | 50J | 51J | 52J | 53J | 54J | 55J |
|---|---|---|---|---|---|---|
| Wt. | .23 | .23 | .35 | .36 | .37 | .41 |
| Surfactant | Byk-tone | Byk-tone | Byk-tone | Byk-tone | Byk-tone | Byk-tone |
| Polarity | Non-ionic | Non-ionic | Non-ionic | Non-ionic | Non-ionic | Non-ionic |
| HLB # | 12.2 | 12.2 | 12.2 | 12.2 | 12.2 | 12.2 |
| % Solids | 17.44 | 17.44 | 17.44 | 17.44 | 17.44 | 17.44 |
| Bath pH | 6.1 | 6.1 | 6.1 | 6.1 | 6.1 | 6.1 |
| Cond. ($\mu$mhos) | 1040 | 1040 | 1040 | 1040 | 1040 | 1040 |
| D.C. Volts | 100 | 100 | 150 | 150 | 200 | 200 |
| Final Amps | 0 | 0 | 0 | 0 | 0.4 | 0.4 |
| Coulombs | 9 | 9 | 14 | 15 | 54 | 58 |
| Thickness (Mil) | 1.9 | 1.8 | 2.6 | 2.8 | 3.1 | 3.1 |
| Appearance | S | S | PR | PR | PR | PR |
| Density (g/cc) | 1.06 | 1.11 | 1.17 | 1.12 | 1.04 | 1.15 |
| Coul./Gram | 39 | 39 | 40 | 42 | 146 | 141 |
| Coul./Mil | 4.74 | 5.00 | 5.38 | 5.36 | 17.42 | 18.71 |

TABLE VIII

| Number | 22M | 23M | 24M | 25M | 26M | 27M | 40M | 41M | 42M | 43M | 44M | 45M | 46M | 47M | 48M | 49M | 50M | 51M |
|---|---|---|---|---|---|---|---|---|---|---|---|---|---|---|---|---|---|---|
| Wt. Gain | .13 | .14 | .17 | .18 | .30 | .29 | .20 | .17 | .56 | .59 | .43 | .50 | .49 | .49 | .40 | .40 | .42 | .42 |
| Surfactant | | | | | | | Span 20 | Span 20 | Span 20 | Span 20 | Span 20 | Span 20 | Span 20 | Span 20 | Span 20 | Span 20 | Span 20 | Span 20 |
| Polarity | | | | | | | Nonionic | Nonionic | Nonionic | Nonionic | Nonionic | Nonionic | Nonionic | Nonionic | Nonionic | Nonionic | Nonionic | Nonionic |
| HLB # | | | | | | | 8.6 | 8.6 | 8.6 | 8.6 | 8.6 | 8.6 | 8.6 | 8.6 | 8.6 | 8.6 | 8.6 | 8.6 |
| Solvent | | | | | | | | | | | | | | Xylene | Xylene | Xylene | Xylene | Xylene |
| Bath pH | 4.3 | 4.3 | 4.3 | 4.3 | 4.3 | 4.3 | 4.1 | 4.1 | 4.1 | 4.1 | 4.1 | 4.1 | 4.1 | 4.1 | 4.1 | 4.1 | 4.1 | 4.1 |
| Cond. (μmhos) | 882 | 882 | 882 | 882 | 882 | 882 | 970 | 970 | 970 | 970 | 970 | 970 | 941 | 941 | 941 | 941 | 941 | 941 |
| D.C. Volts | 100 | 100 | 150 | 150 | 200 | 200 | 100 | 100 | 150 | 150 | 200 | 200 | 100 | 100 | 150 | 150 | 200 | 200 |
| Final Amps | 0 | 0 | 0 | 0 | 0 | 0 | 0 | 0 | 0.1 | 0.1 | 1.0 | 1.5 | 0 | 0 | .3 | .4 | .9 | .9 |
| Coulombs | 7 | 6 | 7 | 7 | 11 | 11 | 8 | 7 | 18 | 19 | 71 | 116 | 17 | 17 | 46 | 56 | 121 | 126 |
| Thickness (Mil) | 1.0 | 0.9 | 1.5 | 1.5 | 2.5 | 2.5 | 1.7 | 1.7 | 6.0 | 6.2 | 4.6 | 4.5 | 4.8 | 5.1 | 4.1 | 4.1 | 4.1 | 3.9 |
| Appearance | S | S | S | S | S | S | S | S | PR | PR | S | S | US | US | PR | PR | PR | PR |
| Density (g/cc) | 1.13 | 1.36 | 0.99 | 1.05 | 1.05 | 1.01 | 1.03 | 0.87 | 0.81 | 0.83 | 0.82 | 0.97 | 0.89 | 0.84 | 0.85 | 0.85 | 0.89 | 0.94 |
| Coul./Gram | 54 | 43 | 41 | 39 | 37 | 38 | 40 | 41.1 | 32.1 | 32.2 | 165.1 | 232 | 34.7 | 34.7 | 115 | 140 | 288 | 300 |
| Coul./Mil | 7.0 | 6.7 | 4.7 | 4.7 | 4.4 | 4.4 | 4.7 | 4.1 | 3.0 | 3.1 | 15.4 | 25.8 | 3.5 | 3.3 | 11.2 | 13.7 | 29.5 | 32.3 |

| Number | 52M | 53M | 54M | 55M | 56M | 57M | 58M | 59M | 60M | 61M | 62M | 63M | 64M | 65M |
|---|---|---|---|---|---|---|---|---|---|---|---|---|---|---|
| Wt. Gain | .54 | .50 | .41 | .39 | .39 | .40 | .02 | .44 | .02 | .03 | .09 | .41 | .40 | .61 |
| Surfactant | Span 20 | Span 20 | Span 20 | Span 20 | Span 20 | Span 20 | Tween 40 | Tween 40 | Tween 40 | Tween 40 | Tween 40 | Pluronic L42 | Pluronic L42 | Pluronic L42 |
| Polarity | Nonionic | Nonionic | Nonionic | Nonionic | Nonionic | Nonionic | Nonionic | Nonionic | Nonionic | Nonionic | Nonionic | Nonionic | Nonionic | Nonionic |
| HLB # | 8.6 | 8.6 | 8.6 | 8.6 | 8.6 | 8.6 | 15.6 | 15.6 | 15.6 | 15.6 | 15.6 | 8 | 8 | 8 |
| Solvent | Isobutanol | Isobutanol | Isobutanol | Isobutanol | Isobutanol | Isobutanol | | | Xylene | Isobutanol | Isobutanol | | | |
| Bath pH | 4.1 | 4.1 | 4.1 | 4.1 | 4.1 | 4.1 | 4.0 | 4.0 | 4.0 | 4.0 | 4.0 | 4.1 | 4.1 | 4.1 |
| Cond. (μmhos) | 824 | 824 | 824 | 824 | 824 | 824 | 852 | 852 | 795 | 795 | 795 | 769 | 769 | 769 |
| D.C. Volts | 100 | 100 | 150 | 150 | 200 | 200 | 100 | 50 | 50 | 50 | 50 | 100 | 100 | 150 |
| Final Amps | .1 | .1 | .2 | .2 | 1.2 | 1.1 | .7 | .2 | .4 | .4 | .5 | .1 | .1 | .1 |
| Coulombs | 17 | 17 | 35 | 35 | 107 | 111 | 49 | 24 | 39 | 38 | 37 | 13 | 13 | 19 |
| Thickness (Mil) | 5.5 | 5.1 | 3.9 | 3.6 | 3.9 | 4.0 | 0.3 | 5.6 | 0.1 | 0.3 | 1.2 | 3.5 | 3.4 | 5.3 |
| Appearance | US | US | US | US | US | US | US | US | US | US | US | S | S | US |
| Density (g/cc) | 0.86 | 0.85 | 0.92 | 0.94 | 0.87 | 0.87 | 0.58 | 0.69 | 1.74 | 0.87 | 0.65 | 1.02 | 1.03 | 1.00 |
| Coul./Gram | 31.5 | 34.0 | 85.4 | 89.7 | 274.4 | 277.5 | 2450 | 54.5 | 1950 | 1266.7 | 411.1 | 31.7 | 32.5 | 31.1 |
| Coul./Mil | 3.1 | 3.4 | 8.9 | 9.7 | 27.4 | 27.8 | 163.3 | 4.3 | 390 | 126.7 | 30.8 | 3.7 | 3.8 | 3.6 |

| Number | 66M | 67M | 68M | 69M | 70M | 71M | 72M | 73M | 74M | 75M | 76M | 77M |
|---|---|---|---|---|---|---|---|---|---|---|---|---|
| Wt. Gain | .61 | .49 | .48 | .34 | .36 | .46 | .48 | .46 | .43 | .39 | .40 | .56 |
| Surfactant | Pluronic L42 | Pluronic L42 | Pluronic L42 | Pluronic L42 | Pluronic L42 | Pluronic L42 | Pluronic L42 | Pluronic L42 | Pluronic L42 | Pluronic L42 | Pluronic L42 | Pluronic L42 |
| Polarity | Nonionic | Nonionic | Nonionic | Nonionic | Nonionic | Nonionic | Nonionic | Nonionic | Nonionic | Nonionic | Nonionic | Nonionic |
| HLB # | 8 | 8 | 8 | 8 | 8 | 8 | 8 | 8 | 8 | 8 | 8 | 8 |
| Solvent | | | | Xylene | Xylene | Xylene | Xylene | Xylene | Xylene | Isobutanol | Isobutanol | Isobutanol |
| Bath pH | 4.1 | 4.1 | 4.1 | 4.0 | 4.0 | 4.0 | 4.0 | 4.0 | 4.0 | 4.2 | 4.2 | 4.2 |
| Cond. (μmhos) | 769 | 769 | 769 | 710 | 710 | 710 | 710 | 710 | 710 | 764 | 764 | 764 |
| D.C. Volts | 150 | 200 | 200 | 100 | 100 | 150 | 150 | 200 | 200 | 100 | 100 | 150 |
| Final Amps | .1 | .8 | .8 | 0 | 0 | .1 | .1 | .9 | .9 | 0 | 0 | 0.2 |
| Coulombs | 19 | 64 | 70 | 11 | 11 | 21 | 21 | 75 | 80 | 13 | 13 | 21 |
| Thickness (Mil) | 5.4 | 4.3 | 4.6 | 2.9 | 3.0 | 4.4 | 4.1 | 3.9 | 3.8 | 3.2 | 3.3 | 5.0 |
| Appearance | US | US | US | US | US | PR | PR | PR | PR | S | S | US |
| Density (g/cc) | 0.98 | 0.99 | 0.91 | 1.02 | 1.05 | 0.91 | 1.03 | 0.99 | 1.06 | 1.06 | 0.98 | 1.00 |
| Coul./Gram | 31.3 | 130.6 | 145.8 | 32.4 | 30.6 | 45.6 | 43.8 | 163.1 | 186.1 | 33 | 32 | 38 |
| Coul./Mil | 3.5 | 14.9 | 15.2 | 3.8 | 3.7 | 4.8 | 5.1 | 19.2 | 21.1 | 4.1 | 3.9 | 4.2 |

| Number | 78M | 79M | 80M | 81M | 82M | 83M | 84M | 85M | 86M | 87M | 88M | 89M |
|---|---|---|---|---|---|---|---|---|---|---|---|---|
| Wt. Gain | .55 | .48 | .28 | .27 | .50 | .49 | .12 | .51 | .51 | .41 | .30 | .51 |

TABLE VIII-continued

| Number | 5N | 6N | 7N | 8N | 9N | 10N | 11N | 12N | 13N | 14N | 15N | 16N | 17N |
|---|---|---|---|---|---|---|---|---|---|---|---|---|---|
| Wt. Gain | .43 | .43 | .45 | .42 | .42 | .44 | .42 | | | .45 | .44 | .51 | .53 |
| Surfactant | Triton X35 | Triton X35 | Triton X35 | Triton X35 | Triton X35 | Triton X35 | Triton X35 | Triton 165 | Triton 165 | Ethoquad C25 | Ethoquad C25 | Ethoquad C25 | Ethoquad C25 |
| Polarity | Nonionic | Nonionic | Nonionic | Nonionic | Nonionic | Nonionic | Nonionic | Nonionic | Nonionic | Cationic | Cationic | Cationic | Cationic |
| HLB # | 8 | 8 | 8 | 8 | 8 | 8 | 8 | 16 | 16 | 15.4 | 15.4 | 15.4 | 15.4 |
| Solvent | Xylene | Isobutanol | Isobutanol | Isobutanol | Isobutanol | Isobutanol | Isobutanol | | | | | | |
| Bath pH | 4.3 | 4.4 | 4.4 | 4.4 | 4.4 | 4.4 | 4.4 | 4.5 | 4.5 | 4.5 | 4.5 | 4.5 | 4.5 |
| Cond. (μmhos) | 794 | 764 | 764 | 764 | 764 | 764 | 764 | 882 | 882 | 1147 | 1147 | 1147 | 1147 |
| D.C. Volts | 200 | 100 | 100 | 150 | 150 | 200 | 200 | 50 | 50 | 100 | 100 | 150 | 150 |
| Final Amps | 1.2 | 0.1 | 0.1 | 0.2 | 0.2 | 0.7 | 0.8 | 0.4 | 0.4 | 0.1 | 0.1 | 0.1 | 0.2 |
| Coulombs | 89 | 16 | 16 | 25 | 24 | 61 | 71 | 31 | 33 | 21 | 22 | 30 | 32 |
| Thickness (Mil) | 4.0 | 3.7 | 4.0 | 3.8 | 3.5 | 3.8 | 3.9 | | | 3.5 | 3.4 | 4.0 | 4.3 |
| Appearance | PR | US | US | US | US | PR | PR | US | SU | US | US | US | US |
| Density (g/cc) | 0.94 | 1.01 | 0.98 | 0.96 | 1.05 | 1.01 | 0.94 | | | 1.12 | 1.13 | 1.11 | 1.08 |
| Coul./Gram | 207 | 37 | 36 | 60 | 57 | 139 | 169 | | | 46.7 | 50 | 58.8 | 60.4 |
| Coul./Mil | 22.2 | 4.3 | 4.0 | 6.6 | 6.9 | 16.1 | 18.2 | | | 6.0 | 6.5 | 7.5 | 7.4 |

| Number | 18N | 19N | 20N | 21N | 22N | 23N | 24N | 25N | 26N | 27N | 1N | 2N | 3N | 4N |
|---|---|---|---|---|---|---|---|---|---|---|---|---|---|---|
| Wt. Gain | .37 | .32 | .35 | .34 | .60 | .44 | .46 | .40 | .33 | .36 | .31 | .49 | .50 | .42 |
| Surfactant | Ethoquad C25 | Ethoquad C25 | Ethoquad C25 | Ethoquad C25 | Ethoquad C25 | Ethoquad C25 | Ethoquad C25 | Ethoquad C25 | Ethoquad C25 | Ethoquad C25 | Triton X35 | Triton X35 | Triton X35 | Triton X35 |
| Polarity | Cationic | Cationic | Cationic | Cationic | Cationic | Cationic | Cationic | Cationic | Cationic | Cationic | Nonionic | Nonionic | Nonionic | Nonionic |
| HLB # | | | | | | | | | | | 8 | 8 | 8 | 8 |
| Solvent | | | | | | | | | | | Xylene | Xylene | Xylene | Xylene |
| Bath pH | | | | | | | | | | | 4.3 | 4.3 | 4.3 | 4.3 |
| Cond. (μmhos) | | | | | | | | | | | 794 | 794 | 794 | 794 |
| D.C. Volts | | | | | | | | | | | 100 | 150 | 150 | 200 |
| Final Amps | | | | | | | | | | | 0 | 0.1 | 0.1 | 1.2 |
| Coulombs | | | | | | | | | | | 11 | 20 | 21 | 75 |
| Thickness (Mil) | | | | | | | | | | | 2.6 | 4.4 | 4.4 | 4.0 |
| Appearance | | | | | | | | | | | S | PR | PR | PR |
| Density (g/cc) | | | | | | | | | | | 1.04 | 0.97 | 0.99 | 0.92 |
| Coul./Gram | | | | | | | | | | | 35 | 41 | 42 | 179 |
| Coul./Mil | | | | | | | | | | | 4.2 | 4.5 | 4.8 | 18.8 |

| Number | 90M | 91M | 92M | 93M | 94M | 95M | 96M | 97M | 98M | 99M |
|---|---|---|---|---|---|---|---|---|---|---|
| Wt. Gain | .55 | .31 | .35 | .25 | .26 | .46 | .46 | .46 | .46 | .28 |
| Surfactant | Pluronic L44 | Pluronic L44 | Pluronic L44 | Triton X35 | Triton X35 | Triton X35 | Triton X35 | Triton X35 | Triton 165 | Triton X35 |
| Polarity | Nonionic | Nonionic | Nonionic | Nonionic | Nonionic | Nonionic | Nonionic | Nonionic | Nonionic | Nonionic |
| HLB # | 16 | 16 | 16 | 8 | 8 | 8 | 8 | 8 | 16 | 8 |
| Solvent | Isobutanol | Isobutanol | Isobutanol | | | | | | | |
| Bath pH | 4.1 | 4.1 | 4.1 | 4.3 | 4.3 | 4.3 | 4.3 | 4.3 | 4.3 | 4.3 |
| Cond. (μmhos) | 735 | 735 | 735 | 794 | 794 | 794 | 794 | 794 | 794 | 794 |
| D.C. Volts | 100 | 50 | 50 | 100 | 100 | 150 | 150 | 200 | 200 | 100 |
| Final Amps | 0 | 0 | 0 | 0 | 0 | 0.1 | 0.1 | 0.2 | 0.2 | 0 |
| Coulombs | 19 | 11 | 11 | 9 | 9 | 14 | 14 | 26 | 30 | 10 |
| Thickness (Mil) | 4.8 | 2.4 | 2.5 | 2.0 | 2.0 | 3.5 | 3.6 | 3.8 | 4.6 | 2.6 |
| Appearance | PR | PR | PR | S | S | PR | PR | PR | PR | S |
| Density (g/cc) | 1.00 | 1.13 | 1.22 | 1.09 | 1.13 | 1.15 | 1.11 | 1.06 | 0.87 | 0.94 |
| Coul./Gram | 34 | 35 | 31 | 36 | 35 | 30 | 30 | 57 | 65 | 36 |
| Coul./Mil | 4.0 | 4.6 | 4.4 | 4.5 | 4.5 | 4.0 | 3.9 | 6.8 | 6.5 | 3.8 |

| | | | | | | | | | | | | |
|---|---|---|---|---|---|---|---|---|---|---|---|---|
| Sufactant | Pluronic L42 | Pluronic L42 | Pluronic L44 | Pluronic L42 | Pluronic L44 | Pluronic L44 | Pluronic L44 | Pluronic L44 | Pluronic L44 | Pluronic L44 | Pluronic L44 | Pluronic L44 |
| Polarity | Nonionic | Nonionic | Nonionic | Nonionic | Nonionic | Nonionic | Nonionic | Nonionic | Nonionic | Nonionic | Nonionic | Nonionic |
| HLB # | 8 | 8 | 8 | 16 | 16 | 16 | 16 | 16 | 16 | 16 | 16 | 16 |
| Solvent | Isobutanol | Isobutanol | Isobutanol | | | | | | | | | |
| Bath pH | 4.2 | 4.2 | 4.1 | 4.1 | 4.1 | 4.1 | 4.0 | 4.0 | 4.0 | 4.0 | 4.0 | 4.1 |
| Cond. (μmhos) | 764 | 764 | 735 | 735 | 735 | 735 | 662 | 662 | 662 | 662 | 662 | 735 |
| D.C. Volts | 150 | 150 | 100 | 100 | 100 | 150 | 100 | 100 | 150 | 150 | 150 | 200 |
| Final Amps | 0.2 | 1.0 | 0 | 0 | 0 | 0.1 | 0 | 0.5 | 1.0 | 0.2 | 1.0 | 1.2 |
| Coulombs | 22 | 69 | 10 | 10 | 16 | 16 | 16 | 37 | 54 | 19 | 37 | 69 |
| Thickness (Mil) | 5.0 | 4.6 | 2.3 | 2.2 | 3.7 | 4.2 | 4.1 | 2.3 | 2.5 | 4.5 | 4.5 | |
| Appearance | US | S | S | S | PR | PR | PR | PR | PR | PR | PR | US |
| Density (g/cc) | 0.96 | 0.91 | 1.06 | 1.07 | 1.18 | 1.02 | 1.08 | 1.55 | 1.05 | 0.99 | 0.99 | 0 |
| Coul./Gram | 40 | 144 | 36 | 37 | 32 | 33 | 31 | 90 | 180 | 37 | 37 | 575 |
| Coul./Mil | 4.4 | 15.0 | 4.3 | 4.5 | 4.3 | 3.8 | 3.9 | 16.1 | 21.6 | 4.2 | 4.2 | 0 |

TABLE VIII-continued

| HLB # | 15.4 | 15.4 | 15.4 | 15.4 | 15.4 | 15.4 | 15.4 | 15.4 | 15.4 | 15.4 |
|---|---|---|---|---|---|---|---|---|---|---|
| Solvent | | Xylene | Xylene | Xylene | Xylene | Xylene | Isobutanol | Isobutanol | Isobutanol | Isobutanol |
| Bath pH | 4.5 | 4.5 | 4.5 | 4.5 | 4.5 | 4.5 | 4.7 | 4.7 | 4.7 | 4.7 |
| Cond. (μmhos) | 1147 | 1249 | 1249 | 1249 | 1249 | 1249 | 1128 | 1128 | 1128 | 1128 |
| D.C. Volts | 200 | 100 | 100 | 150 | 150 | 150 | 100 | 100 | 50 | 150 |
| Final Amps | 3.0 | .2 | .2 | .9 | .9 | .9 | .3 | .3 | .1 | 1.2 |
| Coulombs | 97 | 36 | 34 | 90 | 91 | 91 | 38 | 39 | 21 | 102 |
| Thickness (Mil) | 3.6 | 3.1 | 3.6 | 3.7 | 3.5 | 3.5 | 3.4 | 3.8 | 3.2 | 4.1 |
| Appearance | US | US | US | PR | PR | PR | US | US | PR | US |
| Density (g/cc) | 0.90 | 0.90 | 0.85 | 0.80 | 1.49 | 1.49 | 1.13 | 1.06 | 0.90 | 0.77 |
| Coul./Gram | 262.2 | 112.5 | 97.1 | 264.7 | 151.7 | 151.7 | 86.4 | 84.8 | 63.6 | 283.3 |
| Coul./Mil | 26.9 | 11.6 | 9.4 | 24.3 | 26.0 | 26.0 | 11.2 | 10.3 | 6.6 | 24.8 |

TABLE IX

Resin: PPG Cationic Acrylic

| Number | 81N | 82N | 83N | 84N | 85N | 86N |
|---|---|---|---|---|---|---|
| Wt. Gain | .09 | .07 | .08 | .09 | .10 | .11 |
| Surfactant | Triton 165 | Triton 165 | Triton 165 | Triton 165 | Triton 165 | Triton 165 |
| Polarity | Nonionic | Nonionic | Nonionic | Nonionic | Nonionic | Nonionic |
| HLB# | 16 | 16 | 16 | 16 | 16 | 16 |
| % Surfactant | 1% | 1% | 1% | 1% | 1% | 1% |
| % Solids | 16.39 | 16.39 | 16.39 | 16.39 | 16.39 | 16.39 |
| Bath pH | 6.2 | 6.2 | 6.2 | 6.2 | 6.2 | 6.2 |
| Cond. ($\mu$mhos) | 1205.4 | 1205.4 | 1205.4 | 1205.4 | 1205.4 | 1205.4 |
| D.C. Volts | 100 | 100 | 150 | 150 | 200 | 200 |
| Final Amps | 0 | 0 | 0 | 0 | 0 | 0 |
| Coulombs | 5 | 5 | 5 | 5 | 6 | 6 |
| Thickness (Mil) | 0.4 | 0.5 | 0.6 | 0.6 | 0.9 | 0.7 |
| Appearance | US | US | US | US | US | US |
| Density (g/cc) | 1.96 | 1.22 | 1.16 | 1.31 | 1.09 | 1.37 |
| Coul./Gram | 55.6 | 71.4 | 62.5 | 55.6 | 60.0 | 54.5 |
| Coul./Mil | 12.5 | 10 | 9.3 | 9.3 | 7.5 | 8.6 |
| Number | 87N | 88N | 89N | 90N | 91N | 92N |
| Wt. Gain | .16 | .16 | .16 | .16 | .16 | .15 |
| Surfactant | Triton 165 | Triton 165 | Triton 165 | Triton 165 | Triton 165 | Triton 165 |
| Polarity | Nonionic | Nonionic | Nonionic | Nonionic | Nonionic | Nonionic |
| HLB # | 16 | 16 | 16 | 16 | 16 | 16 |
| % Surfactant | 3% | 3% | 3% | 3% | 3% | 3% |
| % Solids | 16.39 | 16.39 | 16.39 | 16.39 | 16.39 | 16.39 |
| Bath pH | 6.2 | 6.2 | 6.2 | 6.2 | 6.2 | 6.2 |
| Cond. ($\mu$mhos) | 1205.4 | 1205.4 | 1205.4 | 1205.4 | 1205.4 | 1205.4 |
| D.C. Volts | 100 | 100 | 150 | 150 | 200 | 200 |
| Final Amps | 0 | 0 | 0 | 0 | 0 | 0 |
| Coulombs | 6 | 7 | 7 | 6 | 7 | 7 |
| Thickness (Mil) | 1.3 | 1.4 | 1.2 | 1.4 | 1.4 | 1.3 |
| Appearance | US | US | US | US | US | US |
| Density (g/cc) | 1.07 | 1.00 | 1.16 | 1.00 | 1.00 | 1.01 |
| Coul./Gram | 37.5 | 43.8 | 43.8 | 37.5 | 43.8 | 46.7 |
| Coul./Mil | 4.6 | 5.0 | 5.8 | 4.3 | 5.0 | 5.4 |
| Number | 93N | 94N | 95N | 96N | 97N | 98N |
| Wt. Gain | .83 | .79 | .79 | .71 | .71 | .75 |
| Surfactant | Triton 165 | Triton 165 | Triton 165 | Triton 165 | Triton 165 | Triton 165 |
| Polarity | Nonionic | Nonionic | Nonionic | Nonionic | Nonionic | Nonionic |
| HLB # | 16 | 16 | 16 | 16 | 16 | 16 |
| % Surfactant | 20% | 20% | 20% | 20% | 20% | 20% |
| % Solids | 16.39 | 16.39 | 16.39 | 16.39 | 16.39 | 16.39 |
| Bath pH | 6.4 | 6.4 | 6.4 | 6.4 | 6.4 | 6.4 |
| Cond. ($\mu$mhos) | 1205.4 | 1205.4 | 1205.4 | 1205.4 | 1205.4 | 1205.4 |
| D.C. Volts | 100 | 100 | 150 | 150 | 200 | 200 |
| Final Amps | .1 | .1 | .1 | .1 | .1 | .1 |
| Coulombs | 30 | 28 | 29 | 25 | 29 | 28 |
| Thickness (Mil) | 9.8 | 10.5 | 9.1 | 10.1 | 9.2 | 9.8 |
| Appearance | US | US | US | US | US | US |
| Density (g/cc) | 0.74 | 0.66 | 0.76 | 0.61 | 0.67 | 0.67 |
| Coul./Gram | 36.1 | 35.4 | 36.7 | 35.2 | 40.8 | 37.3 |
| Coul./Mil | 3.1 | 2.7 | 3.2 | 2.5 | 3.2 | 2.9 |

Resin: Cationic Epoxy, PPG ZN6EZ506

| Number | 270 | 280 | 290 | 300 | 310 | 320 |
|---|---|---|---|---|---|---|
| Wt. Gain | .10 | .10 | .10 | .14 | .15 | .16 |
| Surfactant | Pluronic L44 | Pluronic L44 | Pluronic L44 | Pluronic L44 | Pluronic L44 | Pluronic L44 |
| Polarity | Nonionic | Nonionic | Nonionic | Nonionic | Nonionic | Nonionic |
| HLB # | 16 | 16 | 16 | 16 | 16 | 16 |
| % Surfactant | 1% | 1% | 1% | 1% | 1% | 1% |
| % Solids | 17.58 | 17.58 | 17.58 | 17.58 | 17.58 | 17.58 |
| Bath pH | 6.1 | 6.1 | 6.1 | 6.1 | 6.1 | 6.1 |
| Cond. ($\mu$mhos) | 1499 | 1499 | 1499 | 1499 | 1499 | 1499 |
| D.C. Volts | 100 | 100 | 150 | 150 | 200 | 200 |
| Final Amps | 0 | 0 | 0 | 0 | 0 | 0 |
| Coulombs | 5 | 5 | 5 | 6 | 7 | 7 |
| Thickness (Mil) | 0.2 | 0.2 | 0.8 | 0.9 | 1.1 | 1.2 |
| Appearance | US | US | US | US | US | US |
| Density (g/cc) | 4.35 | 4.35 | 1.09 | 1.36 | 1.19 | 1.16 |
| Coul./Gram | 50 | 50 | 50 | 42.9 | 46.7 | 43.8 |
| Coul./Mil | 25 | 25 | 6.3 | 6.7 | 6.3 | 5.8 |
| Number | 330 | 340 | 350 | 360 | 370 | 380 |
| Wt. Gain | .10 | .09 | .12 | .12 | .12 | .14 |
| Surfactant | Pluronic L44 | Pluronic L44 | Pluronic L44 | Pluronic L44 | Pluronic L44 | Pluronic L44 |
| Polarity | Nonionic | Nonionic | Nonionic | Nonionic | Nonionic | Nonionic |
| HLB # | 16 | 16 | 16 | 16 | 16 | 16 |
| % Surfactant | 3% | 3% | 3% | 3% | 3% | 3% |
| % Solids | 17.58 | 17.58 | 17.58 | 17.58 | 17.58 | 17.58 |
| Bath pH | 6.1 | 6.1 | 6.1 | 6.1 | 6.1 | 6.1 |
| Cond. ($\mu$mhos) | 1499 | 1499 | 1499 | 1499 | 1499 | 1499 |
| D.C. Volts | 100 | 100 | 150 | 150 | 200 | 200 |
| Final Amps | 0 | 0 | 0 | 0 | 0 | 0 |

TABLE IX-continued

| | | | | | | |
|---|---|---|---|---|---|---|
| Coulombs | 6 | 6 | 6 | 7 | 8 | 8 |
| Thickness (Mil) | 0.4 | 0.5 | 0.9 | 1.0 | 1.2 | 1.3 |
| Appearance | US | US | US | US | US | US |
| Density (g/cc) | 2.18 | 1.57 | 1.16 | 1.05 | 0.87 | 0.94 |
| Coul./Gram | 60 | 67 | 50 | 58 | 67 | 57 |
| Coul./Mil | 15.0 | 12.0 | 6.7 | 7.0 | 6.7 | 6.2 |
| Number | 210 | 220 | 230 | 240 | 250 | 260 |
| Wt. Gain | .18 | .17 | .24 | .24 | .38 | .27 |
| Surfactant | Pluronic L44 | Pluronic L44 | Pluronic L44 | Pluronic L44 | Pluronic L44 | Pluronic L44 |
| Polarity | Nonionic | Nonionic | Nonionic | Nonionic | Nonionic | Nonionic |
| HLB # | 16 | 16 | 16 | 16 | 16 | 16 |
| % Surfactant | 20% | 20% | 20% | 20% | 20% | 20% |
| % Solids | 17.58 | 17.58 | 17.58 | 17.58 | 17.58 | 17.58 |
| Bath pH | 6.1 | 6.1 | 6.1 | 6.1 | 6.1 | 6.1 |
| Cond. (μmhos) | 1323 | 1323 | 1323 | 1323 | 1323 | 1323 |
| D.C. Volts | 100 | 100 | 150 | 150 | 200 | 200 |
| Final Amps | 0 | 0 | .1 | .1 | .2 | .1 |
| Coulombs | 9 | 9 | 12 | 12 | 14 | 12 |
| Thickness (Mil) | 1.7 | 1.6 | 2.0 | 2.1 | 3.2 | 2.7 |
| Appearance | US | US | PR | PR | PR | PR |
| Density (g/cc) | 0.92 | 0.93 | 1.04 | 1.00 | 1.04 | 0.87 |
| Coul./Gram | 50 | 53 | 50 | 50 | 37 | 44 |
| Coul./Mil | 5.3 | 5.6 | 6.0 | 5.7 | 4.4 | 4.4 |
| Resin: Anionic Epoxy, PPG JF3EZ445 | | | | | | |
| Number | 390 | 400 | 410 | 420 | 430 | 440 |
| Wt. Gain | .12 | .12 | .17 | .16 | .30 | .30 |
| Surfactant | Triton X35 | Triton X35 | Triton X35 | Triton X35 | Triton X35 | Triton X35 |
| Polarity | Nonionic | Nonionic | Nonionic | Nonionic | Nonionic | Nonionic |
| HLB # | 8 | 8 | 8 | 8 | 8 | 8 |
| % Surfactant | 1% | 1% | 1% | 1% | 1% | 1% |
| % Solids | 8.06 | 8.06 | 8.06 | 8.06 | 8.06 | 8.06 |
| Bath pH | 7.8 | 7.8 | 7.8 | 7.8 | 7.8 | 7.8 |
| Cond. (μmhos) | 1764 | 1764 | 1764 | 1764 | 1764 | 1764 |
| D.C. Volts | 100 | 100 | 150 | 150 | 200 | 200 |
| Final Amps | 0 | 0 | .1 | .1 | .1 | .1 |
| Coulombs | 11 | 11 | 15 | 14 | 25 | 25 |
| Thickness (Mil) | .7 | .6 | 1.2 | 1.1 | 2.5 | 2.6 |
| Appearance | US | US | US | US | US | US |
| Density (g/cc) | 1.49 | 1.74 | 1.24 | 1.27 | 1.05 | 1.01 |
| Coul./Gram | 92 | 92 | 88 | 88 | 83 | 83 |
| Coul./Mil | 15.7 | 18.3 | 12.2 | 12.7 | 10.0 | 9.6 |
| Number | 450 | 460 | 470 | 480 | 490 | 500 |
| Wt. Gain | .11 | .12 | .16 | .15 | .31 | .30 |
| Surfactant | Triton X35 | Triton X35 | Triton X35 | Triton X35 | Triton X35 | TritonX35 |
| Polarity | Nonionic | Nonionic | Nonionic | Nonionic | Nonionic | Nonionic |
| HLB # | 8 | 8 | 8 | 8 | 8 | 8 |
| % Surfactant | 3% | 3% | 3% | 3% | 3% | 3% |
| % Solids | 8.06 | 8.06 | 8.06 | 8.06 | 8.06 | 8.06 |
| Bath pH | 7.7 | 7.7 | 7.7 | 7.7 | 7.7 | 7.7 |
| Cond. (μmhos) | 1617 | 1617 | 1617 | 1617 | 1617 | 1617 |
| D.C. Volts | 100 | 100 | 150 | 150 | 200 | 200 |
| Final Amps | 0 | 0 | .1 | .1 | .1 | .1 |
| Coulombs | 12 | 12 | 15 | 15 | 28 | 27 |
| Thickness (Mil) | 0.9 | 0.9 | 1.2 | 1.3 | 3.2 | 2.9 |
| Appearance | US | US | US | US | US | US |
| Density (g/cc) | 1.07 | 1.16 | 1.16 | 1.01 | 0.84 | 0.90 |
| Coul./Gram | 109 | 100 | 94 | 100 | 90 | 90 |
| Coul./Mil | 13.3 | 13.3 | 12.5 | 11.5 | 8.8 | 9.3 |
| Number | 510 | 520 | 530 | 540 | 550 | |
| Wt. Gain | .21 | .21 | .37 | .38 | .66 | |
| Surfactant | Triton X35 | Triton X35 | Triton X35 | Triton X35 | Triton X35 | |
| Polarity | Nonionic | Nonionic | Nonionic | Nonionic | Nonionic | |
| HLB | 8 | 8 | 8 | 8 | 8 | |
| % Surfactant | 20% | 20% | 20% | 20% | 20% | |
| % Solids | 8.06 | 8.06 | 8.06 | 8.06 | 8.06 | |
| Bath pH | 7.6 | 7.6 | 7.6 | 7.6 | 7.6 | |
| Cond. (μmhos) | 1705 | 1705 | 1705 | 1705 | 1705 | |
| D.C. Volts | 100 | 100 | 150 | 150 | 200 | |
| Final Amps | 0.1 | 0.1 | 0.2 | 0.2 | 1.7 | |
| Coulombs | 17 | 17 | 28 | 30 | 143 | |
| Thickness (Mil) | 1.7 | 1.7 | 2.8 | 2.9 | 3.7 | |
| Appearance | US | US | US | US | US | |
| Density (g/cc) | 1.08 | 1.08 | 1.15 | 1.14 | 1.56 | |
| Coul./Gram | 91 | 81 | 76 | 79 | 217 | |
| Coul./Mil | 10.0 | 10.0 | 10.0 | 10.3 | 38.6 | |
| Resin: Anionic Polyester Spencer Kellogg Kelso 2080 | | | | | | |
| Number | 760 | 770 | 780 | 790 | 800 | 810 |
| Wt. Gain | .14 | .14 | .16 | .17 | .22 | .22 |
| Surfactant | Pluronic L42 | Pluronic L42 | Pluronic L42 | Pluronic L42 | Pluronic L42 | Pluronic L42 |
| Polarity | Nonionic | Nonionic | Nonionic | Nonionic | Nonionic | Nonionic |
| HLB # | 8 | 8 | 8 | 8 | 8 | 8 |

TABLE IX-continued

| % Surfactant | 1% | 1% | 1% | 1% | 1% | 1% |
|---|---|---|---|---|---|---|
| % Solids | 7.22 | 7.22 | 7.22 | 7.22 | 7.22 | 7.22 |
| Bath pH | 7.5 | 7.5 | 7.5 | 7.5 | 7.5 | 7.5 |
| Cond. (μmhos) | 764 | 764 | 764 | 764 | 764 | 764 |
| D.C. Volts | 100 | 100 | 150 | 150 | 200 | 200 |
| Final Amps | 0 | 0 | 0.1 | 0.1 | 0.1 | 0.1 |
| Coulombs | 13 | 13 | 16 | 16 | 21 | 21 |
| Thickness (Mil) | 0.8 | 0.8 | 1.2 | 1.2 | 1.9 | 1.8 |
| Appearance | US | US | US | US | US | US |
| Density (g/cc) | 1.52 | 1.52 | 1.16 | 1.24 | 1.01 | 1.06 |
| Coul./Gram | 93 | 93 | 100 | 94 | 95 | 95 |
| Coul./Mil | 16.25 | 16.25 | 13.33 | 13.33 | 11.05 | 11.67 |
| Number | 820 | 830 | 840 | 850 | 860 | 870 |
| Wt. Gain | .14 | .13 | .20 | .20 | .22 | .27 |
| Surfactant | Pluronic L42 | Pluronic L42 | Pluronic L42 | Pluronic L42 | Pluronic L42 | Pluronic L42 |
| Polarity | Nonionic | Nonionic | Nonionic | Nonionic | Nonionic | Nonionic |
| HLB # | 8 | 8 | 8 | 8 | 8 | 8 |
| % Surfactant | 3% | 3% | 3% | 3% | 3% | 3% |
| % Solids | 7.22 | 7.22 | 7.22 | 7.22 | 7.22 | 7.22 |
| Bath pH | 7.5 | 7.5 | 7.5 | 7.5 | 7.5 | 7.5 |
| Cond. (μmhos) | 764 | 764 | 764 | 764 | 764 | 764 |
| D.C. Volts | 100 | 100 | 150 | 150 | 200 | 200 |
| Final Amps | 0 | 0 | .1 | .1 | .1 | .1 |
| Coulombs | 13 | 14 | 19 | 18 | 22 | 25 |
| Thickness (Mil) | 0.8 | 0.8 | 1.5 | 1.6 | 1.9 | 2.2 |
| Appearance | US | US | US | US | US | US |
| Density (g/cc) | 1.53 | 1.42 | 1.16 | 1.09 | 1.01 | 1.07 |
| Coul./Gram | 92.9 | 107.6 | 95.0 | 90.0 | 100 | 92.6 |
| Coul./Mil | 16.3 | 17.5 | 12.7 | 11.3 | 11.6 | 11.4 |
| Number | 700 | 710 | 720 | 730 | 740 | 750 |
| Wt. Gain | .18 | .19 | .45 | .52 | .65 | .64 |
| Surfactant | Pluronic L42 | Pluronic L42 | Pluronic L42 | Pluronic L42 | Pluronic L42 | Pluronic L42 |
| Polarity | Nonionic | Nonionic | Nonionic | Nonionic | Nonionic | Nonionic |
| HLB # | 8 | 8 | 8 | 8 | 8 | 8 |
| % Surfactant | 20% | 20% | 20% | 20% | 20% | 20% |
| % Solids | 7.22 | 7.22 | 7.22 | 7.22 | 7.22 | 7.22 |
| Bath pH | 7.5 | 7.5 | 7.5 | 7.5 | 7.5 | 7.5 |
| Cond. (μmhos) | 793 | 793 | 793 | 793 | 793 | 793 |
| D.C. Volts | 100 | 100 | 150 | 150 | 200 | 200 |
| Final Amps | 0.1 | 0.1 | 0.2 | 0.2 | 0.3 | 0.3 |
| Coulombs | 17 | 17 | 37 | 40 | 54 | 55 |
| Thickness (Mil) | 1.5 | 1.4 | 3.5 | 4.0 | 5.1 | 5.5 |
| Appearance | US | US | US | US | US | US |
| Density (g/cc) | 1.05 | 1.18 | 1.12 | 1.13 | 1.11 | 1.01 |
| Coul./Gram | 94 | 89 | 82 | 77 | 83 | 86 |
| Coul./Mil | 11.33 | 12.14 | 10.57 | 10.00 | 10.59 | 10.00 |

| Resin: Anionic Acrylic, Jamestown Paint Co. JAPCO92813 | | | | | | |
|---|---|---|---|---|---|---|
| Number | 880 | 890 | 900 | 910 | 920 | 930 |
| Wt. Gain | .14 | .14 | .18 | .17 | .23 | .21 |
| Surfactant | Triton X35 | Triton X35 | Triton X35 | Triton X35 | Triton X35 | Triton X35 |
| Polarity | Nonionic | Nonionic | Nonionic | Nonionic | Nonionic | Nonionic |
| HLB # | 8 | 8 | 8 | 8 | 8 | 8 |
| % Surfactant | 1% | 1% | 1% | 1% | 1% | 1% |
| % Solids | 7.30 | 7.30 | 7.30 | 7.30 | 7.30 | 7.30 |
| Bath pH | 7.8 | 7.8 | 7.8 | 7.8 | 7.8 | 7.8 |
| Cond. (μmhos) | 596 | 596 | 596 | 596 | 596 | 596 |
| D.C. Volts | 100 | 100 | 150 | 150 | 200 | 200 |
| Final Amps | 0 | 0 | 0 | 0 | .1 | .1 |
| Coulombs | 11 | 12 | 15 | 15 | 17 | 16 |
| Thickness (Mil) | 1.3 | 1.3 | 1.7 | 1.8 | 1.9 | 2.1 |
| Appearance | US | US | S | S | S | S |
| Density (g/cc) | 0.94 | 0.94 | 0.82 | 0.82 | 1.06 | 0.87 |
| Coul./Gram | 78.6 | 85.7 | 83.3 | 88.2 | 73.9 | 76.2 |
| Coul./Mil | 8.5 | 9.2 | 8.8 | 8.3 | 8.9 | 7.6 |
| Number | 940 | 950 | 960 | 970 | 980 | 990 |
| Wt. Gain | .17 | .16 | .19 | .19 | .27 | .26 |
| Surfactant | Triton X35 | Triton X35 | Triton X35 | Triton X35 | Triton X35 | Triton X35 |
| Polarity | Nonionic | Nonionic | Nonionic | Nonionic | Nonionic | Nonionic |
| HLB # | 8 | 8 | 8 | 8 | 8 | 8 |
| % Surfactant | 3% | 3% | 3% | 3% | 3% | 3% |
| % Solids | 7.30 | 7.30 | 7.30 | 7.30 | 7.30 | 7.30 |
| Bath pH | 7.8 | 7.8 | 7.8 | 7.8 | 7.8 | 7.8 |
| Cond. (μmhos) | 648 | 648 | 648 | 648 | 648 | 648 |
| D.C. Volts | 100 | 100 | 150 | 150 | 200 | 200 |
| Final Amps | 0 | 0 | .1 | .1 | .1 | .1 |
| Colulombs | 13 | 12 | 14 | 15 | 18 | 18 |
| Thickness (Mil) | 1.3 | 1.4 | 1.5 | 1.8 | 2.2 | 2.3 |
| Appearance | S | S | S | S | S | S |
| Density (g/cc) | 1.14 | 1.00 | 1.10 | 0.92 | 1.07 | 0.98 |
| Coul./Gram | 76 | 75 | 74 | 79 | 67 | 69 |
| Coul./Mil | 10.00 | 8.57 | 9.33 | 8.33 | 8.18 | 7.83 |
| Number | 1P | 2P | 3P | 4P | 5P | 6P |

TABLE IX-continued

| Wt. Gain | .38 | .40 | .62 | .65 | .19 | .18 |
|---|---|---|---|---|---|---|
| Surfactant | Triton X35 | Triton X35 | Triton X35 | Triton X35 | Triton X35 | Triton X35 |
| Polarity | Nonionic | Nonionic | Nonionic | Nonionic | Nonionic | Nonionic |
| HLB # | 8 | 8 | 8 | 8 | 8 | 8 |
| % Surfactant | 20% | 20% | 20% | 20% | 20% | 20% |
| % Solids | 7.30 | 7.30 | 7.30 | 7.30 | 7.30 | 7.30 |
| Bath pH | 7.8 | 7.8 | 7.8 | 7.8 | 7.8 | 7.8 |
| Cond. ($\mu$mhos) | 735 | 735 | 735 | 735 | 735 | 735 |
| D.C. Volts | 100 | 100 | 150 | 150 | 50 | 50 |
| Final Amps | .2 | .2 | .5 | .6 | .1 | .1 |
| Coulombs | 24 | 25 | 54 | 62 | 14 | 14 |
| Thickness (Mil) | 2.7 | 2.8 | 9.4 | 8.5 | 1.3 | 1.3 |
| Appearance | US | US | PR | PR | S | S |
| Density (g/cc) | 1.23 | 1.24 | 0.58 | 0.67 | 1.27 | 1.71 |
| Coul./Gram | 63 | 62 | 87 | 95 | 74 | 78 |
| Coul./Mil | 8.89 | 8.93 | 5.74 | 7.29 | 10.77 | 10.77 |

TABLE X

Resin: Cationic Epoxy, PPG ZN6EZ506

| Number | 51N | 52N | 53N | 54N | 55N | 56N | 39N | 40N | 41N | 42N | 43N | 44N |
|---|---|---|---|---|---|---|---|---|---|---|---|---|
| Wt. Gain | .23 | .22 | .27 | .25 | .33 | .35 | .09 | .09 | .11 | .11 | .16 | .16 |
| Surfactant | Triton X35 | Triton X35 | Triton X35 | Triton X35 | Triton X35 | Triton X35 | Triton X35 | Triton X35 | Triton X35 | Triton X35 | Triton X35 | Triton X35 |
| Polarity | Nonionic | Nonionic | Nonionic | Nonionic | Nonionic | Nonionic | Nonionic | Nonionic | Nonionic | Nonionic | Nonionic | Nonionic |
| HLB # | 8 | 8 | 8 | 8 | 8 | 8 | 8 | 8 | 8 | 8 | 8 | 8 |
| % Surfactant | 20% | 20% | 20% | 20% | 20% | 20% | 1% | 1% | 1% | 1% | 1% | 1% |
| % Solvent | | | | | | | 1% | 1% | 1% | 1% | 1% | 1% |
| % Solids | 21.24 | 21.24 | 21.24 | 21.24 | 21.24 | 21.24 | 21.24 | 21.24 | 21.24 | 21.24 | 21.24 | 21.24 |
| Bath pH | 6.2 | 6.2 | 6.2 | 6.2 | 6.2 | 6.2 | 6.1 | 6.1 | 6.1 | 6.1 | 6.1 | 6.1 |
| Cond. (μmhos) | 1764 | 1764 | 1764 | 1764 | 1764 | 1764 | 1558 | 1558 | 1558 | 1558 | 1558 | 1558 |
| D.C. Volts | 100 | 100 | 150 | 150 | 200 | 200 | 100 | 100 | 150 | 150 | 200 | 200 |
| Final Amps | 0 | 0 | 0 | 0 | 0.1 | 0.1 | 0 | 0 | 0 | 0 | 0 | 0 |
| Coulombs | 10 | 10 | 11 | 11 | 13 | 13 | 6 | 6 | 6 | 6 | 7 | 8 |
| Thickness (Mil) | 1.6 | 1.6 | 2.1 | 2.0 | 2.6 | 2.5 | 0.4 | 0.4 | 0.6 | 0.6 | 1.1 | 1.1 |
| Appearance | S | S | US | US | US | US | S | S | S | S | S | S |
| Density (g/cc) | 1.25 | 1.20 | 1.12 | 1.09 | 1.11 | 1.22 | 1.96 | 1.96 | 1.60 | 1.60 | 1.27 | 1.27 |
| Coul./Gram | 43 | 45 | 41 | 44 | 39 | 37 | 67 | 67 | 54 | 54 | 44 | 50 |
| Coul./Mil | 6.2 | 6.2 | 5.2 | 5.5 | 5.0 | 5.2 | 15.0 | 15.0 | 10.0 | 10.0 | 6.4 | 7.3 |

| Number | 93K | 94K | 95K | 96K | 97K | 98K | 87K | 88K | 89K | 90K | 91K | 92K |
|---|---|---|---|---|---|---|---|---|---|---|---|---|
| Wt. Gain | .08 | .08 | .11 | .11 | .13 | .12 | .23 | .23 | .23 | .23 | .50 | .51 |
| Surfactant | Tween 40 | Tween 40 | Tween 40 | Tween 40 | Tween 40 | Tween 40 | Tween 40 | Tween 40 | Tween 40 | Tween 40 | Tween 40 | Tween 40 |
| Polarity | Nonionic | Nonionic | Nonionic | Nonionic | Nonionic | Nonionic | Nonionic | Nonionic | Nonionic | Nonionic | Nonionic | Nonionic |
| HLB # | 15.6 | 15.6 | 15.6 | 15.6 | 15.6 | 15.6 | 15.6 | 15.6 | 15.6 | 15.6 | 15.6 | 15.6 |
| % Surfactant | 3.8% | 3.8% | 3.8% | 3.8% | 3.8% | 3.8% | 1.13% | 1.13% | 1.13% | 1.13% | 1.13% | 1.13% |
| % Solvent | 3.8% | 3.8% | 3.8% | 3.8% | 3.8% | 3.8% | 1.13% | 1.13% | 1.13% | 1.13% | 1.13% | 1.13% |
| % Solids | 17.44 | 17.44 | 17.44 | 17.44 | 17.44 | 17.44 | 17.44 | 17.44 | 17.44 | 17.44 | 17.44 | 17.44 |
| Bath pH | 6.2 | 6.2 | 6.2 | 6.2 | 6.2 | 6.2 | 6.1 | 6.1 | 6.1 | 6.1 | 6.1 | 6.1 |
| Cond. (μmhos) | 1400 | 1400 | 1400 | 1400 | 1400 | 1400 | 1280 | 1280 | 1280 | 1280 | 1280 | 1280 |
| D.C. Volts | 100 | 100 | 150 | 150 | 200 | 200 | 100 | 100 | 150 | 150 | 200 | 200 |
| Final Amps | 0 | 0 | 0 | 0 | 0 | 0 | 0 | 0 | 0 | 0 | .6 | .6 |
| Coulombs | 6 | 6 | 7 | 7 | 8 | 7 | 12 | 12 | 13 | 13 | 70 | 84 |
| Thickness (Mil) | .4 | .4 | .9 | .9 | 1.0 | 1.1 | 1.9 | 1.8 | 2.1 | 1.9 | 4.5 | 4.6 |
| Appearance | S | S | S | S | S | S | PR | PR | PR | PR | US | US |
| Density (g/cc) | 1.74 | 1.74 | 1.07 | 1.07 | 1.13 | 0.95 | 1.06 | 1.11 | 0.96 | 1.06 | 0.97 | 0.97 |
| Coul./Gram | 75 | 75 | 63.6 | 63.6 | 61.5 | 58.3 | 52.1 | 52.1 | 56.5 | 56.5 | 140 | 164.7 |
| Coul./Mil | 15 | 15 | 7.8 | 7.8 | 8 | 6.4 | 6.3 | 6.7 | 6.2 | 6.8 | 15.6 | 18.3 |

| Number | 99K | 1L | 2L | 3L | 4L | 5L | 18L | 19L | 20L | 21L | 22L | 23L |
|---|---|---|---|---|---|---|---|---|---|---|---|---|
| Wt. Gain | .12 | .12 | .13 | .14 | .17 | .16 | .16 | .15 | .19 | .19 | .19 | .21 |
| Surfactant | Tween 40 | Tween 40 | Tween 40 | Tween 40 | Tween 40 | Tween 40 | Pluronic L42 | Pluronic L42 | Pluronic L42 | Pluronic L42 | Pluronic L42 | Pluronic L42 |
| Polarity | Nonionic | Nonionic | Nonionic | Nonionic | Nonionic | Nonionic | Nonionic | Nonionic | Nonionic | Nonionic | Nonionic | Nonionic |
| HLB # | 15.6 | 15.6 | 15.6 | 15.6 | 15.6 | 15.6 | 8 | 8 | 8 | 8 | 8 | 8 |
| % Surfactant | 3.8% | 3.8% | 3.8% | 3.8% | 3.8% | 3.8% | 7.5% | 7.5% | 7.5% | 7.5% | 7.5% | 7.5% |
| % Solvent | 3.8% | 3.8% | 3.8% | 3.8% | 3.8% | 3.8% | | | | | | |
| % Solids | 17.44 | 17.44 | 17.44 | 17.44 | 17.44 | 17.44 | 17.44 | 17.44 | 17.44 | 17.44 | 17.44 | 17.44 |
| Bath pH | 6.1 | 6.1 | 6.1 | 6.1 | 6.1 | 6.1 | 6.2 | 6.2 | 6.2 | 6.2 | 6.2 | 6.2 |
| Cond. (μmhos) | 1920 | 1920 | 1920 | 1920 | 1920 | 1920 | 1820 | 1820 | 1820 | 1820 | 1820 | 1820 |
| D.C. Volts | 100 | 100 | 150 | 150 | 200 | 200 | 100 | 100 | 150 | 150 | 200 | 200 |
| Final Amps | 0 | 0 | 0 | 0 | 0 | 0 | 0 | 0 | 0 | 0 | 0 | 0 |
| Coulombs | 7 | 7 | 8 | 7 | 8 | 8 | 6 | 6 | 7 | 7 | 6 | 7 |
| Thickness (Mil) | 1.0 | 1.3 | 1.1 | 1.1 | 1.3 | 1.3 | 1.2 | 0.9 | 1.5 | 1.5 | 1.6 | 1.7 |

TABLE X-continued

| Number | 24L | 25L | 26L | 27L | 28L | 29L | 12L | 13L | 14L | 15L | 16L | 17L |
|---|---|---|---|---|---|---|---|---|---|---|---|---|
| Appearance | S | S | S | S | S | S | S | S | US | US | US | US |
| Density (g/cc) | 1.05 | 0.8 | 1.03 | 1.11 | 1.14 | 1.07 | 1.16 | 1.45 | 1.10 | 1.10 | 1.04 | 1.08 |
| Coul./Gram | 58.3 | 58.3 | 61.5 | 50 | 47.1 | 50 | 38 | 40 | 37 | 37 | 32 | 33 |
| Coul./Mil | 7 | 5.4 | 7.3 | 6.4 | 6.1 | 6.2 | 5.0 | 6.7 | 4.7 | 4.7 | 3.8 | 4.1 |

Resin: Cationic Acrylic, PPG

| Number | 54L | 55L | 56L | 57L | 58L | 59L | 66L | 67L | 68L | 69L | 70L | 71L |
|---|---|---|---|---|---|---|---|---|---|---|---|---|
| Wt. Gain | .06 | .07 | .07 | .11 | .13 | .13 | .19 | .19 | .21 | .21 | .27 | .29 |
| Surfactant | Triton X35 | Triton X35 | Triton X35 | Triton X35 | Triton X35 | Triton X35 | Tween 40 | Tween 40 | Tween 40 | Tween 40 | Tween 40 | Tween 40 |
| Polarity | Nonionic | Nonionic | Nonionic | Nonionic | Nonionic | Nonionic | Nonionic | Nonionic | Nonionic | Nonionic | Nonionic | Nonionic |
| HLB # | 8 | 8 | 8 | 8 | 8 | 8 | 15.6 | 15.6 | 15.6 | 15.6 | 15.6 | 15.6 |
| % Surfactant | 7.5% | 7.5% | 7.5% | 7.5% | 7.5% | 7.5% | 7.5% | 7.5% | 7.5% | 7.5% | 7.5% | 7.5% |
| % Solvent | | | | | | | | | | | | |
| % Solids | 17.44 | 17.44 | 17.44 | 17.44 | 17.44 | 17.44 | 17.44 | 17.44 | 17.44 | 17.44 | 17.44 | 17.44 |
| Bath pH | 6.2 | 6.2 | 6.2 | 6.2 | 6.2 | 6.2 | 6.2 | 6.2 | 6.2 | 6.2 | 6.2 | 6.2 |
| Cond. (μmhos) | 2002 | 2002 | 2002 | 2002 | 2002 | 2002 | 1620 | 1620 | 1620 | 1620 | 1620 | 1620 |
| D.C. Volts | 100 | 100 | 150 | 150 | 200 | 200 | 100 | 100 | 150 | 150 | 200 | 200 |
| Final Amps | 0 | 0 | 0 | 0 | 0 | 0 | 0 | 0 | 0 | 0 | 0 | 0 |
| Coulombs | 6 | 7 | 7 | 7 | 8 | 8 | 9 | 9 | 9 | 9 | 10 | 10 |
| Thickness (Mil) | 1.3 | 1.3 | 1.5 | 1.6 | 1.8 | 1.8 | 1.6 | 1.5 | 1.8 | 1.7 | 1.8 | 1.9 |
| Appearance | S | US | US | US | US | US | US | US | US | US | US | US |
| Density (g/cc) | 1.01 | 0.94 | 0.99 | 0.93 | 0.92 | 0.97 | 0.93 | 0.99 | 0.92 | 0.97 | 1.02 | 0.92 |
| Coul./Gram | 40 | 50 | 41 | 41 | 42 | 40 | 53 | 53 | 47 | 47 | 48 | 50 |
| Coul./Mil | 4.6 | 5.4 | 4.7 | 4.4 | 4.4 | 4.4 | 5.6 | 6.0 | 5.0 | 5.3 | 5.6 | 5.3 |

Resin: Anionic Acrylic, JAPCO 92813

| Number | 72L | 73L | 74L | 75L | 76L | 77L | 78L | 79L | 80L | 81L | 82L | 83L |
|---|---|---|---|---|---|---|---|---|---|---|---|---|
| Wt. Gain | .17 | .17 | .21 | .21 | .27 | .33 | .12 | .11 | .15 | .16 | .21 | .21 |
| Surfactant | Pluronic L42 | Pluronic L42 | Pluronic L42 | Pluronic L42 | Pluronic L42 | Pluronic L42 | Pluronic L42 | Pluronic L42 | Pluronic L44 | Pluronic L44 | Pluronic L44 | Pluronic L44 |
| Polarity | Nonionic | Nonionic | Nonionic | Nonionic | Nonionic | Nonionic | Nonionic | Nonionic | Nonionic | Nonionic | Nonionic | Nonionic |
| HLB # | 8 | 8 | 8 | 8 | 8 | 8 | 16 | 16 | 16 | 16 | 16 | 16 |
| % Surfactant | 7.5 | 7.5 | 7.5 | 7.5 | 7.5 | 7.5 | 7.5 | 7.5 | 7.5 | 7.5 | 7.5 | 7.5 |
| % Solids | 7.45 | 7.45 | 7.45 | 7.45 | 7.45 | 7.45 | 7.45 | 7.45 | 7.45 | 7.45 | 7.45 | 7.45 |
| Bath pH | 7.4 | 7.4 | 7.4 | 7.4 | 7.4 | 7.4 | 7.8 | 7.8 | 7.8 | 7.8 | 7.8 | 7.8 |
| Cond. (μmhos) | 846 | 846 | 846 | 846 | 846 | 846 | 846 | 846 | 846 | 846 | 846 | 846 |
| D.C. Volts | | 100 | 150 | 150 | 200 | 200 | 100 | 100 | 150 | 150 | 200 | 200 |
| Final Amps | | 0.2 | 0 | 0.4 | | 0 | 0.1 | 0.1 | 0.1 | 0.1 | 0.1 | 0.1 |
| Coulombs | | 5 | 6 | 6 | | 7 | 18 | 18 | 18 | 17 | 20 | 20 |
| Thickness (Mil) | | 0.2 | 0.2 | 0.4 | 1.1 | 1.1 | 1.6 | 1.7 | 1.8 | 1.8 | 2.4 | 2.5 |
| Appearance | | S | S | S | S | S | S | US | S | S | S | US |
| Density (g/cc) | 2.62 | 3.05 | 3.05 | 2.40 | 1.03 | 1.03 | 1.04 | 0.97 | 1.02 | 1.02 | 0.98 | 1.01 |
| Coul./Gram | 83 | 71 | 86 | 55 | 54 | 54 | 95 | 95 | 86 | 81 | 74 | 69 |
| Coul./Mil 25.0 | | 30.0 | 15.0 | 6.4 | 6.4 | 11.2 | 10.6 | 10.0 | 9.4 | 8.3 | 8.0 | |

TABLE X-continued

| D.C. Volts | 100 | 100 | 150 | 150 | 200 | 200 | 100 | 100 | 150 | 150 | 200 | 200 |
|---|---|---|---|---|---|---|---|---|---|---|---|---|
| Final Amps | 0.1 | 0.1 | 0.1 | 0.1 | 0.1 | 0.1 | 0 | 0 | 0.1 | 0.1 | 0.1 | 0.1 |
| Coulombs | 12 | 13 | 15 | 16 | 19 | 22 | 12 | 11 | 15 | 15 | 18 | 19 |
| Thickness (Mil) | 1.3 | 1.4 | 1.8 | 1.8 | 2.2 | 2.6 | 1.2 | 1.2 | 1.7 | 1.6 | 2.1 | 2.1 |
| Appearance | US | US | S | S | S | US | S | S | S | S | S | S |
| Density (g/cc) | 1.14 | 1.06 | 1.02 | 1.02 | 1.07 | 1.11 | 0.87 | 0.80 | 0.77 | 0.87 | 0.87 | 0.87 |
| Coul./Gram | 71 | 76 | 71 | 76 | 70 | 67 | 100 | 100 | 100 | 94 | 86 | 90 |
| Coul./Mil | 9.2 | 9.3 | 8.3 | 8.9 | 8.6 | 8.5 | 10.0 | 9.2 | 8.8 | 9.4 | 8.6 | 9.0 |

Resin: Anionic Polyester, Spencer Kellogg Kelso 2080

| Number | 5M | 6M | 7M | 19M | 20M | 21M |
|---|---|---|---|---|---|---|
| Wt. Gain | .08 | .22 | .18 | .15 | .17 | .14 |
| Surfactant | Tween 40 | Tween 40 | Tween 40 | Triton 165 | Triton 165 | Triton 165 |
| Polarity | Nonionic | Nonionic | Nonionic | Nonionic | Nonionic | Nonionic |
| HLB # | 15.6 | 15.6 | 15.6 | 16 | 16 | 16 |
| % Surfactant | 7.5 | 7.5 | 7.5 | 7.5 | 7.5 | 7.5 |
| % Solvent | 7.5 | 7.5 | 7.5 | 7.5 | 7.5 | 7.5 |
| % Solids | 7.05 | 7.05 | 7.05 | 7.05 | 7.05 | 7.05 |
| Bath pH | 7.7 | 7.7 | 7.7 | 7.3 | 7.3 | 7.3 |
| Cond. (μmhos) | 1148 | 1148 | 1148 | 2205 | 2205 | 2205 |
| D.C. Volts | 100 | 100 | 150 | 100 | 50 | 50 |
| Final Amps | 1.0 | 1.0 | 1.8 | 2.0 | 0.2 | 0.2 |
| Coulombs | 70 | 81 | 167 | 135 | 20 | 20 |
| Thickness (Mil) | 0.4 | 1.8 | 1.4 | 0.2 | 1.1 | 0.9 |
| Appearance | S | S | US | US | S | S |
| Density (g/cc) | 1.74 | 1.07 | 1.12 | 6.53 | 1.35 | 1.36 |
| Coul./Gram | 875 | 368 | 928 | 900 | 118 | 143 |
| Coul./Mil | 175.0 | 45.0 | 119.3 | 675.0 | 18.2 | 22.2 |

TABLE XI

| Sample No. | 56J | 57J | 58J | 59J | 60J | 61J |
|---|---|---|---|---|---|---|
| Wt. Gain | .37 | .37 | .55 | .55 | .18 | .15 |
| Surfactant | Byk-tone | Byk-tone | Byk-tone | Byk-tone | Byk-tone | Byk-tone |
| Polarity | Non-ionic | Non-ionic | Non-ionic | Non-ionic | Non-ionic | Non-ionic |
| HLB # | 12.2 | 12.2 | 12.2 | 12.2 | 12.2 | 12.2 |
| % Solids Bath | 7.86 | 7.86 | 7.86 | 7.86 | 7.86 | 7.86 |
| Bath pH | 7.5 | 7.5 | 7.5 | 7.5 | 7.5 | 7.5 |
| Cond. (mhos) | 1240 | 1240 | 1240 | 1240 | 1240 | 1240 |
| D.C. Volts | 100 | 100 | 150 | 150 | 50 | 50 |
| Final Amps | 0.3 | 0.3 | 0.4 | 0.4 | 0.1 | 0.1 |
| Coulombs | 31 | 33 | 57 | 58 | 18 | 16 |
| Thickness (Mil) | 5.5 | 4.5 | 6.5 | 6.6 | 1.5 | 1.2 |
| Appearance | US | US | US | US | US | US |
| Density (g/cc) | 0.59 | 0.72 | 0.74 | 0.73 | 1.05 | 1.09 |
| Coul./Gram | 83.8 | 89.2 | 103.6 | 105.5 | 100 | 106.7 |
| Coul./Mil | 5.6 | 7.3 | 8.8 | 8.8 | 12 | 13.3 |

TABLE XII

| Sample No. | 62J | 63J | 64J | 65J | 66J | 67J |
|---|---|---|---|---|---|---|
| Wt. Gain | .29 | .37 | .32 | .34 | .41 | .44 |
| Surfactant | Byk-tone | Byk-tone | Byk-tone | Byk-tone | Byk-tone | Byk-tone |
| Polarity | Non-ionic | Non-ionic | Non-ionic | Non-ionic | Non-ionic | Non-ionic |
| HLB # | 12.2 | 12.2 | 12.2 | 12.2 | 12.2 | 12.2 |
| % Solids Bath | 7.05 | 7.05 | 7.05 | 7.05 | 7.05 | 7.05 |
| Bath pH | 8.0 | 8.0 | 8.0 | 8.0 | 8.0 | 8.0 |
| Cond. (mhos) | 1050 | 1050 | 1050 | 1050 | 1050 | 1050 |
| D.C. Volts | 100 | 100 | 50 | 50 | 150 | 150 |
| Final Amps | .4 | .4 | .2 | .2 | 1.0 | 1.0 |
| Coulombs | 71 | 80 | 52 | 51 | 108 | 134 |
| Thickness (Mil) | 2.7 | 2.8 | 2.6 | 2.8 | 4.0 | 4.2 |
| Appearance | US | US | US | US | US | US |
| Density (g/cc) | 0.94 | 1.15 | 1.07 | 1.06 | 0.89 | 0.91 |
| Coul./Gram | 244.8 | 216.7 | 162.5 | 150 | 263.4 | 304.5 |
| Coul./Mil | 26.3 | 28.6 | 20 | 18.21 | 27 | 31.9 |

TABLE XIII

| Sample No. | 68J | 69J | 70J | 71J | 72J | 73J |
|---|---|---|---|---|---|---|
| Wt. Gain | .10 | .12 | .13 | .13 | .14 | .13 |
| Surfactant | Byk-tone | Byk-tone | Byk-tone | Byk-tone | Byk-tone | Byk-tone |
| Polarity | Non-ionic | Non-ionic | Non-ionic | Non-ionic | Non-ionic | Non-ionic |
| HLB # | 12.2 | 12.2 | 12.2 | 12.2 | 12.2 | 12.2 |
| % Solids Bath | 7.45 | 7.45 | 7.45 | 7.45 | 7.45 | 7.45 |
| Bath pH | 7.9 | 7.9 | 7.9 | 7.9 | 7.9 | 7.9 |
| Cond. (mhos) | 780 | 780 | 780 | 780 | 780 | 780 |
| D.C. Volts | 50 | 50 | 100 | 100 | 150 | 150 |
| Final Amps | .4 | .4 | .9 | .9 | 1.6 | 1.7 |
| Coulombs | 45 | 46 | 100 | 103 | 177 | 188 |
| Thickness (Mil) | 0.9 | 0.9 | 1.2 | 1.3 | 1.6 | 1.8 |
| Appearance | US | US | US | US | US | US |
| Density (g/cc) | 0.97 | 1.16 | 0.94 | 0.87 | 0.76 | 0.63 |
| Coul./Gram | 450 | 383.3 | 769.2 | 792.3 | 1264.2 | 1446.2 |
| Coul./Mil | 50 | 51.1 | 83.3 | 79.2 | 110.6 | 104.4 |

What is claimed is:

1. A process for the electrophoretic deposition of an organic film on a conductive substrate comprising:
   (a) providing an aqueous organic resin bath formed from:
      (i) an organic resin suitable for electrophoretic deposition,
      (ii) water, and
      (iii) above about 1% of a compatible surfactant by weight of solids in said aqeous organic resin bath;
   (b) placing the conductive substrate in said aqueous organic resin bath; and
   (c) passing a current through said substrate effective to deposit said organic resin upon said conductive substrate.

2. The process of claim 1 wherein said organic resin is a cationic resin.

3. The process of claim 2 wherein said compatible surfactant is a nonionic surfactant.

4. The process of claim 2 wherein said compatible surfactant is a cationic surfactant.

5. The process of claim 2 wherein said compatible surfactant is an amphoteric surfactant.

6. The process of claim 1 wherein said resin is an anionic resin.

7. The process of claim 6 wherein said compatible surfactant is an anionic surfactant.

8. The process of claim 6 wherein said compatible surfactant is a nonionic surfactant.

9. The process of claim 6 wherein said compatible surfactant is a cationic surfactant.

10. The process of claim 6 wherein said compatible surfactant is an amphoteric surfactant.

11. A process for the electrophoretic deposition of an organic film on a conductive substrate comprising:
   (a) providing an aqueous organic resin bath formed from:
      (i) an organic resin suitable for electrophoretic deposition,
      (ii) water, and
      (iii) above about 3% of a compatible surfactant by weight of solids in said aqueous organic resin bath;
   (b) placing the conductive substrate in said aqueous organic resin bath; and
   (c) passing a current through said substrate effective to deposit said organic resin upon said conductive substrate.

12. The process of claim 11 wherein said organic resin is a cationic resin.

13. The process of claim 12 wherein said compatible surfactant is a nonionic surfactant.

14. The process of claim 12 wherein said compatible surfactant is a cationic surfactant.

15. The process of claim 12 wherein the said compatible surfactant is an amphoteric surfactant.

16. The process of claim 11 wherein said organic resin is an anionic resin.

17. The process of claim 16 wherein said compatible surfactant is an anionic surfactant.

18. The process of claim 16 wherein said compatible surfactant is a nonionic surfactant.

19. The process of claim 16 wherein said compatible surfactant is a cationic surfactant.

20. The process of claim 16 wherein said compatible surfactant is an amphoteric surfactant.

21. A process for the electrophoretic deposition of an organic film on a conductive substrate comprising:
   (a) providing an aqueous organic resin bath formed from:
      (i) an organic resin suitable for electrophoretic deposition,
      (ii) water, and
      (iii) from about 1% to about 40% of a compatible surfactant by weight of solids in said aqueous organic resin bath;
   (b) placing the conductive substrate in said aqueous organic resin bath; and (c) passing a current through said substrate effective to deposit said organic resin upon said conductive substrate.

22. The process of claim 21 wherein said organic resin is a cationic resin.

23. The process of claim 22 wherein said compatible surfactant is a nonionic surfactant.

24. The process of claim 22 wherein said compatible surfactant is a cationic surfactant.

25. The process of claim 22 wherein said compatible surfactant is an amphoteric surfactant.

26. The process of claim 22 wherein said resin is a cationic epoxy and said surfactant is selected from the group consisting of octylphenoxy polyethoxy ethanol, methyl polyoxyethylene (15) cocoammonium chloride, and block copolymer of propylene oxide and ethylene oxide.

27. The process of claim 22 wherein said resin is a cationic acrylic resin and said surfactant is selected from the group consisting of sorbitan monopalmitate, octylphenoxy polyethoxy ethanol, and block copolymer or propylene oxide and ethylene oxide.

28. The process of claim 22 wherein said resin is a cationic acrylic resin and said surfactant is selected from the group consisting of sorbitan monopalmitate, octylphenoxy polyethoxy ethanol, and block copolymer of propylene oxide and ethylene oxide.

29. The process of claim 22 wherein said resin is a cationic epoxy and said surfactant is selected from the group consisting of octylphenoxy polyethoxy ethanol, methyl polyoxyethylene (15) cocoammonium chloride, and block copolymer of propylene oxide and ethylene oxide;

and said surfactant is in a concentration of from about 1% to about 15% by weight of solids in the aqueous resin bath.

30. The process of claim 22 wherein said resin is a cationic acrylic resin and said surfactant is selected from the group consisting of sorbitan monopalmitate, octylphenoxy polyethoxy ethanol, and block copolymer of propylene oxide and ethylene oxide;

and said surfactant is in a concentration of from about 1% to about 15% by weight of solids in the aqueous resin bath.

31. The process of claim 22 wherein said resin is a cationic acrylic resin and said surfactant is selected from the group consisting of sorbitan monopalmitate, octylphenoxy polyethoxy ethanol, and block copolymer of propylene oxide and ethylene oxide;

and said surfactant is in a concentration of from about 1% to about 15% by weight of solids in the aqueous resin bath.

32. The process of claim 21 wherein said organic resin is an anionic resin.

33. The process of claim 32 wherein said compatible surfactant is an anionic surfactant.

34. The process of claim 32 wherein said compatible surfactant is a nonionic surfactant.

35. The process of claim 32 wherein said compatible surfactant is a cationic surfactant.

36. The process of claim 32 wherein said compatible surfactant is an amphoteric surfactant.

37. The process of claim 32 wherein said resin is an anionic epoxy resin and said surfactant is selected from the group consisting of sorbitan monolaurate, sorbitan monopalmitate, and octylphenoxy polyethoxy ethanol.

38. The process of claim 32 wherein said resin is an anionic acrylic resin and said surfactant is selected from the group consisting of octylphenoxy polyethoxyethanol and sorbitan monolaurate.

39. The process of claim 32 wherein said resin is an anionic polyester and said surfactant is octylphenoxy polyethoxy ethanol, and block copolymers of propylene oxide and ethylene oxide.

40. The process of claim 32 wherein said resin is an anionic epoxy resin and said surfactant is selected from the group consisting of sorbitan monolaurate, sorbitan monopalmitate, and octylphenoxy polyethoxy ethanol;

and said surfactant is in a concentration of from about 1% to about 15% by weight of solids in the aqueous resin bath.

41. The process of claim 32 wherein said resin is an anionic acrylic resin and said surfactant is selected from the group consisting of octylphenoxy polyethoxyethanol and sorbitan monolaurate;

and said surfactant is in a concentration of from about 1% to about 15% by weight of solids in the aqueous resin bath.

42. The process of claim 32 wherein said resin is an anionic polyester and said surfactant is octylphenoxy polyethoxy ethanol, and block copolymers of propylene oxide and ethylene oxide;

and said surfactant is in a concentration of from about 1% to about 15% by weight of solids in the aqueous resin bath.

43. A process for the electrophoretic deposition of an organic film on a conductive substrate comprising:
 (a) providing an aqueous organic resin bath formed from:
  (i) an organic resin suitable for electrophoretic deposition,
  (ii) water, and
  (iii) from about 3% to about 40% of a compatible surfactant by weight of solids in said aqueous organic resin bath;
 (b) placing the conductive substrate in said aqueous organic resin bath; and
 (c) passing a current through said substrate effective to deposit said organic resin upon said conductive substrate.

44. The process of claim 43 wherein said resin is a cationic resin.

45. The process of claim 44 wherein said compatible surfactant is a nonionic surfactant.

46. The process of claim 45 wherein said nonionic surfactant is selected from the group consisting of derivatives of ethylene oxide, glycerol and glycol esters, sorbitan esters, and combinations thereof.

47. The process of claim 46 wherein said nonionic surfactant is a derivative of ethylene oxide selected from the group consisting of amide ethers, amine ethers, ethoxylated fatty acids, ethoxylated fatty esters, ethoxylated alcohols, ethoxylated alkyl phenols, and combinations thereof.

48. The process of claim 44 wherein said compatible surfactant is a cationic surfactant.

49. The process of claim 48 wherein said cationic surfactant is selected from the group consisting of ethoxylated quarternary ammonium salts, fluorosurfactants, tertiary amine oxides, or combinations thereof.

50. The process of claim 44 wherein said compatible surfactant is an amphoteric surfactant.

51. The process of claim 50 wherein said amphoteric surfactant is selected from the group consisting of fluorosurfactants, salts of long chain amino acids, and combinations thereof.

52. The process of claim 50 wherein said anionic resin is selected from the group consisting of epoxy resin, acrylic resin, polyester resin and combinations thereof.

53. The process of claim 52 wherein said resin is an anionic epoxy resin and said surfactant is selected from the group consisting of sorbitan monolaurate, sorbitan monopalmitate, and octylphenoxy polyethoxy ethanol.

54. The process of claim 52 wherein said resin is an anionic acrylic resin and said surfactant is selected from the group consisting of octylphenoxy polyethoxyethanol and sorbitan monolaurate.

55. The process of claim 52 wherein said resin is an anionic polyester and said surfactant is octylphenoxy polyethoxy ethanol, and block copolymers of propylene oxide and ethylene oxide.

56. The process of claim 44 wherein said cationic resin is selected from the group consisting of epoxy resin, acrylic resin, and combinations thereof.

57. The process of claim 56 wherein said resin is a cationic epoxy and said surfactant is selected from the group consisting of octylphenoxy polyethoxy ethanol, methyl polyoxyethylene (15) cocoammonium chloride, and block copolymer of propylene oxide and ethylene oxide.

58. The process of claim 56 wherein said resin is a cationic acrylic resin and said surfactant is selected from the group consisting of sorbitan monopalmitate, octylphenoxy polyethoxy ethanol, and block copolymer of propylene oxide and ethylene oxide.

59. The process of claim 56 wherein said resin is a cationic acrylic resin and said surfactant is selected from the group consisting of sorbitan monopalmitate, octylphenoxy polyethoxy ethanol, and block copolymer of propylene oxide and ethylene oxide.

60. The process of claim 56 wherein said resin is a cationic epoxy and said surfactant is selected from the group consisting of octylphenoxy polyethoxy ethanol, methyl polyoxyethylene (15) cocoammonium chloride, and block copolymer of propylene oxide and ethylene oxide;
and said surfactant is in a concentration of from about 3% to about 15% by weight of solids in the aqueous resin bath.

61. The process of claim 56 wherein said resin is a cationic acrylic resin and said surfactant is selected from the group consisting of sorbitan monopalmitate, octylphenoxy polyethoxy ethanol, and block copolymer of propylene oxide and ethylene oxide;
and said surfactant is in a concentration of from about 3% to about 15% by weight of solids in the aqueous resin bath.

62. The process of claim 56 wherein said resin is a cationic acrylic resin and said surfactant is selected from the group consisting of sorbitan monopalmitate, octylphenoxy polyethoxy ethanol, and block copolymer of propylene oxide and ethylene oxide;
and said surfactant is in a concentration of from about 3% to about 15% by weight of solids in the aqueous resin bath.

63. The process of claim 43 wherein said organic resin is an anionic resin.

64. The process of claim 63 wherein said compatible surfactant is an anionic surfactant.

65. The process of claim 63 wherein said compatible surfactant is a nonionic surfactant.

66. The process of claim 65 wherein said nonionic surfactant is selected from the group consisting of derivatives of ethylene oxide, glycerol and glycol ester, sorbitan esters and combinations thereof.

67. The process of claim 66 wherein said nonionic surfactant is a derivative of ethylene oxide selected from the group consisting of amide ethers, amine ethers, ethoxylated fatty acids, ethoxylated fatty esters, ethoxylated alcohols, ethoxylated alkyl phenols, and combinations thereof.

68. The process of claim 65 wherein said nonionic surfactant is selected from the group consisting of derivatives of ethylene oxide, glycerol and glycol ester, sorbitan esters and combinations thereof;
and said surfactant is in a concentration of from about 3% to about 15% by weight of solids in the aqueous resin bath.

69. The process of claim 63 wherein said compatible surfactant is a cationic surfactant.

70. The process of claim 69 wherein said cationic surfactant is selected from the group consisting of ethoxylated quarternary ammonium salts, fluorosurfactants, tertiary amine oxides, or combinations thereof.

71. The process of claim 69 wherein said cationic surfactant is selected from the group consisting of ethoxylated quarternary ammonium salts, fluorosurfactants, tertiary amine oxides, or combinations thereof;
and said surfactant is in a concentration of from about 3% to about 15% by weight of solids in the aqueous resin bath.

72. The process of claim 63 wherein said compatible surfactant is an amphoteric surfactant.

73. The process of claim 72 wherein said amphoteric surfactant is selected from the group consisting of fluorosurfactants, salts of long chain amino acids and combinations thereof.

74. The process of claim 72 wherein said amphoteric surfactant is selected from the group consisting of fluorosurfactants, salts of long chain amino acids and combinations thereof;
and said surfactant is in a concentration of from about 3% to about 15% by weight of solids in the aqueous resin bath.

75. The process of claim 63 wherein said anionic surfactant is selected from the group consisting of: salts of alkylphenyl ethers of sulfo polyethoxyethanols, salts of phosphated polyoxyethylenated alkylphenols and alcohols, salts of sulfated alkylphenyl ethers and alkyl ethers of polyoxyethylene glycols, salts of alkylaryl sulfonates, salts of sulfated derivatives of succinic acids, salts of alcohol sulfates, salts of naphthalene and alkyl naphthalene sulfonates, and combinations thereof.

* * * * *